(12) United States Patent
Fuke et al.

(10) Patent No.: US 6,313,973 B1
(45) Date of Patent: Nov. 6, 2001

(54) LAMINATED MAGNETORESTRICTIVE ELEMENT OF AN EXCHANGE COUPLING FILM, AN ANTIFERROMAGNETIC FILM AND A FERROMAGNETIC FILM AND A MAGNETIC DISK DRIVE USING SAME

(75) Inventors: Hiromi Fuke, Kawasaki; Kazuhiro Saito, Oume; Katsuhiko Koui, Kawasaki; Hideaki Fukuzawa, Sagamihara; Akiko Saito, Kawasaki; Hitoshi Iwasaki, Yokosuka, all of (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/343,270

(22) Filed: Jun. 30, 1999

(30) Foreign Application Priority Data

| Jun. 30, 1998 | (JP) | 10-185478 |
| Sep. 16, 1998 | (JP) | 10-262152 |
| Sep. 30, 1998 | (JP) | 10-277729 |
| Dec. 25, 1998 | (JP) | 10-371138 |

(51) Int. Cl.$^7$ ........................................... G11B 5/30
(52) U.S. Cl. ........................................... 360/324.1
(58) Field of Search ............................ 360/324.1–324.12

(56) References Cited

U.S. PATENT DOCUMENTS

| 5,315,468 | * | 5/1994 | Lin ........................... 360/113 |
| 5,465,185 | | 11/1995 | Heim et al. . |
| 5,583,725 | | 12/1996 | Coffey et al. . |

(List continued on next page.)

FOREIGN PATENT DOCUMENTS

| 7-169026 | 7/1995 | (JP) . |
| 8-7235 | 1/1996 | (JP) . |
| 9-16920 | 1/1997 | (JP) . |

(List continued on next page.)

OTHER PUBLICATIONS

Jian–Gang Zhu et al; "Spin Valve and Dual Spin Valve Heads with Synthetic Antiferromagnets", *IEEE Transactions on Magnetics*, vol. 35, No. 2, Mar. 199, pp. 655–660.

Masamichi Saito et al, "PtmN single and dual spin valves with synthetic feriimagnet pinned layers", "*Journal of Applied Physics*", vol. 85, No. 8, Apr. 15, 1999, pp. 4928–4930.

(List continued on next page.)

*Primary Examiner*—A. J. Heinz
(74) *Attorney, Agent, or Firm*—Oblon, Spivak, McClelland, Maier & Neustadt, P.C.

(57) ABSTRACT

A magnetoresistive element comprises an exchange coupling film having a under layer, an antiferromagnetic film and a ferromagnetic film, which are laminated in that order, the under layer including a metal having a face centered cubic crystal structure or hexagonal closest packing crystal structure which have a longer nearest neighbor atomic distance than that of the antiferromagnetic film. With this construction, it is possible to improve the exchange coupling field and to satisfy a stable output over a long period of time. A magnetoresistive element having a dual spin valve structure has a magnetization adjusting layer, which is antiferromagnetically connected to a pinned layer via an antiparallel connection layer, to adjust the value of the product of the saturation magnetization of each of the magnetization adjusting layer and the pinned layer by the thickness thereof. Moreover, a magnetoresistance head use a giant magnetoresistance effect, and has at least one pair of pinned layer and free layer arranged via a non-magnetic spacer layer. The pinned layer has a pair of ferromagnetic layers which have different compositions and different coercive forces and which are antiferromagnetically connected to each other via a connection layer, so that the effective exchange coupling field of the pinned layer is 200 Oe or more.

24 Claims, 31 Drawing Sheets

U.S. PATENT DOCUMENTS

| | | |
|---|---|---|
| 5,701,223 | 12/1997 | Fontana, Jr. et al. . |
| 5,818,684 * | 10/1998 | Iwasaki ................................. 360/113 |
| 5,976,713 * | 11/1999 | Fuke ..................................... 428/692 |
| 6,087,027 * | 7/2000 | Hoshiya ............................... 428/692 |
| 6,090,480 * | 7/2000 | Hayashi ................................ 428/332 |

FOREIGN PATENT DOCUMENTS

| | | |
|---|---|---|
| 9-161243 | 6/1997 | (JP) . |
| 9-237410 | 9/1997 | (JP) . |
| 9-237411 | 9/1997 | (JP) . |
| 10-303477 | 11/1998 | (JP) . |
| 2925542 | 5/1999 | (JP) . |

OTHER PUBLICATIONS

M. Saito et al, "PtMn Dual Spin Valve Films Using Co/Ru/Co Synthetic Ferigmagnet Pinned Layers", *The 22$^{nd}$ Nihon Ouyou Jikigakkai Gakujutsu Kouen Gaiyoushun*, Sep. 20, 1998.

K. Aoshima et al, "Study of under layer of PdPtMn Spin–valve film", *Nihon ouyou jiki gakkai gakujutsu kouen gaiyoushun*, Oct. 2, 1997.

* cited by examiner

| ANTI FERROMAGNETIC FILMS | CRYSTAL STRUCTURES | LATTICE CONSTANTS | NEAREST NEIGHBOR-ATOMIC DISTANCES IN PLANE (111) |
|---|---|---|---|
| IrMn | fcc | a=3.78A | 2.67A |
| PtMn | fct* | a=3.971A, c=3.696A | 2.712A |
| RhRuMn | fcc | a=3.66A | 2.59A |

FIG.2

| UNDER LAYER | CRYSTAL STRUCTURES | LATTICE CONSTANTS | NEAREST NEIGHBOR-ATOMIC DISTANCES IN PLANE (111) |
|---|---|---|---|
| Ti | hcp | a=2.92A, c=4.67A | 2.92A |
| Zr | hcp | a=3.23A, c=5.14A | 3.23A |
| Hf | hcp | a=3.32A, c=5.46A | 3.32A |
| Re | hcp | a=2.7608A, c=4.4582A | 2.7608A |
| Ru | hcp | a=2.7039A, c=4.2817A | 2.7039A |
| Os | hcp | a=2.7352A, c=4.3190A | 2.7352A |
| Rh | fcc | a=3.71559A | 2.63A |
| Ir | fcc | a=3.8394A | 2.715A |
| Pd | fcc | a=3.8898A | 2.751A |
| Pt | fcc | a=3.9231A | 2.77A |
| Cu | fcc | a=3.61496A | 2.556A |
| Ag | fcc | a=4.0862A | 2.889A |
| Au | fcc | a=4.07864A | 2.884A |
| Zn | hcp | a=2.6649A, c=4.9468A | 2.6649A |
| Cd | hcp | a=2.9763A, c=5.6181A | 2.9763A |
| Al | fcc | a=4.04934A | 2.863A |
| Tl | hcp | a=3.456A, c=5.525A | 3.456A |
| Pb | fcc | a=4.9505A | 3.501A |

FIG.3

| A.F | UNDER LAYER 1 | UNDER LAYER 2 | UNDER LAYER 3 | UNDER LAYER 4 | Hua | Tb | MR | He(FREE) |
|---|---|---|---|---|---|---|---|---|
| IrMn(5nm) | Ta(5nm) | Au(1nm) | Cu(1nm) | | 800 Oe | 280 C | 8.5% | 3 Oe |
| IrMn(5nm) | Ta(5nm) | Ru(1nm) | Au(1nm) | | 850 Oe | 280 C | 8.2% | 4 Oe |
| IrMn(7nm) | Ru(2nm) | | | | 800 Oe | 290 C | 7.5% | 4 Oe |
| RhMn(7nm) | Ta(5nm) | Al(2nm) | | | 700 Oe | 260 C | 7.0% | 4 Oe |
| RhRuMn(8nm) | Ta(5nm) | Au(2nm) | | | 600 Oe | 250 C | 7.9% | 4 Oe |
| RhRuMn(8nm) | Ta(5nm) | Ru(2nm) | | | 550 Oe | 250 C | 8.1% | 3.7 Oe |
| IrMn(5nm) | Ta(3nm) | Rh(1nm) | Au(1nm) | | 800 Oe | 280 C | 8.5% | 3 Oe |
| IrMn(5nm) | Ta(3nm) | Au(2nm) | | | 780 Oe | 280 C | 8.6% | 3 Oe |
| IrMn(5nm) | Zr(3nm) | Ag(2nm) | | | 750 Oe | 270 C | 8.5% | 3 Oe |
| IrMn(10nm) | Zr(3nm) | Pd(1nm) | Ag(1nm) | Pt(0.5nm) | 700 Oe | 300 C | 8.0% | 3.5 Oe |
| PtMn(10nm) | Ta(5nm) | Au(2nm) | | | 600 Oe | 340 C | 8.5% | 3.5 Oe |
| PtMn(15nm) | Ru(1nm) | Rh(1nm) | | | 800 Oe | 360 C | 8% | 4 Oe |
| PtMn(15nm) | Cr(1nm) | Ru(1nm) | | | 750 Oe | 360 C | 8.2% | 4 Oe |
| PtMn(15nm) | Ta(5nm) | Ru(1nm) | Au(1nm) | | 700 Oe | 360 C | 8% | 4 Oe |
| IrMn(5nm) | Ta(5nm) | | | | 20 Oe | 150 C | 2.0% | 50 Oe |

FIG.10

| X | MR (%) | Hin (Oe) |
|---|---|---|
| NONE | 10.5 | 30 |
| 1 Cu | 10.6 | 12 |
| 2 Au | 9.5 | 20 |
| 1 Ru | 8.3 | 21 |
| 2 Ag | 9.2 | 19 |

SAMPLE ①

| y | x=NONE | | x=1.5Cu | |
|---|---|---|---|---|
| | Hin (Oe) | MR (%) | Hin (Oe) | MR (%) |
| 2Au | 90 | 7.1 | 50 | 8.7 |
| 1Ru/1Au | 50 | 6.5 | 27.5 | 7.9 |
| 1Ru/1NiFe | 30 | 5.6 | 14 | 7 |
| 1Ru/1Cu | 48 | 5.2 | 32 | 6.5 |
| 2Ru | 38 | 5.3 | 24 | 6.5 |
| 2NiFe | 45 | 6.1 | 28 | 7.5 |
| 2Cu | 58 | 6 | 32 | 6.4 |
| 2Ag | 75 | 6.9 | 41 | 8.5 |
| 2NiFeCr | 41 | 5.9 | 25 | 7.3 |
| 1NiFe/1Au | 70 | 6.8 | 44 | 8.1 |
| 1NiFe/1Ag | 61 | 6.7 | 40 | 8 |

FIG.17

SAMPLE ②

| y | x=NONE | | x=2Cu | |
|---|---|---|---|---|
| | Hin (Oe) | MR (%) | Hin (Oe) | MR (%) |
| 2Au | 68 | 8.7 | 14 | 10.1 |
| 1Ru/1Au | 67 | 7.6 | 13.5 | 9.2 |
| 1Ru/1NiFe | 58 | 7.1 | 8.5 | 8.4 |
| 1Ru/1Cu | 61 | 6.8 | 12 | 8.5 |
| 2Ru | 60 | 7.2 | 11 | 8.9 |
| 2NiFe | 61 | 7.3 | 6.2 | 8.9 |
| 2Cu | 65 | 6.5 | 13 | 7.8 |
| 2Ag | 69 | 8.1 | 13 | 9.9 |
| 2NiFeCr | 59 | 7 | 7.5 | 8.7 |
| 1NiFe/1Au | 66 | 7.8 | 11 | 9.2 |
| 1NiFe/1Ag | 65 | 7.5 | 10 | 9.1 |

FIG.18

| THICKNESS X (nm) OF REGULATION LAYER | 2 | 1 | 3 | 2.5 | 3 | 2.5 | 2.8 |
|---|---|---|---|---|---|---|---|
| THICKNESS Y (nm) OF PINNED LAYER | 3 | 2 | 4 | 4 | 3 | 3 | 3 |
| X/Y | 0.67 | 0.5 | 0.75 | 0.63 | 1 | 0.83 | 0.93 |
| PRESENCE OR ABSENCE OF INVERSION | ABSENCE | PRESENCE | ABSENCE | ABSENCE | PRESENCE | ABSENCE | PRESENCE |
| INVERTING VOLTAGE (V) | – | 80 | – | – | 78 | – | 83 |

| THICKNESS X (nm) OF REGULATION LAYER | 2 | 2 | 1 | 2 | 2 | 2 |
|---|---|---|---|---|---|---|
| THICKNESS Y (nm) OF PINNED LAYER | 1 | 2 | 2 | 3 | 3.5 | 4 |
| DISCREPANCY OF BIAS POINTS (Oe) | 37 | 8 | -22 | -23 | -28 | -30 |

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 20 | Co75Cr13Pt12 | Ru | Co90Fe10 | 120 | 400 |
| 21 | Co75Cr13Ta12 | Ru | Co90Fe10 | 150 | 380 |
| 22 | Co75Cr13Pt4Ta8 | Ru | Co90Fe10 | 110 | 310 |
| 23 | Co83Sm17 | Ru | Co90Fe10 | 220 | 420 |
| 24 | Co83Y17 | Ru | Co90Fe10 | 230 | 410 |
| 25 | Co80Pt20 | Cr | Co90Fe10 | 100 | 320 |
| 26 | Cr/Co80Pt20 | Ru | Co90Fe10 | 600 | 700 |
| 27 | Co80Pt20 | Ru | Ni80Fe20 | 100 | 350 |
| 28 | Co50V4Fe46 | Ru | Co90Fe10 | 50 | 220 |

FIG.29

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 29 | Co75Cr13Pt12 | Cr | Co90Fe10 | 100 | 360 |
| 30 | Co75Cr13Ta12 | Cr | Co90Fe10 | 130 | 340 |
| 31 | Co75Cr13Pt4Ta8 | Cr | Co90Fe10 | 90 | 270 |
| 32 | Co83Sm17 | Cr | Co90Fe10 | 200 | 380 |
| 33 | Co83Y17 | Cr | Co90Fe10 | 210 | 370 |
| 34 | Co80Pt20 | Ru | Co90Fe10 | 80 | 280 |
| 35 | Co80Pt20 | Cr | Ni80Fe20 | 80 | 310 |

FIG.30

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 36 | Fe85Co15 | Ru | Co90Fe10 | 55 | 250 |
| 37 | Fe85Mn12Ti3 | Ru | Co90Fe10 | 100 | 400 |

FIG.32

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 38 | $MnFe_2O_4$ | Ru | Co90Fe10 | 50 | 210 |
| 39 | $Fe_3O_4$ | Ru | Co90Fe10 | 100 | 380 |
| 40 | $CoFe_2O_4$ | Ru | Co90Fe10 | 150 | 420 |
| 41 | $NiFe_2O_4$ | Ru | Co90Fe10 | 52 | 220 |

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 42 | BaO·6Fe$_2$O$_3$ | Ru | Co90Fe10 | 120 | 410 |
| 43 | SrO·6Fe$_2$O$_3$ | Ru | Co90Fe10 | 130 | 430 |

FIG.35

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 44 | Fe$_3$N | Ru | Co90Fe10 | 55 | 230 |

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 45 | Al₂O₃/α/Ta/Co | Ru | Co | 80 | 320 |
| 46 | Al₂O₃/α/V/Co | Ru | Co | 200 | 500 |
| 47 | Al₂O₃/α/Zr/Co | Ru | Co | 70 | 210 |
| 48 | Al₂O₃/α/Fe85Co15/Co | Ru | Co | 120 | 500 |
| 49 | Al₂O₃/α/Cr/Co90Fe10 | Ru | Co90Fe10 | 90 | 360 |
| 50 | Al₂O₃/α/Ta/Co90Fe10 | Ru | Co90Fe10 | 80 | 320 |
| 51 | Al₂O₃/α/V/Co90Fe10 | Ru | Co90Fe10 | 170 | 450 |
| 52 | Al₂O₃/α/Zr/Co90Fe10 | Ru | Co90Fe10 | 60 | 240 |
| 53 | Al₂O₃/α/Fe85Co15 /Co90Fe10 | Ru | Co90Fe10 | 110 | 430 |
| 54 | SiOX/α/Cr/Co | Ru | Co | 55 | 220 |
| 55 | ZrOX/α/Cr/Co | Ru | Co | 53 | 230 |
| 56 | TiN/α/Cr/Co | Ru | Co | 52 | 210 |
| 57 | Al₂O₃/α/Cr/Co80Pt20 | Ru | Co | 1000 | 2000 |
| 58 | Al₂O₃/α/Cr/Co | Cr | Co | 60 | 240 |
| 59 | AlN/α/Cr/Co | Ru | Co | 100 | 420 |
| 60 | AlN/α/Cr/Co | Cr | Co | 57 | 230 |

FIG.36

| EXAMPLE | FERROMAGNETIC LAYER A 11 | ANTI FERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 61 | NiO (10nm)/Co | Ru | Co | 150 | 500 |
| 62 | α-Fe$_2$O$_3$(15nm)/Co | Ru | Co | 300 | 600 |
| 63 | α-Fe$_2$O$_3$(10nm)/Co | Ru | Co | 250 | 520 |
| 64 | Pt52Mn48 (15nm)/Co | Ru | Co | 60 | 240 |
| 65 | Pt52Mn48 (10nm)/Co | Ru | Co | 70 | 210 |
| 66 | Ir22Mn78 (4nm)/Co | Ru | Co | 55 | 230 |
| 67 | NiO (15nm)/Co90Fe10 | Ru | Co90Fe10 | 330 | 800 |
| 68 | NiO (10nm)/Co90Fe10 | Ru | Co90Fe10 | 180 | 610 |
| 69 | Pt52Mn48 (15nm)/Co90Fe10 | Ru | Co90Fe10 | 80 | 270 |
| 70 | Pt52Mn48 (10nm)/Co90Fe10 | Ru | Co90Fe10 | 85 | 300 |
| 71 | Ir22Mn78 (4nm)/Co90Fe10 | Ru | Co90Fe10 | 60 | 250 |
| 72 | Ir22Mn78 (4nm)/Co90Fe10 | Cr | Co90Fe10 | 50 | 210 |
| 73 | Cr70Al30 (20nm)/Co | Ru | Co | 70 | 300 |
| 74 | Cr50Mn50 (20nm)/Co | Ru | Co | 100 | 300 |
| 75 | CoO (10nm)/Co | Ru | Co | 140 | 480 |
| 76 | CoO (5nm)/NiO (5nm)/Co | Ru | Co | 180 | 520 |
| 77 | NiO (5nm)/Co | Ru | Co90Fe10 | 120 | 460 |

FIG.38

| EXAMPLE | FERROMAGNETIC LAYER A 11 | ANTIFERROMAGNETIC CONNECTION LAYER 12 | FERROMAGNETIC LAYER B 13 | COERCIVE FORCE Oe OF FERROMAGNETIC LAYER A | Hex* Oe |
|---|---|---|---|---|---|
| 78 | NiO$_{0.8}$ (15nm)/Co | Ru | Co | 200 | 500 |
| 79 | NiO$_{0.8}$ (10nm)/Co | Ru | Co | 170 | 400 |
| 80 | α-Fe$_2$O$_3$(15nm)/Co | Ru | Co | 320 | 640 |
| 81 | α-Fe$_2$O$_3$(10nm)/Co | Ru | Co | 280 | 560 |
| 82 | Pt58Mn42 (25nm)/Co | Ru | Co | 210 | 510 |
| 83 | Pt58Mn42 (15nm)/Co | Ru | Co | 150 | 390 |
| 84 | Ir27Mn73 (10nm)/Co | Ru | Co | 80 | 290 |
| 85 | Ni53O47 (15nm)/Co90Fe10 | Ru | Co90Fe10 | 250 | 700 |
| 86 | Ni53O47 (10nm)/Co90Fe10 | Ru | Co90Fe10 | 190 | 630 |
| 87 | Pt58Mn42 (25nm)/Co90Fe10 | Ru | Co90Fe10 | 300 | 710 |
| 88 | Pt52Mn48 (15nm)/Co90Fe10 | Ru | Co90Fe10 | 210 | 640 |
| 89 | Ir27Mn73 (10nm)/Co90Fe10 | Ru | Co90Fe10 | 100 | 360 |
| 90 | Ir27Mn73 (10nm)/Co90Fe10 | Cr | Co90Fe10 | 80 | 280 |

FIG.39

LAMINATED MAGNETORESTRICTIVE ELEMENT OF AN EXCHANGE COUPLING FILM, AN ANTIFERROMAGNETIC FILM AND A FERROMAGNETIC FILM AND A MAGNETIC DISK DRIVE USING SAME

BACKGROUND OF THE INVENTION

1. Field of the Invention

The present invention relates generally to a magnetoresistive element having an change coupling film utilizing an exchanging coupling between an antiferromagnetic film and a ferromagnetic film, a magnetic head using the magnetoresistive element, and a magnetic disk drive using the magnetic head.

2. Description of the Background

As a read head in a high density magnetic recording, a magnetic head using a magnetoresistive element has been studied. At present, an 80 at % Ni-20 at % Fe (coummn name: permalloy) alloy thin-film is used as a material of the magnetoresistive element. In recent years, as materials substituted for this, artificial lattice films and spin valve films, such as (Co/Cu)n, which have a giant magnetoresistance effect, are widely noticed.

Since the magnetoresistance effect film of permalloy has magnetic domains, the Barkhausen noises resulting from this are much of a problem for practical use. Therefore, various methods for causing a magnetoresistance efts film to have a single magnetic domain are studied. As one of the methods, there is used a method for controlling the magnetic domains of a magnetoresistance effect film in a specific direction using an exchanging coupling between a magnetoresistance effect film, which is a ferromagnetic film, and an antiferromagnetic film. As the antiferromagnetic material, γ-FeMn alloy is well known (e.g., U.S. Pat. No. 4,103,315 and U.S. Pat. No. 5,015,147). This magnetoresistance effect is called anisotropic magnetoresistance effect.

Moreover, in recent years, the art utilizing an exchanging coupling between an antiferromagnetic film and a ferromagnetic film is widely used in order to pin the magnetization of a magnetic film of a spin valve film. Also for this purpose, γ-FeMn alloy is widely used as the antiferromagnetic film.

However, the γ-FeMn alloy has the problem of corrosion resistance, particularly corrosion due to water, so that there is a problem in that the exchange coupling field to a magnetoresistance effect film as a magnetoresistive element is deteriorated by corrosion at a processing step or corrosion due to water in atmosphere as time elapses.

In addition, the pentium processor recently incorporated in a machine having an accelerated throughput has a very large heating value, so that the temperature in an HDD also rises to about 150° C. during operation. Therefore, an exchange coupling field of 200 Oe or more at 150° C. is required in view of reliability. In order to obtain an exchange coupling field of 200 Oe or more at 150° C., it is desired that the exchange coupling field at room temperature is not only high, but the temperature characteristic of the exchange coupling field is also good. Moreover, it is required that the blocking temperature, at which the exchanging coupling between the ferromagnetic film and the antiferromagnetic film disappears, should be as higher as possible.

However, the blocking temperature of the γ-FeMn alloy is 170° C. or lower. In addition, the temperature characteristic of the exchange coupling field is very bad. Therefore, the exchange coupling field is not sufficient at 100° C., so that there is a problem in that there is no long-term reliability.

In addition, U.S. Pat. No. 4,103,315 discloses the use of oxides, such as NiO. Moreover, U.S. Pat. No. 5,315,468 discloses that if an antiferromagnetic film is formed of θ-Mn alloy, such as NiMn alloy, which has a face centered tetragonal crystal structure, the exchange coupling field between the antiferromagnetic film and the ferromagnetic film does not deteriorate even in a high temperature range.

Moreover, the inventor has proposed an antiferromagnetic film of IrMn having a face centered cubic crystal structure, which has excellent characteristics. In addition, U.S. Pat. No. 5,315,468 discloses that other γ-Mn alloys, such as MnPt and MnRh, are used as the antiferromagnetic films of the same crystal structure.

However, these antiferromagnetic films are formed of Mn alloy which is difficult to prepare a high density target, so that it is difficult to manage the quality of the film. In addition, when the antiferromagnetic films are laminated on the top of a ferromagnetic film or a spin valve film, the ferromagnetic film or the spin valve film supports an under layer for the antiferromagnetic film, so that the antiferromagnetic film crystal-grows so as to obtain good exchanging coupling characteristics. However, when the antiferromagnetic underlies the ferroelectric film, there is a problem of the selection of the under layer that promotes a crystal growth.

On the other hand, a magnetic storage having a magnetic head, which uses a magnetoresistive element having a dual spin valve film and a magnetoresistive element having a dual spin valve film, is also widely used.

Conventionally, the readout of information recorded in a magnetic recording medium is carried out by a method for moving a read head comprising a magnetic core, onto which a coil is wound and which has a magnetic gap, with respect to a recording medium, and sensing a magnetic field through the magnetic gap at that time to detect a voltage induced in the coil. On the other hand, with the increase of the magnetic recording density, a magnetic head (MR head) utilizing the magnetoresistance effect (MR effect), such as NiFe alloy film, is widely used at present, since it is able to more sensitively recorded information out of a magnetic recording medium.

Recently, in order to more increase the magnetic recording density, high sensitive magnetoresistive elements using a higher sensitive giant magnetoresistance effect (GMR) than those of the MR heads, i.e., GMR elements, are developed. The promising of the GMR elements is a structure called a spin valve structure. This comprises a non-magnetic metal layer sandwiched between two ferromagnetic metal layers. In this structure, when the direction of magnetization of one of the magnetic layers (the free layer) varies with respect to another layer, the magnetization of which is fixed, by a magnetic field from a recording medium, it is possible to obtain information in the magnetic field of the recording medium as a large variation in value of resistance.

In order to obtain a high output using such a spin valve structure, various structures have been proposed. One of them is a structure called a dual spin valve. In this structure, a free layer is arranged between two magnetization fixed layers, the magnetizations of which are fixed in the same direction, via a non-magnetic metal layer. According to this dual spin valve structure, there is an advantage in that it is possible to obtain a higher output than that of a conventional spin valve film having a single magnetization fixed layer.

However, although the above described spin valve structure can obtain a high output, there are problems in that there are some cases where the pinned layer is inverted by the electrostatic discharge (ESD) so that the output can be obtained, and that it is difficult to modify this to obtain the output again. In addition, it is difficult to set the bias point of the element since a great bias magnetic field in the spin valve.

That is, there are some cases where the pinned layer is inverted by the electrostatic discharge (ESD) in the conventional spin valve element. In order to modify the inversion of the pinned layer, there is proposed a circuit for passing a current through the element to add its galvano magnetic field to the pinned layer. However, in the case of the conventional dual spin valve structure, if the current flows through the element to add its galvano magnetic field to the magnetization fixed layer, magnetic fields are applied to two pinned layers in opposite directions to each other, so that the two pinned layers are fixed in opposite directions to each other. However, in the dual spin valve structure, it is not possible to obtain the output due to the variation in magnetic resistance unless the direction of the magnetization of the pinned layer is the same direction. Therefore, there is a problem in that the method for modifying the inversion of the pinned layer for use in the conventional spin valve element can not be applied to the conventional dual spin valve structure.

On the other hand, in the dual spin valve structure, if the pinned layer is set so as to obtain a high output, a large bias magnetic field is produced from the pinned layer to the free layer, so that it is difficult to get the equivalently outputs for the positive and negative components of the magnetic field. The reason for this is that since two pinned layers exist, if the pinned layers are intended to be design so as to obtain a high output, the total value of products obtained by multiplying the saturation magnetization Ms by the thickness t increases, so that the bias magnetic field to the free layer increases. If the total value of Ms·t of the two pinned layers exceeds the value of Ms·t of the free layer, the magnetizations of the free layer and pinned layer are completely parallel to each other in opposite directions to each other due to the magnetostatic coupling. In this case, in one of the positive and negative directions of the magnetic field, it is not possible to obtain the variation in output even if the magnetic field varies.

On the other hand, in order to increase the magnetic recording density of the magnetoresistance effect head in the magnetic disk drive, the MR head using the magnetores distance effect (MR effect) element for the read head part plays an important part. In order to achieve a higher density hereafter, it is required to provide an MR head using the giant magnetoresistance effect (GMR effect) element, which greatly increases the sensitivity of the MR effect element, for the read head.

As shown in FIG. 1, in a conventional shielding MR head using the GMR effect, a lower magnetic shield layer 2 of a soft magnetic film, such as permalloy, is formed on a substrate 1 of, e.g., $Al_2O_3 \cdot TiC$. An MR film 4 (spin valve) is arranged on this magnetic shield layer via an insulator film 3 constituting a read magnetic gap. in The MR film 4 includes a so-called free layer 15, which rotates the magnetization in accordance with a signal magnetic field, an intermediate layer 14, a pinned layer 16, and an antiferromagnetic layer 17. The magnetization of the pinned layer 16 is pinned by the antiferromagnetic layer 17. In addition, in order to cause the magnetization of the free layer 15 to be a single magnetic domain, a pair of longitudinal bias films 5 of Copt or the like for producing a bias magnetic field, and a pair of leads 6 are arranged on both sides of the MR film 4 to form a magnetoresistive element (which will be hereinafter referred to as an "MR element") 7 of an abutted junction system. On the MR element 7, an insulator film 8 constituting a read magnetic gap, and an upper magnetic shield 9 are arranged. In such a shielding MR head, the signal magnetic field is detected by, e.g., passing a sense current through the pair of leads 6 to measure the variation of resistance of the film due to the variation of the average magnetization direction of the MR film 4.

Conventionally, the MR film using the GMR element is formed of a spin valve film. The basic construction thereof comprises a free layer/a non-magnetic spacer layer/a pinned layer. In addition, an antiferromagnetic layer is laminated on the pinned layer, and the structure of the free layer/the non-magnetic spacer layer/pinned layer/the antiferromagnetic layer is formed. The magnetization of the pinned layer is pinned by the exchange coupling field from the antiferromagnetic layer.

In the MR film using the GMR film, in order to insure a linear response for the magnetization of the free layer, it is required that the magnetization of the free layer, when no magnetic field exists, should be substantially perpendicular to the magnetization of the pinned layer. An example of this heat treatment process 3is as follows. After the induced magnetic anisotropy is applied to the free layer and the magnetic shield layer at about 250° C. while applying a magnetic field thereto, the direction of the magnetic field is rotated by 90° to carry out cooling. After cooling, the magnetic field is applied again along the direction of the free layer to increase the temperature up to 150° C. so as to carry out coolong. And the orthogonal alignment between the magnetization of the free layer and the magnetization of the pinned layer is realized. After the heat treatment, a bias magnetic field is applied to the free layer by a hard magnetic layer, to inhibit the production of Barkhausen noises.

However, in the MR film and MR head, which use the GMR element, if the blocking temperature (which will be hereinafter referred to as $T_B$) of the antiferromagnetic layer is designed to be high in order to enhance the thermal stability of the pinned layer, it is required to carry out heat treatment at a high temperature to pin the magnetization of the pinned layer. As a result, it is insufficient to apply the induced magnetic anisotropy to the magnetization free end and magnetic shield layer although the thermal stability of the pinned layer is enhanced.

On the other hand, if the $T_B$ is set to be low, the induced magnetic anisotropy can be applied to the free layer and magnetic shield layer, but the thermal stability of the pinned layer is not sufficient. Therefore, the output of the head is deteriorated by the temperature rise during operation of the head, e.g., at 100° C. or higher.

In addition, there is also a problem in that if the $T_B$ is low, the reverse of magnetization of the pinned layer is caused by an ESD (electrostatic discharge). This has an influence on the producing yield in the production of the element and the assembly of a disk drive. Thus, in the conventional construction, it is difficult to combine both the stabilities of the induced magnetic anisotoropy and the pinned layer.

On the other hand, there are known a GMR film having the construction of a pinned layer formed directly of a hard magnetic layer as a pinned layer, and a GMR film having the construction of a pinned layer is pinned by a hard magnetic layer. Thus, it is possible to apply the induced magnetic anisotropy to the free layer and magnetic shield layer by heat treatment to fix the magnetization of the pinned layer by polarization at room temperature. However, with such construction, the magnetic field out of the hard magnetic layer increases, so that it is difficult to set the bias point similar to the use of the antiferromagnetic layer. In addition, unless the coercive force of the hard magnetic layer increases, the pinned layer is moved by the signal field of the medium, so that a desired output is not obtained.

As described above, the thermal stability of the pinned layer of the GKR element greatly depends on the $T_B$ of the antiferromagnetic layer. If the $T_B$ is designed to be high, although the thermal stability of the pinned layer is enhanced, it is required to carry out the high-temperature heat treatment of the antiferromagnetic layer, so that it is difficult to apply the induced magnetic anisotropy to the shield layer and free layer by the heat treatment. on the other hand, if the $T_B$ is designed to be low, although it is easy to apply the induced magnetic anisotropy to the shield layer and free layer, the thermal stability of the pinned layer is insufficient, so that the output voltage of the head and the producing yield of the head are deteriorated.

SUMMARY OF THE INVENTTON

It is therefore an object of the present invention to eliminate the aforementioned problems and to provide a magnetoresistive element, wherein an exchange-coupling field between the antiferromagnetic film and a ferromagnetic film is sufficient or a low interlayer coupling between a pinned layer and a free layer, and which has a sufficiently high MR ratio, and ig able to provide a stable output voltage over a long period of time, a magnetic head using the magnetoresistive element, a magnetic disk drive using the magnetoresistive element, and a method for efficiently producing the magnetoresistive element.

It is another object of the present invention to eliminate the aforementioned problems of the dual spin valve element and to provide a magnetoresistive element of a dual spin valve element which causes no or little reverse of magnetization of a pinned layer even if the ESD is produced.

It is another object of the present invention to provide a magnetoresistive element, which is able to modify the reverse of magnetization of a pinned layer by passing a current through a dual spin valve element when the reverse of magnetization of the pinned layer of the element is caused by the ESD, and to provide a magnetic recording device, which has the magnetores istive element and a circuit for modifying the inversion of magnetization.

It is a further object of the present invention to provide a magnetoresistive element, which has the aforementioned good properties with respect to the ESD and which has a good symmetry of output with respect to the positive and negative magnetic fields by canceling the bias magnetic field produced in a dual spin valve element.

It is a still further object of the present invention to eliminate the aforementioned problems on the aforementioned GMR element and to provide a magnetoresistance effect head, which is easy to apply the induced magnetic anisotropy by heat-treating a free layer of the GMR element and which prevents the setting of a bias point from being difficult, the magnetoresistance effect head being strong against the ESD and preventing the producing yield from being deteriorated by the ESD.

In order to accomplish the aforementioned and other objects, according to a first aspect of the present invention, a ingnetoresistive element has an exchange coupling film comprising a under layer, an antiferromagnetic film and a ferromagnetic film, which are laminated in that order, the under layer being made of a metal or alloy in a single or laminated film having a face centered cubic crystal structure or hexagonal closest packing crystal structure which has a longer nearest neighbor atomic distance than that of the antiferromagnetic film.

According to a second aspect of the present invention, a magnetoresistive elment has an exchange coupling film coiprising a under layer, an antiferromagnetic film and a ferromagnetic film, which are laminated in that order, the under layer being a single film, a laminated film, an alloy film or a laminated alloy film, which use at least one selected from the group consisting of Ru, Rh, Ir, Cr, Re, Tc and Os.

According to a third aspect of the present invention, a magnetic head comprises: a lower magnetic shield layer; a lower read magnetic gap formed on the lower magnetic shield layer; a magnetoresistive element of the present invention formed on the lower read magnetic gap; an upper read magnetic gap formed on the magnetoresistive element; and an upper magnetic shield layer formed on the upper read magnetic gap. This magnetic head may be used for providing a magnetic disk drive.

According to a fourth aspect of the present invention, an exchange coupling film producing method is characterized by preparing the antiferromagnetic film using an alloy target having an oxygen content of 0.5 wt % or less, in the production of the magnetoresistive element according to the first aspect of the present invention.

According to a fifth aspect of the present invention, a magnetoresistive element comprises a first pinned layer, a free layer and a second pinned layer, which are laminated in that order so as to be separated from each other by first and second non-magnetic spacer layers, the first and second pinned layers being layers wherein the direction of magnetization thereof are pinned to be the same direction, the free layer which is a layer capable of changing the direction of magnetization in accordance with an external magnetic field, the first pinned layer having a first ferromagnetic magnetization adjusting layer which is antiferromagnetically connected on the opposite side to the first spacer layer via an anti-parallel connection film, the second pinned layer having a second ferromagnetic magnetization adjusting layer which is antiferromagnetically connected on the opposite side to the second spacer layer via an anti-parallel connection film, wherein when a current flows through the magnetoresistive element to produce a galvano magnetic field, the products of saturation magnetizations of the pinned layer and the thicknesses and the galvano magnetic fields thereof are substantially equal to each other between the first magnetization adjusting layer and the first pinned layer and between the second pinned layer and the second magnetization adjusting layer.

The expression "substantially equal", herein means that a ratio of the product of the saturation magnetization of the magnetization adjusting layer and the thickness and the galvano magnetic fields thereof to the product of the saturation magnetization of the pinned layer by the thickness and the galvano magnetic field thereof is preferably 0.8 or more and 1.2 or less, more preferably 0.9 or more and 1.1 or less.

According to a sixth aspect of the present invention, a magnetoresistive element has the spin valve film, the first pinned layer having a first ferromagnetic magnetization adjusting layer which is antiferromagnetically connected on the opposite side to the first spacer layer via an anti-parallel connection film, the second pinned layer having a second ferromagnetic magnetization adjusting layer which is antiferromagnetically connected on the opposite side to the second spacer layer via an anti-parallel connection film, and a value obtained by dividing a product of the saturation magnetization of the magnetization adjusting layer by a thickness thereof, by a product of the saturation magnetization of the magnetization adjusting layer by a thickness thereof is set to be 0.6 or more and less than 1.0 between the first pinned layer and the first magnetization adjusting layer and between the second pinned layer and the second magnetization adjusting layer.

According to a seventh aspect of the present invention, in the magnetoresistive element having the spin valve film, both of a value obtained by dividing the values of resistance of four layers, i.e., the first spacer layer, the free layer, the second spacer layer and the second pinned layer, by the values of resistance of six layers, i.e., the first pinned layer, the first spacer layer, the free layer, the second spacer layer, the second pinned layer and the second magnetization adjusting layer, and a value obtained by dividing the values of resistance of four layers, e.g., the second spacer layer, the free layer, the first spacer layer and the first pinned layer, by the values of resistance of six layers, i.e., the second pinned layer adjacent to the second magnetization adjusting layer, the second spacer layer, the free layer, the first spacer layer, the first pinned layer and the first magnetization adjusting layer, are set to be greater than 1.1.

According to an eighth aspect of the present invention, a magnetoresistance effect head uses a giant magnetoresistance effect film having at least one pair of pinned layer and free layer which are arranged via a non-magnetic spacer layer, the pinned layer comprising a pair of ferromagnetic layers which have different coercive forces and which are antiferromagnetically connected to each other via a connection layer, the effective exchange coupling field $H_{ex}*$ of the pinned layer being set to be 200 Oe or more at room temperature.

According to a ninth aspect of the present invention, a magnetoresistance effect head uses a giant magnetoresistance effect film having at least one pair of pinned layer and free layer which are arranged via a non-magnetic spacer layer, the pinned layer comprising a pair of ferromagnetic layers which are antiferromagnetically connected to each other via a connection layer, at least one of the pair of ferromagnetic layers being a hard magnetic film which is formed on a crystalline metal under layer and which has a bi-crystal structure containing Co as a constituent element.

According to a tenth aspect of the present invention, a magnetoresistance effect head uses a giant magnetoresistance effect film having at least one pair of pinned layer and free layer which are arranged via a non-magnetic spacer layer, the pinned layer having a pair of ferromagnetic layers which are antiferromagnetically connected to each other via a connection layer, one of the pair of ferromagnetic layers having a laminated structure wherein at least one coercive force increas ing layer is laminated, the coercive force increasing layer being selected from the group consisting of an oxide layer containing at least one element of Ni, Co and Fe as a principal component, a metal layer containing Mn, and a metal layer containing Cr as a principal component, a ratio Hc/Hex of a coercive force Hc in the ferromagnetic layers having the laminated structure to an exchange coupling field in the ferromagnetic magnetic layers caused by the coercive force increasing layer being set to be greater than 1, which includes the case where the exchange coupling field Hex is substantially zero.

According to an eleventh aspect of the present invention, a magnetoresistance effect head uses a giant magnetoresistance effect film having at least one pair of pinned layer and free layer which are arranged via a non-magnetic spacer layer, the free layer having longitudinal bias layers of antiferromagnetic layers for removing Barkhausen noises on both sides in a track width direction, the pinned layer comprising a pair of ferromagnetic layers which are antiferromagnetically connected to each other via c connection layer to fix magnetization at 200° C. or lower.

BRIEF DESCRIPTION OF THE DRAWINGS

In the accompanying drawings:

FIG. 2 is a table showing crystal structures, lattice constants and nearest neighbor atomic distances of materials capable of being used as antiferromagnetic films;

FIG. 3 is a table showing crystal structures, lattice constants and nearest neighbor atomic distances of materials capable of being used as under layers;

FIG. 10 is a table showing various characteristics of the first preferred embodiment of an antiferromagnetic film according to the present invention, which also shows those in comparative examples;

FIG. 17 is a table showing the results using sample ① in Example 7;

FIG. 18 is a table showing the results using sample ② in Example 7;

FIG. 29 is a table showing the constructions of Examples 20 through 28;

FIG. 30 is a table showing the constructions of Examples 29 through 35;

FIG. 32 is a table showing the constructions of Examples 36 and 37;

FIG. 33 is a table showing the constructions of Examples 38 through 41;

FIG. 34 is a table showing the constructions of Examples 42 and 43;

FIG. 35 is a table showing the construction of Examples 44;

FIG. 36 is a table showing the constructions of Examples 45 through 60;

FIG. 38 is a table showing the constructions of Examples 61 through 77;

FIG. 39 is a table showing the constructions of Examples 78 through 90;

DESCRIPTION OF THE PREFERRED EMBODIMENTS

Figure 1:
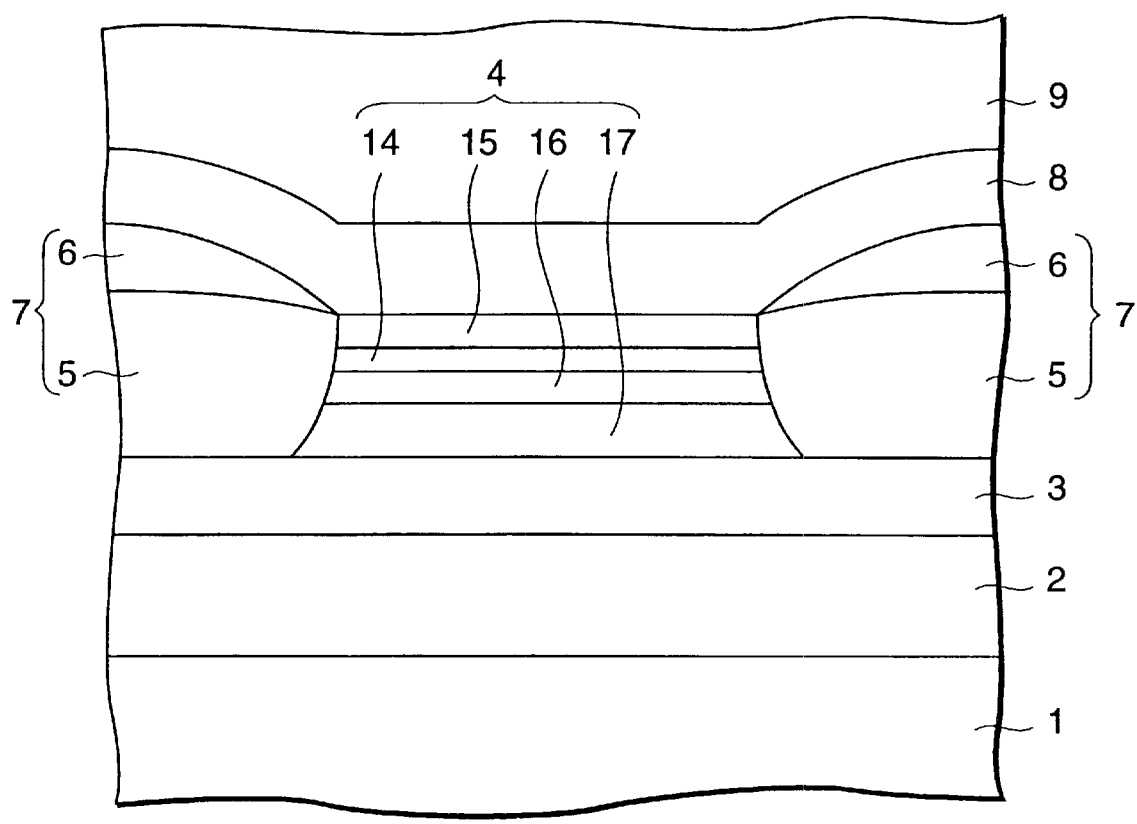
FIG. 1 is a sectional view showing an example of a conventional magnetoresistance effect element.

Referring now to the accompanying drawings, the preferred embodiments of a magnetoresistive element and a magnetic disk drive having a magnetic head using the same, according to the present invention, will be described in detail below. Before describing the detailed description of the preferred embodiments, the magnetoresistive elements and magnetic head according to the first through eleventh aspects of the present invention will be supplementally described.

The first aspect of the present invention is based on the following knowledge. That is, a under layer of an antiferromagnetic film supports a crystal growth of the antiferromagnetic film by selecting a under layer having a greater nearest neighbor atomic distance than that of the antiferromagnetic film. As a result, the antiferromagnetic film shows a sufficient exchange coupling field and a high blocking temperature at thin film thickness. In addition, if the crystallinity of the antiferromagnetic film is good, the characteristics of the free layer laminated thereon are also improved to obtain a high MR ratio, a high thermal stability of MR ratio, and a high change in resistance ($\Delta$Rs). Moreover, the quality of crystal is good, so that the deterioration due to process is inhibited. Therefore, it is possible to obtain an improved stable output voltage over a long period of time.

In the first aspect of the present invention, the under layer contacting the antiferromagnetic film is preferably formed as follows.

1-1 The under layer is a single film or a laminated film of metal or alloy, which use at least one selected from the group consisting of Tc, Re, Ru, Os, Rh, Ir, Pd, Pt, Ag, Au, Zn, Cd, Al, Tl and Pb.

①-2 The under layer is an laminated film comprising: a first layer, which is a single film, a laminated film or an alloy film, which use at least one selected from the group consisting of Tc, Re, Ru, Os, Rh, Ir, Pd, Pt, Ag, Au, Zn, Cd, Al, Tl and Pb; and a second layer, which is a single layer, a laminated film or an alloy film, which use at least one selected from the group consisting of Ti, Ta, Hf, Zr, Nb and V, the first layer contacting an antiferromagnetic film.

According to the second aspect of the present invention, a under layer of an antiferromagnetic film supports a crystal growth promoting layer for the antiferromagnetic film by selecting a under layer of at least one selected from the group consisting of Ru, Rh, Ir, Cr, Re, Tc and Os. As a result, a thin antiferromagnetic film shows a sufficient exchange coupling field and a high blocking teuperature. In addition, it the crystallinity of the antiferromagnetic film is good, a low interlayer coupling favorable for the design of a bias point can be obtained. Simultaneously, the quality of crystal is good, so that the deterioration due to process is inhibited. Therefore, it is possible to obtain an improved stable output voltage over a long period of time.

Furthermore, in the second aspect of the present invention, the under layer of the antiferromagnetic film is preferably formed as follows.

②-1 The under layer further comprises a single film, a laminated film or an alloy film, which use at least one selected from the group consisting of Ti, Ta, Hf. Zr, Nb and V.

②-2 The under layer further comprises a single film, a laminated film or an alloy film, which use at least one selected from the group consisting of Pd, Pt, Ag, Au, Zn, Cd, Al, Tl and Pb. Thus, the under layer supports a crystal growth of the antiferromagnetic layer. As a result, a thin antiferromagnetic film shows sufficient exchange coupling field and a high blocking temperature. In addition, in a so-called spin valve, dual spin valve and unconnected artificial lattice wherein a free layer is formed on the upper side of an exchange coupling film, if the crystallinity of the antiferromagnetic film is good, the characteristics of the free layer laminated thereon are also improved to obtain a high MR ratio, a high thermal stability of MR, a high change in resistance (ΔRs), and a low interlayer coupling favorable for the design of a bias point. Simultaneously, the quality of crystal is good, so that the deterioration due to process is inhibited. Therefore, it is possible to obtain an improved, more stable output over a long period of time.

(2)-3 The under layer further comprises a single film, a laminated film or an alloy film, which use at least one selected from the group consisting of Pd, Pt, Ag, Au, Zn, Cd, Al, Tl and Pb, and a single film, a laminated film or an alloy film, which use at least one selected from the group consisting of Ti, Ta, Hf, Zr, Nb and V.

Moreover, in the first and second aspect of the present invention, the antiferromagnetic film is preferably formed as follows.

(1) At least part of the antiferromagnetic film has a face centered cubic crystal structure.

(1)-1 The antiferromagnetic film contains $R_xMn_{100-x}$ (R is at least one element selected from the group consisting of Ir, Rh, Pt, Ru, Au, Ag, Co, Pd, Ge, Re, Ni and Cu, $5 \leq x \leq 40$).

(1)-2 The antiferromagnetic film contains $(R_xMn_{100-x})_{100-y}Fe_y$ (R is at least one element selected from the group consisting of Ir, Rh, Pt, Ru, Au, Ag, Co, Pd, Ge, Re, Ni and Cu, $5 \leq x \leq 40$, $0 < y < 30$). If the value of x in (1)-1 and (1)-2 is less than 5 or more than 40, it is not preferable since the exchange coupling field decreases. The addition of Fe in (1)-2 serves to increase the exchange coupling field. However, if the value of y is 30 or more, it is not preferable since corrosion resistance considerably deteriorates.

(1)-3 The antiferromagnetic film contains at least one selected from the group consisting of Ta, Hf, Nb, Si, Al, W, Zr, Ga, Be, In, Sn, V, Mo, Os, Cd, Zn, N, Cr and Ni. Thus, corrosion resistance can be improved. Although the antiferromagnetic film of R and Mn has a far better corrosion resistance than those of the conventional antiferromagnetic films of FeMn, the addition of these elements can more improve corrosion resistance.

(2) At least part of the antiferromagnetic film has a face centered tetragonal crystal structure or a body-centered cubic crystal structure.

(2)-1 The antiferromagnetic film contains $R_xMn_{100-x}$ (R is at least one element selected from the group consisting of Pt, Ni, Pd and Cr, $40 \leq x \leq 60$).

(2)-2 The antiferromagnetic film contains $(R_xMn_{100-x})_{100-y}Fe_y$ (R is at least one element selected from the group consisting of Pt, Ni, Pd and Cr, $40 \leq x \leq 60$, $0 < y < 30$). If the value of x in (2)-1 and (2)-2 is less than 40 or more than 60, it is not preferable since it is difficult to fonm a fct or bcc crystal structure and since the exchange coupling field decreases. In addition, similar to the fcc crystal structure, the addition of Fe increases the exchange coupling field. However, if the value of y is 30 or more, it is not preferable since corrosion resistance considerably deteriorates.

(2)-3 The antiferromagnetic film contains at least one selected from the group consisting of Ta, Hf, Nb, Si, Al, W, Zr, Ga, Be, In, Sn, V, Mo, Os, Cd, Zn, N, Cr, Au, Ag, Co, Re and Ge. Although the antiferromagnetic film of R and Mn has a far better corrosion resistance than those of the conventional antiferromagnetic films of FeMn, the addition of these elements can more improve corrosion resistance. Furthermore, in (1)-3 and (2)-3, the added amount for the improvement of corrosion resistance is preferably 50 at % or less, more preferably 30 at % or less. If the added amount is more than 50 at %, it is not possible to obtain a sufficient exchange coupling field.

(3) The full width at half maximum intensity of the XRD rocking curve of the antiferromagnetic film is within 15 degree. Thus, the crystallinity is good, and the blocking temperature increases. In addition, among direct resistance effect films, the above described the free layers of a spin valve, a dual spin valve and an artificial lattice, which are sensitive to an external magnetic field, are easy to be soft-magnetized if the layers are similarly oriented.

(4) The <111> axis of the antiferromagnetic film faces in a direction perpendicular to the plane of the film. If the free layer, which is sensitive to an external magnetic field, among the direct resistance effect films is similarly oriented, it is easy to be soft-magnetized similar to (3).

(5) The lattice matching between the antiferromagnetic layer and the first layer or the under layer is −6% or more and 15% or less.

FIGS. 2 and 3 show the crystal structures, lattice constants, nearest neighbor atomic distances in plane (111) of materials capable of being used as the antiferromagnetic film and the under layer, respectively.

Comparing the nearest neighbor atomic distances in FIGS. 2 and 3, it can be seen that if the antiferromagnetic film is made of IrMn, materials other than Rh and Zn, which have a shorter nearest neighbor atomic distance than that of IrMn, can be used for the under layer, and if the antiferromagnetic film is made of PtMn, materials other than Rh, Zn and Ru can be used for the under layer. In addition, it can be seen that if the antiferromagnetic film is made of RhRuMn, all of materials shown in FIG. 2 can be used for the under layer. In addition, with respect to Pb, lattice matching is good when it is three times as large as the nearest neighbor atomic distance of Pb and four times as large as the nearest neighbor atomic distance of the antiferromagnetic film. Furthermore, although the crystal structure of PtMn is the face centered tetragonal (fct) structure, it has the face centered cubic (fcc) structure in as-depo. Therefore, it is also considered that a part of the crystal structure has the fcc structure after heat treatment.

Thus, since a material, at least part of which has the fcc crystal structure, is selected as the antiferromagnetic film, a material having the fcc crystal structure or hexagonal closest packing (hcp) structure is selected as the under layer in view of the matching of the crystal structure. In addition, although the antiferromagnetic film of CrMn has the body-centered cubic structure, it is a material wherein the plane (110) and so forth are easy to epitaxially grow on the under layer of the fcc crystal structure.

It was also found by the study of the inventor that with respect to Au of the materials shown in FIG. 3, the value of MR ratio increases by about 1%, and the change in resistance (ΔRs) increases by about 0.2 ohms, in comparison with a monolayer film of only Cu.

Furthermre, the laminated film and alloy film of the under layer may be formed of Au, Ta/Au, Au/Pt, Ag/Au, Ag/Pd/Au, Ta/Au/Ag, Ti/AuAg or the like unless the films have a high MR ratio. In addition, the alloy film and laminated film, which contain Cu, such as AuCu and Cu/Au, contain, e.g., Au, which has a greater nearest neighbor atomic distance than that of the antiferromagnetic film, in addition to Cu. Therefore, if the conditions on the epitaxial growth and alloying of Cu are met, the nearest neighbor atomic distance is longer than that of the antiferromagnetic film, so that the under layer can be formed of Cu.

In addition, in order to obtain a low interlayer coupling, Ru, Ta/Ru, Rh/Ru, Cr/Ru, Ru/Rh/Ru, Ta/Rh/Ru, Ti/RhRu or the like may be used. Moreover, in order to obtain both of a high MR ratio and a low interlayer coupling, Ru/Au, Ta/Ru/Au, Rh/Ag, Au/Ru, Ta/Pd/Ru, Ti/RuRh/Au or the like may be used.

When the under layer is produced, the film may be deposited using an alloy target, or a laminated film of different kinds of single metals may be formed to be heat-treated and diffused to be alloyed. In addition, since the nearest neighbor atomic distance varies in accordance with thin-film deposition conditions, such as the deposition rate, the gas pressure, the bias deposition and the deposition machine, the nearest neighbor atomic distances may be different even if the same element is used. Moreover, the nearest neighbor atomic distance may vary in accordance with the form of lamination with respect to a different kind of metal.

The thickness of the under layer may be in the range wherein the shunt current of the sense current occurs and the MR ratio does not decrease, and it is preferably 10 nm or less. Since the materials of noble metals used for the under layer have a low value of resistance, the shunt current of the sense current occurs to decrease the MR ratio if the thickness exceeds 10 nm. However, if the under layer is too thin, the flatness thereof deteriorates, so that the thickness is preferably 0.5 nm or more.

As described above, at least part of the antiferromagnetic film is formed of a material having the fcc crystal structure, the fct crystal structure or the bcc crystal structure. These crystal structures include a structure which is epitaxially grown with the under layer to be dragged to be distorted and wherein the lattice constants a, b and c are not the same.

A part of the antiferromagnetic film of the fcc structure may be a ordered phase. Since the above described antiferromagnetic material has a high Neel point, it has a high blocking temperature, so that the reliability is enhanced and the exchange coupling field is also increased. Therefore, the ordered phase preferably exists. The antiferromagnetic film of the fct structure has the fcc structure in as-depo to exhibit no exchange coupling field. However, if the antiferromagnetic film of the fct structure is heat-treated in a magnetic field on or over 230° C., it is transformed to the fct structure to exhibit a good exchange coupling field.

When the antiferromagnetic film is produced, if it is deposited using an alloy target which has the composition of the antiferromagnetic film and which has an oxygen content of 0.5 wt % or less, the concentration of oxygen incorporated into the film decreases, so that it is possible to produce the thin-film while the controllability of the quality thereof is good.

In the case of the fcc structure, the thickness of the antiferromagnetic film is preferably 15 nm or less, more preferably 10 nm or less. Inthe case of the fct structure or the bcc structure, the thickness of the antiferromagnetic film is preferably 30 nm or less, more preferably 20 nm or less. If the thickness increases, the shunt current of the sense current occurs to decrease the MR ratio. The matching of the nearest neighbor atomic distances between the antiferromagnetic film and under layer (the difference of the nearest neighbor atomic distances) is preferably −6% or more and 15% or less in order to obtain sufficient exchange coupling field characteristics without producing great crystal distortion.

The ferromagnetic film used for the exchange coupling film of the present invention is preferably formed as follows.
(1) The ferromagnetic film is formed of Co or a Co alloy.
(2) The ferromagnetic film is formed of at least one of Fe, Co and Ni, and has the face centered cubic structure or the hexagonal closest packing crystal structure. The construction of the free layer of the spin valve film may be a laminated substance of CoFe/NiFe/CZN or CoFe/NiFe (including the construction wherein the interface is formed of CoFe), or a simple substance of CoFe or NiFe.

Third and fourth elements, such as Au, Ir, Pd and Pt, are preferably added to these ferromagnetic metal alloys, in order to improve magnetic characteristics and achieve the good lattice matching with the antiferromagnetic film of RMn.

Among the above described ferromagnetic films, the Co or Co alloy ferromagnetic film is preferable. When the magnetoresistive element is used, the MR ratio of the Co or Co alloy ferromagnetic film is higher than that of the NiFe ferromagnetic film.

Moreover, when the magnetoresistive element is used, Ni in the NiFe ferromagnetic material is a homogeneous solid solution system with Cu used for the non-magnetic layer, so that diffusion occurs due to a temperature rise of about 200° C. during the production of a magnetic head to deteriorate the MR ratio.

On the other hand, Co in the Co or Co alloy ferromagnetic film is a non-solid solution system with Cu, so that it is possible to obtain the original MR ratio by heat treatment in a magnetic field even at a temperature rise of 350° C. during the production of a magnetic head.

In addition, a system wherein the Co or Co alloy ferromagnetic film is put on the interface to Cu, or a ferromagnetic wherein Fe is put on the interface between a ferromagnetic film of Co or Co alloy and the antiferromagnetic film may be used. There are some cases where the increase of the concentration of Fe increases the exchange coupling field. Specifically, when the concentration of Fe increases to about 10%, the exchange coupling field is increased by about 1.5 times.

The ferromagnetic film may be a microcrystal or amorphous film.

At least part of each of the ferromagnetic film and the dntiferromgnetic film may be laminated to be exchange coupled.

According to a fourth aspect of the present invention, an exchange coupling film is formed on, e.g., a substrate, using a well-known method, such as the vapor deposition method, the sputtering method and the MBE method. In order to apply a unidirectional anisotropy to the connection of the antiferromagnetic film to the ferromagnetic film, the deposition and heat treatment may be carried out in a magnetic field. Moreover, heat treatment is effective to produce a ordered phase.

While the under layer has been described as a under layer of the antiferromagnetic film, it is considered that an under layer of a certain layer is a under layer even in each of layers of a spin valve film. It is also important to select the composition in view of the lattice matching with the respective layers.

The substrate should not be particularly limited to amorphous substrates, such as glasses and resins, single crystal substrates, such as Si, MgO, $Al_2O_3$, $Al_2O_3$—TiCS: and ferrite substrates, oriented substrates, and sintered substrates.

Moreover, in the exchange coupling film according to the fourth aspect of the present invention, if an electrode for passing a current through at least the ferromagnetic film is formed of, e.g., Cu, Ag, Au, Al or an alloy thereof, it is possible to easily obtain the magnetoresistive element of the present invention. The electrode may directly contact the ferromagnetic film or contact the ferromagnetic film via the antiferromagnetic film.

The magnetoresistive elements according to the first through third aspects of the present invention are preferably the following examples.
(1) The first pinned layer using the ferromagnetic film on the upper part of the antiferromagnetic film is arranged and the free layer using the ferromagnetic film on the upper part of the first pinned layer is arranged.
(2) The second pinned layer using the exchange coupling film is arranged on the upper part of the free layer.
(3) The ferromagnetic film is a laminated structure of a first ferromagnetic film/a non-magnetic film/a second ferromagnetic film.

If the magnetic head according to the fourth aspect of the present invention is as follows, it is possible to achieve a writing/readg integrated magnetic head.
(1) It comprises a read head using the magnetic head according to the fourth aspect of the present invention, a lower magnetic pole in common with the upper magnetic shield layer of the read head, a write magnetic gap formed on the lower magnetic pole, and an upper magnetic pole formed on the write magnetic gap.

If such a magnetic head is used, it is possible to achieve a magnetic disk drive for reading magnetic information recorded on a magnetic disk.

Thus, the magnetoresistive element of the present invention can be applied to various devices using the magnetoresistive element, such as a magnetic field detecting sensor, the above described read magnetic head, the above described writing/reading integrated magnetic head and a magnetic memory.

According to the fifth aspect of the present invention, the galvano magnetic fields applied to the pinned layer and the magnetization adjusting layer is adjusted so as to have appropriate values, respectively. The layers for substantially producing a galvano magnetic field in a target one pinned layer are four layers which include another pinned layer, two spacer layers and a free layer. On the other hand, the layers for substantially producing a galvano magnetic field in a magnetization adjusting layer connected to the pinned layer are six layers which include another magnetization adjusting layer, two spacer layers, a free layer, and two pinned layers. The ratio of the galvano magnetic field applied to the pinned layer, to the galvano magnetic field applied to the magnetization adjusting layer is equal to the ratio of the inverse number of the value of resistance of the former four layers to the inverse number of the value of resistance of the latter six layers.

As the ratio of the resistance of the former four layers to the latter six layers increases, the magnetic field for the magnetization adjusting layer can increase. Therefore, it is possible to decrease the thickness of the magnetization adjusting layer and it is possible to prevent the output from being deteriorated by the shunt current. Therefore, this ratio may be more than 1.1.

In the fifth aspect of the present invention, the structure, which does not produce the ESD, is preferably a structure wherein Ta/Au/IrMn/CoFe/Ru/CoFe/Cu/CoFe/Cu/CoFe/Ru/CoFe/IrMo/Ta are laminated on amorphous alumina in that order, in view of the output and the magnetic characteristics of the free layer. If Au having a thickness of 0.8 to 2.2 nm is formed on Ta having a thickness of 3–8 nm, it is possible to improve the orientation (111) of the fcc structure of the whole spin valve film. Thus, it is possible to obtain good soft magnetic characteristics of CoFe free layer. Moreover, IrMn can also obtain a sufficient exchange bias magnetic field and blocking temperature by a thickness of about 5–10 nm. That is, it is possible to minimize the loss of output due to the shunt current. The thickness of the pinned layer and free layer is preferably in the range of from about 1.5 nm to about 3 nm in view of the output. The magnetization adjusting layer may be thin in order to prevent the output from being reduced by the shunt current. It is preferably in the range of from about 0.7 nm to 2 nm as a structure wherein the ESD inversion does not occur. Moreover, a sufficient output can be obtained as the Cu spacer layer being thin. The thickness of the Cu layer may be in the range of about 1.5 nm to about 2.5 nm in order to inhibit the ferromagnetic connected magnetic field, since it is weak against diffusion unless it is thick to some extent.

According to the fifth aspect of the present invention, even if a current flows through the element by the ESD to produce a galvano imgnetic field, the magnetization of the pinned layer is inverted since it is stabilized by the magnetization adjusting layer. Therefore, it is not required to consider the inversion of the pinned layer due to the ESD.

Acording to the sixth aspect of the present invention, in the magnetoresistive element having a spin valve film, which comprises a first pinned layer, a free layer, and a second pinned layer, which are ferromagnetic and which are laminated in that order so as to be separated from each other by first and second non-magnetic spacer layers, the magnetizing directions of the first and second pinned layers being fixed to be the same direction, and the magnetizing direction of the free layer being capable of changing in accordance with an external magnetic field, one of the first pinned layer and the second pinned layer has a ferromagnetic magnetization adjusitng layer which is antiferromagnetically connected on the opposite side to the spacer layer via an anti-parallel connection film. In addition, when a current flows through the magnetoresistive element to produce a galvano magnetic field, the product of the saturation magnetization of the magnetization adjusting layer by the thickness thereof multiplied by the galvano magnetic field is greater than that of the pinned layer connected thereto.

In the magnetoresistive element having the spin valve film according to the sixth aspect of the present invention, one of the first and second pinned layers has a ferromagnetic magnetization adjusting layer which is antiferromagnetically connected on the opposite side to the spacer layer via an anti-parallel connection film, and a value obtained by dividing the product of the saturation magnetization of the magnetization adjusting layer by the thickness thereof, by the product of the saturation magnetization of the pinned layer connected thereto by the thickness thereof is set to be 0.6 or more.

According to the seventh aspect of the present invention, in the magnetoresistive element having a spin valve film, which comprises a first pinned layer, a free layer, and a second pinned layer, which are ferromagnetic and which are laminated in that order so as to be separated from each other by first and second non-magnetic spacer layers, the magnetizing directions of the pinned layers being fixed to be the same direction, and the magnetizing direction of the free layer being capable of changing in accordance with an external magnetic field, the first pinned layer has a first ferromagnetic magnetization adjusting layer which is antiferromagnetically connected on the opposite side to the first spacer layer via an anti-parallel connection film, and the second pinned layer has a second ferromagnetic magnetization adjusting layer which is antiferrcmagnetically connected on the opposite side to the second spacer layer via an anti-parallel connection film. In addition, when a current flows through the magnetoresistive element to produce a galvano magnetic field, the product of the saturation magnetization of the magnetization adjusting layer by the thickness thereof multiplied by the galvano magnetic field is greater than that of the pinned layer in one of between the first pinned layer and the first magnetization adjusting layer and between the second pinned layer and the second magnetization adjusting layer, and less than that of the pinned layer in the other.

According to the fifth aspect of the present invention, in the magnetoresistive element having a spin valve film, the first pinned layer has a first ferromagnetic magnetization adjusting layer which is antiferromagnetically connected on the opposite side to the first spacer layer via an anti-parallel connection film, and the second pinned layer has a second ferromagnetic magnetization adjusting layer which is antiferromagnetically connected on the opposite side to the second spacer layer via an anti-parallel connection film. In addition, a value obtained by dividing the product of the saturation magnetization of the magnetization adjusting layer by the thickness thereof is 0.6 or less in one of between the first pinned layer and the first magnetization adjusting layer and between the second pinned layer and the second magnetization adjusting layer, and 1 or more in the other.

According to the sixth and seventh aspects of the present invention, the magnetizing direction of one of the pinned layers can be the same as the direction of the galvano magnetic field, and the magnetizing direction of the other of the magnetization adjusting layers can be the same as the direction of the galvano magnetic field, so that the directions of the galvano magnetic fields in the two pinned layers are opposite directions to each other when a current flows through the magnetoresistive element. By utilizing this, the two pinned layers can be arranged in the same direction. Therefore, even if the pinned layer of the dual spin valve film is inverted by the ESD, it is possible to immediately modify the inversion by passing the current through the element.

According to the twelfth aspect of the present invention, the magnetic recording device having the magnetoresistive element has a circuit for fixing the directions of the pinned layers serving as the first and third layers to be the same direction by passing the current through the magnetoresistive element.

According to the twelfth aspect of the present invention, the magnetic recording device has the magnetoresistive element having the dual spin valve element capable of modifying the inversion of magnetization of the pinned layer by the galvano magnetic field, and a current circuit for modifying the inversion of magnetization of the pinned layer. Therefore, similar to the conventional spin valve element, the inversion of magnetization of the pinned layer can be modified, and the advantages of the dual spin valve element, in that the output is great and so forth, can be applied to a magnetic recording device.

According to the thirteenth aspect of the present invention, in the magnetic recording device having the dual spin valve element, the saturation magnetization and thickness of the magnetization adjusting layer are selected so as to cancel the sum of the magnetostatic bias magnetic field applied to the free layer and the interaction magnetic field applied to the magnetic free layer.

In the twelfth and thirteenth aspects of the present invention, the difference between the total of the products of the saturation magnetizations of the pinned layer by the thicknesses thereof, and the total of the products of the saturation magnetizations of the magnetization adjusting layer by the thicknesses thereof, is preferably 1 nm·T or more and 5 nm·T or less.

According to the fourteenth aspect of the present invention, in the magnetoresistive element, the whole magnetostatic bias magnetic field can not be only decreased by canceling the magnetostatic bias magnetic field from the pinned layer in the free layer, by the magnetostatic bias magnetic field to the free layer, but the ferromagnetic exchange interaction magnetic field applied to the free layer from the pinned layer via the magnetostatic bias magnetic field and the spacer layer can be also canceled, so that the whole bias magnetic field of the free layer can be decreased. Therefore, even if the spacer layer decreases to increase the ferromagnetic exchange interaction, the bias magnetic field can be canceled, so that the symmetric property of the output of the magnetoresistive element with respect to the positive and negative magnetic fields can be improved.

In the magnetoresistive element of the present invention, Mn antiferromagnetic materials of IrMn, PtMn, PdPtMn, RhMn, RhRuMn, RuMn, FeMn, NiMn and so forth can be used as the exchange bias layer connected to the magnetization adjusting layer.

Also, in the magnetoresistive element of the present invention, at least one layer of the pinned layer and the magnetization adjusting layer may be formed of a hard magnetic material.

The magnetoresistive element of the present invention can have excellent characteristics when the product of the saturation magnetization of the free layer by the thickness thereof is 4.5 nm·T or less.

These techniques can be applied to magnetic random access memories (MRAMs).

According to the first aspect of the present invention, in a magnetoresistance effect head using a giant magnetoresistance effect film having at least one pair of pinned layers and free layers which are arranged via a non-magnetic spacer layer, the pinned layer has a pair of ferromagnetic layers which have different coercive forces and which are antiferromagnetically connected to each other via a connection layer, and the effective exchange coupling field $H_{ef}$ of the pinned layer is set to be 200 Oe or more at room temperature.

The preferred embodiments according to the above described first through fifth aspect of the present invention will be described in detail below.

(First Preferred Embodiment)

Figure 4:
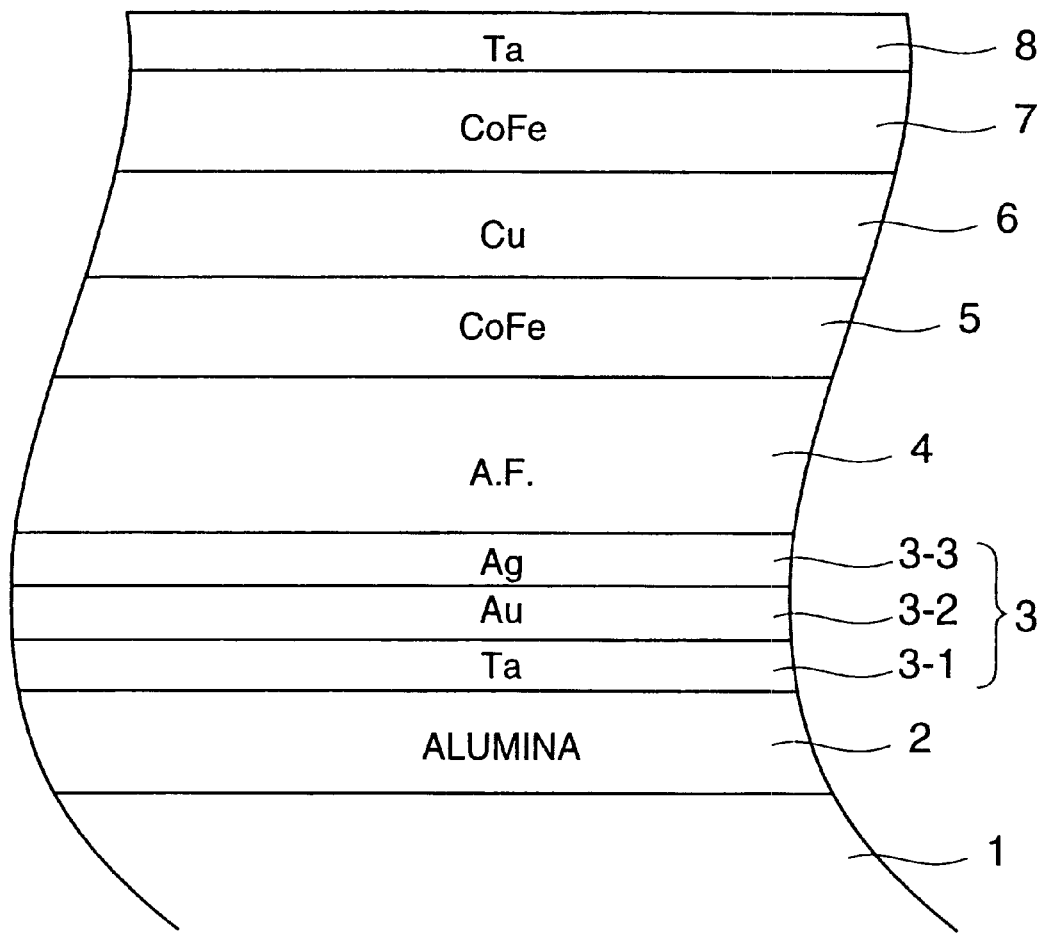
FIG. 4 is a schematic sectional view of the first preferred embodiment of an exchange coupling film according to the present invention.

FIG. 4 is a schematic sectional view of the first preferred embodiment of a spin valve film according to the present invention.

In FIG. 4, reference number 1 denotes a substrate of $Al_2O_3$; TiC/Si or the like. On the substrate 1, an alumina film serving as a gap film 2 having a thickness of about 100 nm is formed. On the gap film 2, a under layer 3 is formed. The under layer 3 has a laminated structure of, e.g., Ag film 3-3 (thickness: about 1 nm)/Au film 3-2 (thickness: about 1 nm)/Ta film 3-1 (thickness: about 5 nm). While Ta has been herein used, no Ta may be used. On the under layer 3, there are laminated an antiferromagnetic film 4 of IrMn or the like having a thickness of about 5 to 10 nm, a pinned layer 5 serving as a ferromagnetic film of CoFe having a thickness of about 2 to 3 nm, a non-magnetic layer 6 of Cu having a thickness of about 2 to 3 nm, a free layer 7 serving as a ferromagnetic film of CoFe having a thickness of about 2 to 5 nm, and a protective film 8 of Ta having a thickness of about 5 nm.

The under layer 3 may have a laminated structure of a monolayer film, a double-layer film, a triple-layer film or more. The under layer 3 does not only have a laminated structure of a single metal, but it may also have a laminated structure of an alloy film or a single film of an alloy film. While the under layers of ①-1 and ①-2 have been herein used, the under layers of ②-1, ②-2 and ②-3 may be used.

The free layer 7 may be formed of a laminated substance of NiFe/CoFe (including the structure wherein the interface is formed of CoFe).

The protective layer 8 acts as a distortion control layer for the underlying layers. The protective layer 8 may be formed of a metal film of Ta, Ti, Au, Ac, Pd, Cu, Ru or the like. It may be a laminated film of single metal, or an alloy film.

The protective film 8 is formed in view of the lattice matching with the free layer 7, which supports a under layer of the protective film 8, and in view of the compatibility with the under layer, so that the protective film 8 supports a cap layer.

The compositions of the respective layers may be changed in view of the lattice matching with the under layers thereof. For example, the pinned layer 5 may have an Fe rich composition, or an Fe single layer may be sandwiched in the interface between the antiferromagnetic film 4 and the pinned layer 5.

The foregoing may be applied to the following preferred embodiments.

According to this preferred embodiment, it is possible to obtain a thin antiferromagnetic film, which has a sufficient exchange coupling field between the antiferromagnetic film and the ferromagnetic film, a high MR ratio, a low interlayer coupling, and an excellent thermal stability. Thus, such an antiferromagnetic film can obtain a stable output voltage over a long period of time.

(Second Preferred Embodiment)

Figure 5:
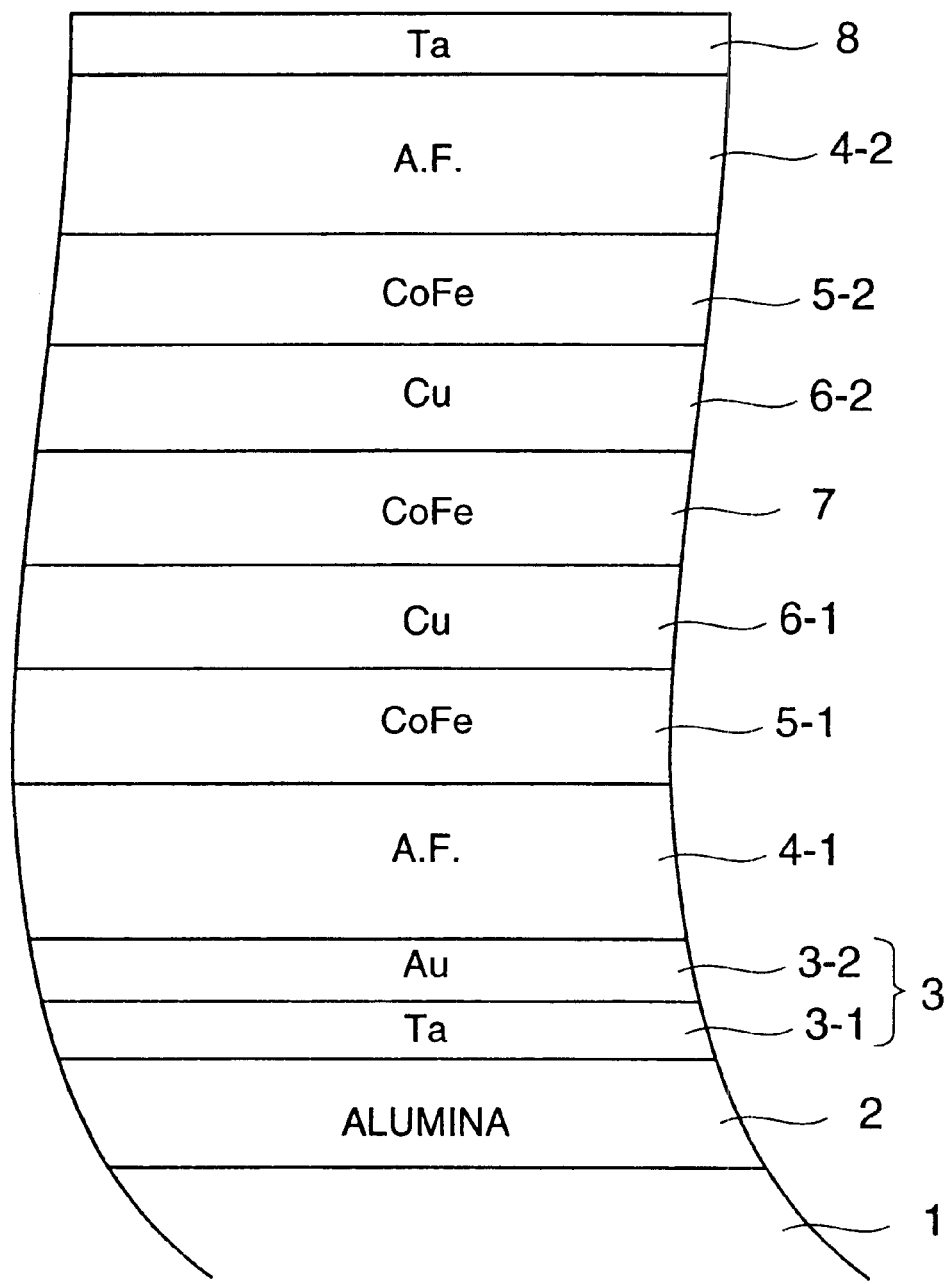
FIG. 5 is a schematic sectional view of the second preferred embodiment of an exchange coupling film according to the present invention.

FIG. 5 is a schematic sectional view of the second preferred embodiment of a spin valve film according to the present invention. The difference between the second preferred embodiment and the first preferred embodiment is that pinned layers 5-1 and 5-2 are formed on the upper and lower sides of a free layer 7 via non-magnetic layers 6-1 and 6-2, and an antiferromagnetic layer 42 is also formed on the upper pinned layer 5-2. As an example of an under layer 3, a laminated structure of two layers of Au film 3-2 (thickness: 2 nm)/Ta film 3-1 (thickness: 5 nm) is used herein.

An interface layer may be inserted below the antiferromagnetic film 4-2 in view of the lattice matching, or the composition of the pinned layer 5-2 may be changed. Both of the antiferromagnetic films 4-1 and 4-2 may be the same antiferromagnetic films, or different antiferromagnetic films.

In the case of the second preferred embodiment, since the two pinned layers are provided, it is possible to obtain a high MR ratio, in addition to the advantages obtained in the first preferred embodiment.

(Third Preferred Embodiment)

Figure 6:
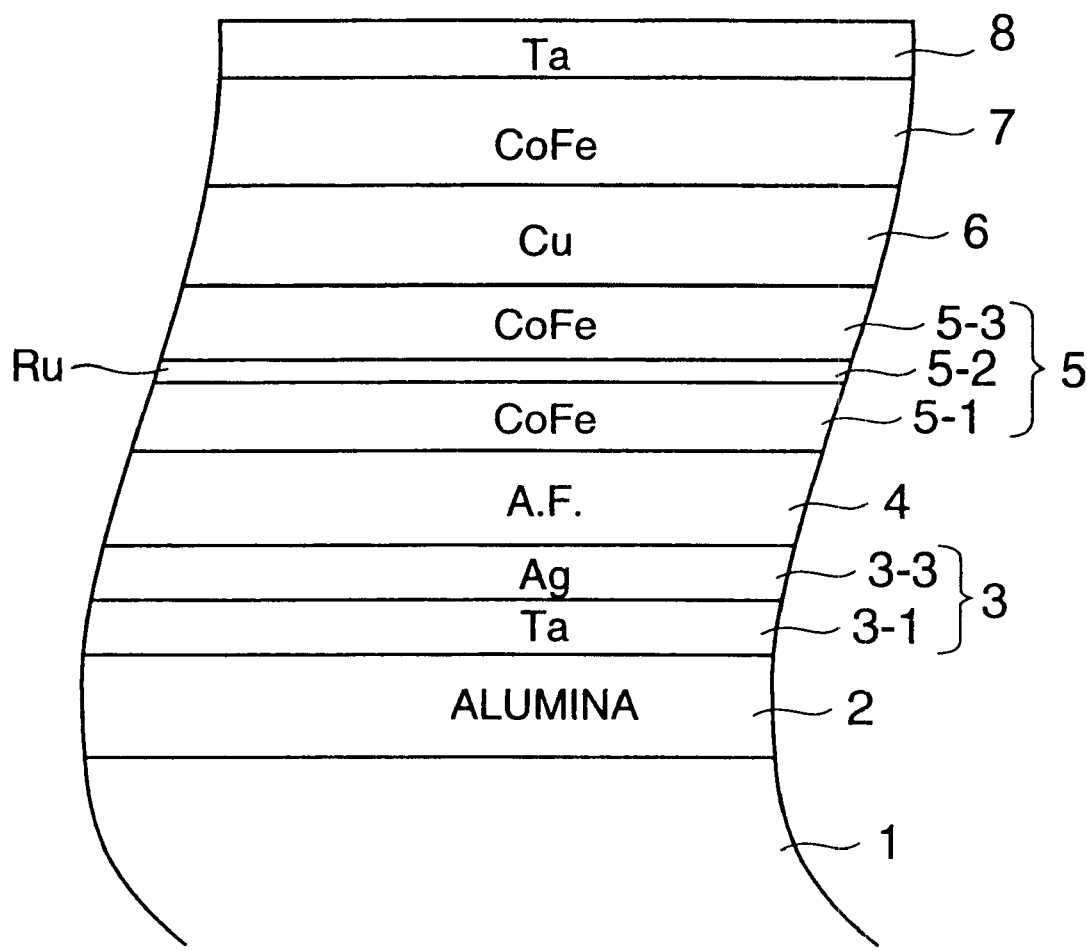
FIG. 6 is a scheatic sectional view of the third preferred embodiment of an exchange coupling film according to the present invention.

FIG. 6 is a schematic sectional view of the third preferred embodiment of a spin valve film according to the present invention.

The difference between the third preferred embodiment and the first preferred embodiment is that the pinned layer 5 has a laminated structure of CoFe film 5-3 (thickness: about 1.5~3 nm)/Ru film 5-2 (thickness: about 0.7~1.2 nm)/CoFe film 5-1 (thickness: about 1.5~3 nm). As an example of a under layer 3, Ag film 3-3 (thickness: about 2 nm)/Ta film 3-1 (thickness: about 5 nm) is used herein.

The laminated structure of the pinned layer 5 is a triple-layer structure of CoFe/M/CoFe (Synthetic Antiferro. which will be hereinafter referred to as SyAF). In this laminated structure, Co, a Co alloy, an NiFe alloy, Ni, Fe or the like may be used in place of CoFe. In addition, Ru, Cr, Ag, Cu, V, Re, W, Rh, Ir, Nb, Mo, Ta or the like may be used as M.

The SyAF is characterized in that both of the ferromagnetic films are antiferromagnetically coupled via M. The CoFe film 5-1 laminated on the antiferromagnetic film 4 does not contribute to the magnetoresistance effect.

The change of MsT of both of the SyAF ferromagnetic films is useful for the design of a bias point and so forth. In order to change MsT, the thickness of T may be changed, or the composition of both of the ferromagnetic films may be changed to change Ms. For example, various combinations, such as Co (AF side)/M/$Co_{90}F_{10}$ or $Co_{80}Fe_{20}$ (AF side)/M/$Co_{90}Fe_{10}$, may be used.

In the case of the third preferred embodiment, since the pinned layer is formed of the SyAF, it is possible to reduce the magnetic field leaking out of the pinned layer, in addition to the advantageous obtained in the first preferred embodiment As a result, it is possible to obtain advantages in that a thin free layer can be designed, a bias point can be designed, and a good thermal stability for the MR ratio can be obtained.

(Fourth Preferred Embodiment)

Figure 7:
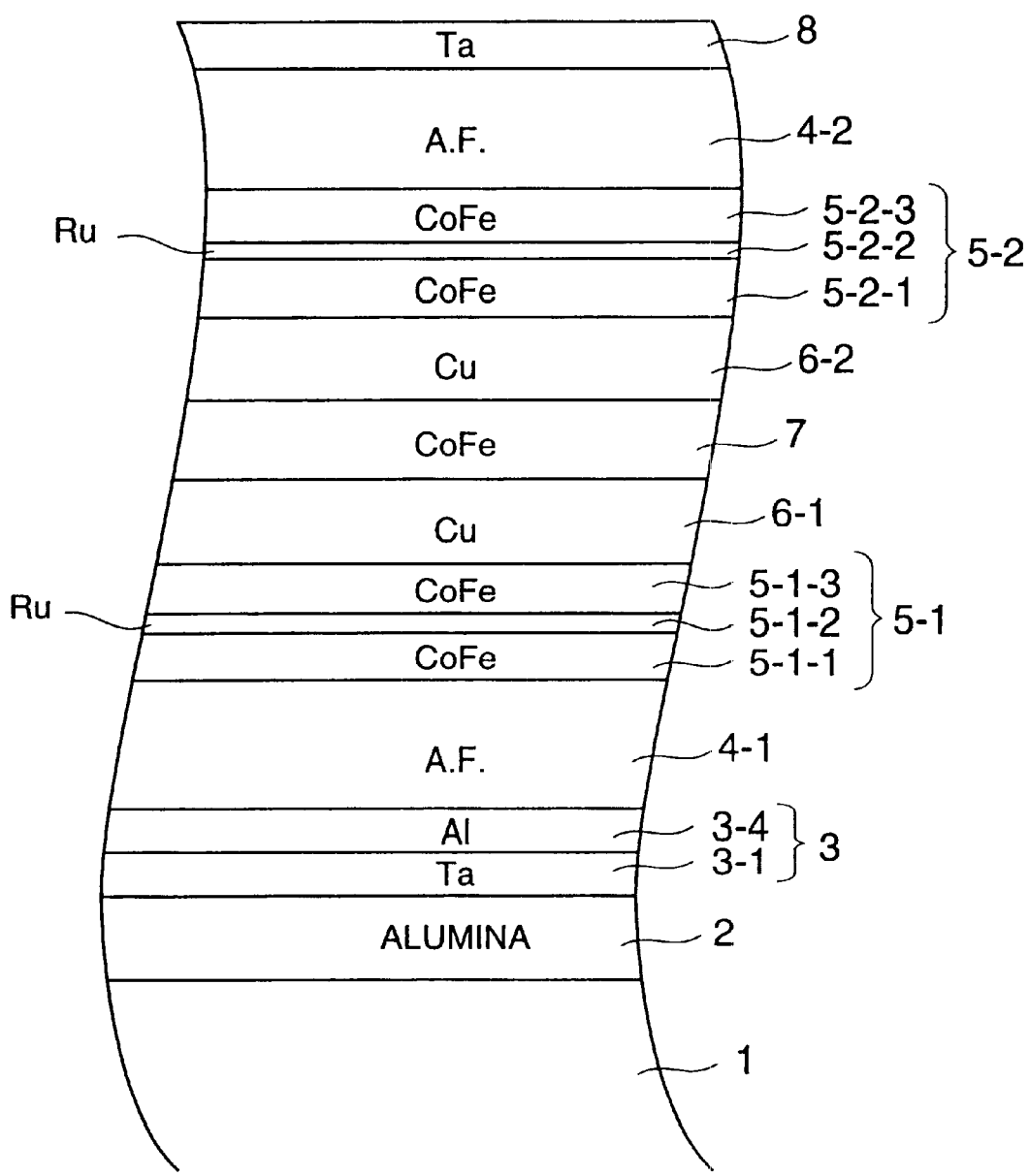
FIG. 7 is a schematic sectional view of the fourth preferred embodiment of an exchange coupling film according to the present invention.

FIG. 7 shows a schematic sectional view of the fourth preferred embodiment of a spin valve film according to the present invention. The fourth preferred embodiment is a combination of the second preferred embodiment with the third preferred embodiment. As an example of an under layer 3, a laminated structure of Al film 3-4 (thickness: about 2 nm)/Ta film 3-1 (thickness: about 5 nm) is used herein.

In the case of the fourth preferred embodiment, M also supports an orientation plane changing film. Specifically, the films from the bottom of the laminated structure to the CoFe film 5-2-1 can be oriented to the plane (111), and the orientation plane can be controlled on the Ru film 5-2-2 serving as M so that the films above the CoFe film 5-2-3 on the Ru film 5-2-2 have the orientation of the plane (110). The material of M is determined by the lattice matching, the orientation and so forth. In this case, the orientation of the M itself may be changed, or the orientation plane may be changed by changing the films above the M to ferromagnetic films which are easy to have an orientation other than the orientation (111).

In the case of the fourth preferred embodiment, it is possible to obtain advantages including the combination of the advantages in the first, second and third preferred embodiments.

(Fifth Preferred Embodiment)

The spin valve film in the above described preferred embodiment is provided with electrodes, and upper and lower magnetic shield layers, upper and lower read magnetic gaps and so forth are laminated on the magnetoresistive element to obtain a read magnetic head. In addition, it is possible to prepare a write/read integrated magnetic head wherein a writing part is laminated on a reading part.

Figure 8:
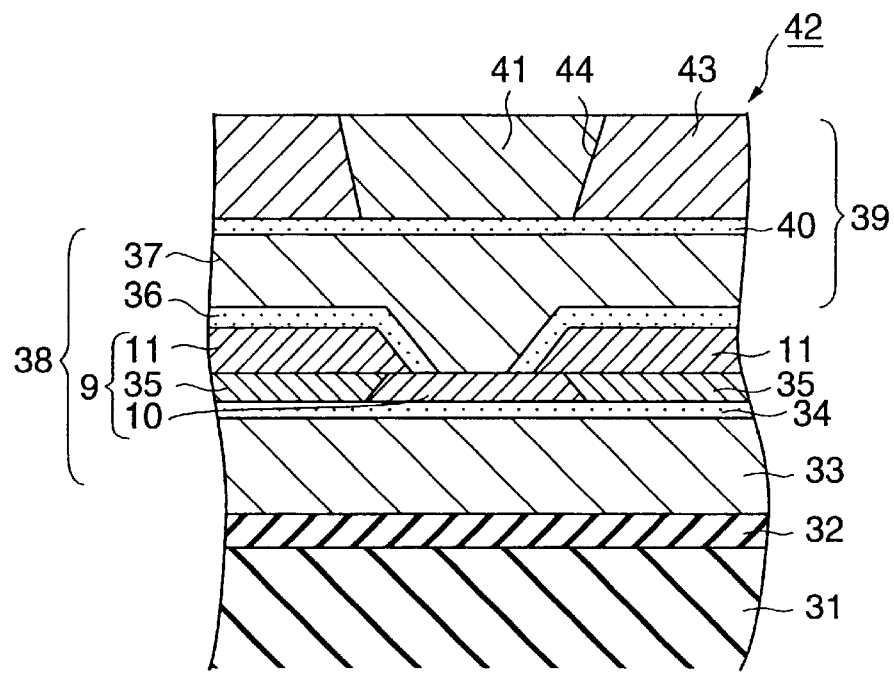
FIG. 8 is a sectional view of the fifth preferred embodiment of a writing/reading integrated magnetic head according to the present invention.

FIG. 8 is a sectional view of the fifth preferred embodiment of a writing/reading integrated magnetic head wherein the exchange coupling film of the present invention is used as a magnetoresistive element which is applied to a reading magnetic head.

In FIG. 8, reference number 31 is a substrate of $Al_2O_3$; TiC or the like. On the substrate 31, an insulator film 32 of $Al_2O_3$ or the like, a lower magnetic shield layer 33 of a soft magnetic material, and a lower read magnetic gap 34 of a non-magnetic insulator film of $Al_2O_3$ or the like are laminated in that order.

On the lower read magnetic gap 34, a magnetoresistive element 9 is formed. The magnetoresistive element 9 comprises: a spin valve film 10 which is formed on the lower read magnetic gap 34 and which uses an exchange coupling film of the present invention; a hard magnetic film 35 which is formed on both sides of the spin valve film 10 in the vicinity thereof and which is made of a CoPt alloy or the like for applying a bias magnetic field to the spin valve film 10; and a pair of electrodes 11 formed on the hard magnetic film 35.

On the magnetoresistive element 9, an upper magnetic read gap 36 of a non-magnetic insulator film of $Al_2O_3$ or the like is formed. moreover, an upper magnetic shield layer 37 is formed thereon. Thus, a shield type magnetic head 38 serving as a read head is formed.

On the magnetic head 38, a write head of an induction type thin-film magnetic head 39 is formed. The upper magnetic shield layer 37 also supports a lower writing magnetic pole of the induction type thin-film magnetic head 39. On the upper magnetic shield layer 37 also serving as the lower writing magnetic pole, a write magnetic gap 40 of a non-magnetic insulator film of $Al_2O_3$ or the like, and an upper writing magnetic pole 41 patterned so as to have a predetermined shape, are laminated in that order.

The upper writing magnetic pole 41 is embedded in a trench 44 formed in an insulator layer 43.

A writLngJreading integrated magnetic head 42 is formed by the shield type magnetic head 38 and the induction type thin-film magnetic head 39.

In this preferred embodiment, since the magnetic head uses the magnetoresistive element of the present invention, it is possible to obtain a good exchange coupling field and to obtain a stable output voltage over a long period of time.

(Sixth Preferred Embodiment)

Figure 9:
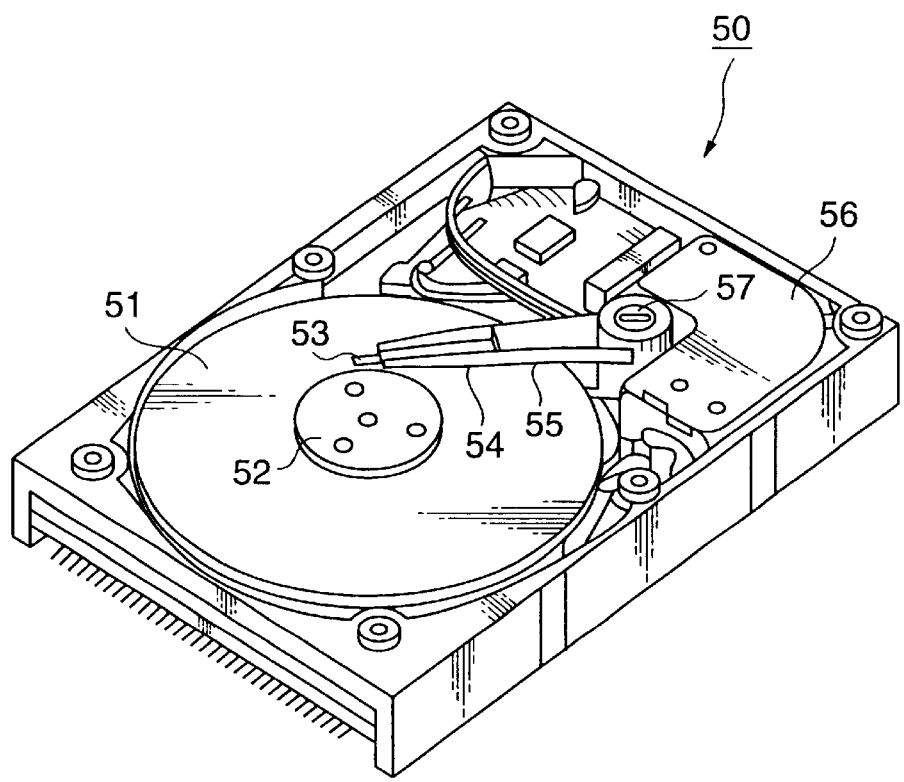
FIG. 9 is a perspective view of the sixth preferred embodiment of a magnetic recording device according to the present invention.

The writing/reading integrated magnetic head in the fifth preferred embodiment is incorporated in a head slider, which is mounted in a magnetic recording device, such as a magnetic disk drive shown in FIG. 9. FIG. 9 shows a schematic structure of a magnetic disk drive 50 using a rotary actuator serving as the sixth preferred embodiment of the present invention.

In the drawing, a magnetic disk 51 is mounted on a spindle 52 to rotate by a motor (not shown) responding to a control signal outputted from a drive unit control source (not shown). A head slider 53 for writing and reading information while the magnetic disk 51 is floating is mounted on the tip of a thin-film suspension 54. The head slider 53 has a writing/reading integrated magnetic head which is shown in, e.g., the fifth preferred embodiment.

When the magnetic disk 51 rotates, the medium facing surface (ABS) of the head slider 53 is held so as to be separated from the magnetic disk 51 by a predetermined floating amount.

The suspension 54 is connected to one end of an actuator arm 55 having a bobbin part for holding a driving coil (not shown) and so forth. On the other end of the actuator arm 55, a voice coil motor 56, which is a kind of a linear motor, is provided. The voice coil motor 56 comprises: a driving coil Knot shown) wound onto the bobbin part of the actuator arm 55; and a magnetic circuit comprising a permanent magnet, which is arranged so as to face the coil, and a facing yoke.

The actuator arm 55 is held by two ball bearings (not shown), which are provided above and below a fixed shaft 57, to be rotatable and slidable by the voice coil motor 56.

Examples of the present invention will be described below.

EXAMPLE 1

Using a DC magnetron sputtering system, various combinations of antiferromagnetic films and under layers in the first preferred embodiment were prepared to measure the exchange coupling magnetic field (Hua), the blocking temperature (Th), the magnetoresistance ratio (MR), and the coercive force of the free layer (Hc (free)). The heat treatment of the fcc structure was carried out at 270° C. for 1 hour, and the heat treatment of the fct structure wan carried out at 270° C. for 10 hours. The thickness of CoFe of the pinned layer was 2.5 nm, and the thickness of CoFe of the free layer was 3 nm. Furthermore, a under layer of only Ta was prepared as a comparative example, and the same measurement as Example 1 was carried out.

The results are shown in FIG. 10. In the table, under layers 1, 2, 3 and 4 denote the under layers of the antiferromagnetic film, and are laminated in that order. That is, in the underlying layer having the under layer 4, the under layer 4 contacts the antiferromagnetic film, and in the under layer having the under layer 3 on the uppermost surface, the under layer 3 contacts the antiferromagnetic film. In addition, in the underlying layer having the under layer 2 on the uppermost surface, the under layer 2 contacts the antiferromagnetic film. Furthermore, in the under layer having only the under layer 1, the under layer 1 contacts the antiferromagnetic film.

As can be seen from FIG. 10, the exchange coupling film of the present invention can obtain a great value of exchanging coupling magnetic field at room temperature. As a result, it is possible to sufficiently obtain a greater value than about 200 Oe even at a temperature of 150° C. In addition, the blocking temperature is a practically sufficient temperature, 250° C. or higher, and thermal stability is sufficient, so that it is possible to obtain a stable output voltage over a long period of time.

EXAMPLE 2

Figure 11:
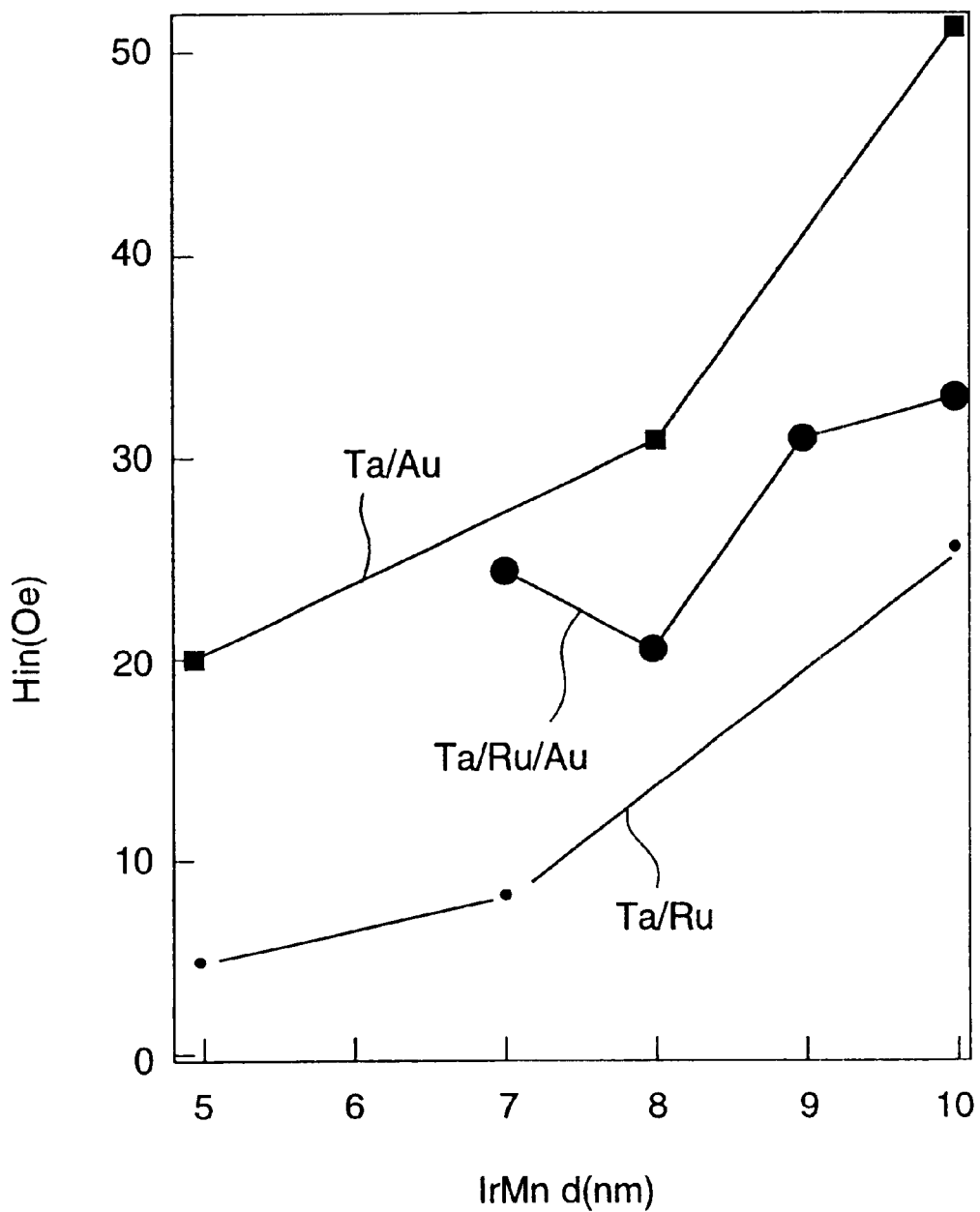
FIG. 11 is a graph showing characteristics in the second preferred embodiment of the present invention.
Figure 12:
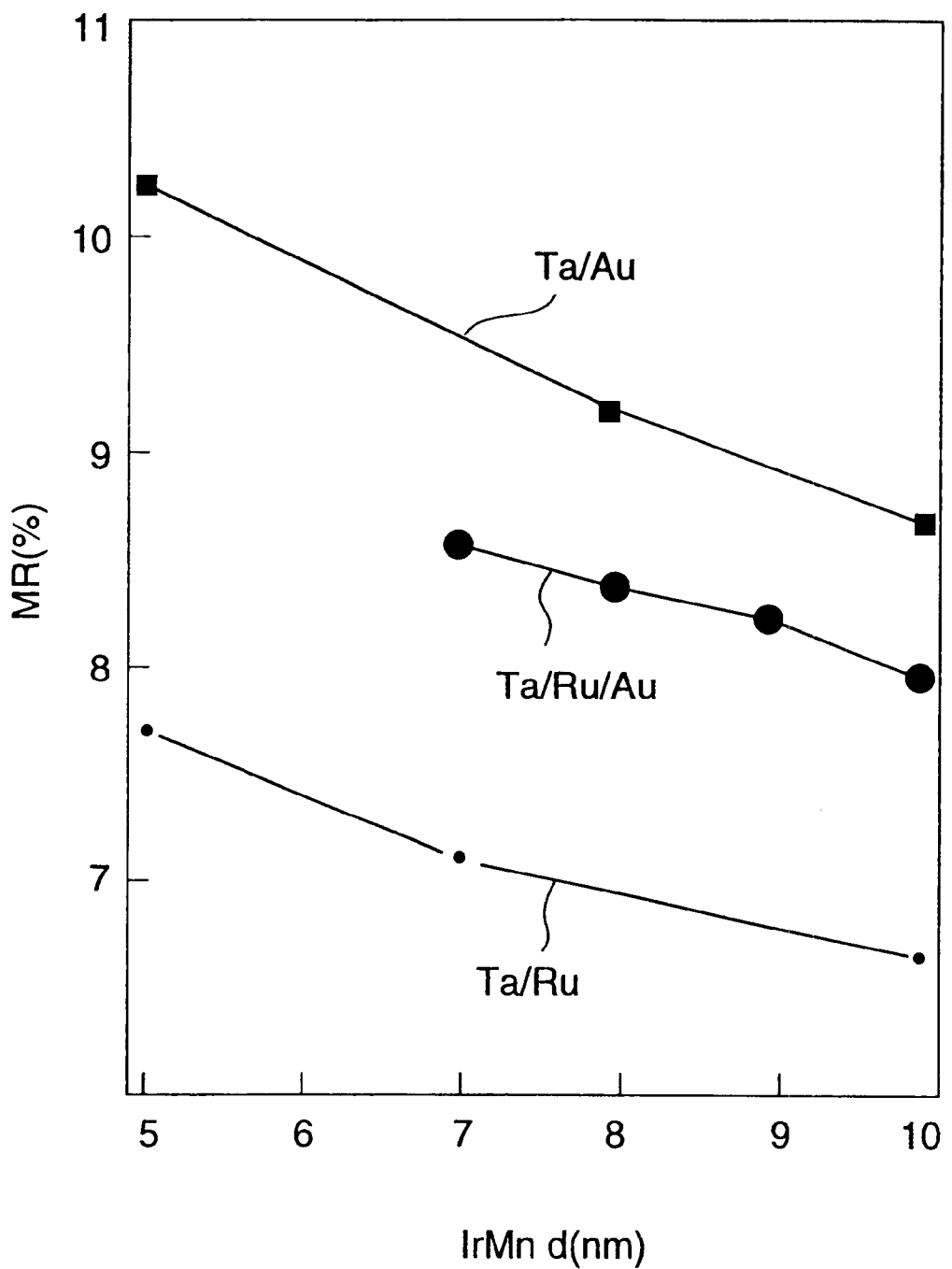
FIG. 12 is a graph showing characteristics in the second preferred embodiment of the present invention.

Using a DC magnetron sputtering system, the combinations of an antiferromagnetic film of IrMn and under layers of Ta (5 nm)/Au (2 nm), Ta (5 nm)/Ru (2 nm) and Ta (5 nm)/Ru (1 nm)/Au (1 nm) in the third preferred embodiment were prepared. With respect to these under layers, the dependencies of the MR ratio and the interlayer coupling on the thickness of IrMn were examined. The construction was under layer/IrMn/CoFe (2 nm)/Ru (0.9 nm)/CoFe (2 nm)/Cu (2 nm)/CoFe (2 nm)/Cu (1.5 nm)/Ta. As the cap layer, Cu was used. The results are shown in FIGS. 11 and 12. FIG. 11 shows the relationship between the thickness d (nm) of IrMn and the interlayer coupling field (Hin). FIG. 12 shows the relationship between the thickness d (nm) of IrMn and the MR ratio in each of the under layers. As can be seen from the drawings, the under layer of Ta/Au has a high MR ratio, and the under layer of Ta/Ru has a low interlayer coupling. Moreover, the under layer of Ta/Ru/Au has a high MR ratio and a low interlayer coupling field. According to the exchange coupling film of the present invention, it is possible to achieve a thin antiferromagnetic film, a high MR ratio and a low interlayer coupling field to obtain a stable output voltage over a long period of time.

As the thickness of the Cu spacer decreases in order to increase the output voltage, the influence of the magnetic interaction (Hin) between the free layer and the pinned layer increases. When the thickness of the Cu spacer is decreased, there is a problem in that the magnetic interaction (Hin) between the free layer and the pinned layer increases basically. In order to adjust the bias point of the head output, the Hin is an important factor, which must be controllable.

The Hin comprises two factors, i.e., the magnetostatic coupling caused by the irregularities of the Cu spacer layer, that is the coherent roughness at upper and lower interfaces and the FM oscillational interaction caused by the confinement of conduction electrons. In order to adjust the Hin to be an appropriate value, there are the following two structural points.

First, since the magnetostatic coupling component is caused by the irregularities of the Cu spacer layer (Neel's orange peel interaction), the flatness of the under layer is important. Therefore, the under layer must be flat as much as possible. Specifically, if the irregularities exist in a period of about 50 nm, the size of the magnetostatic coupling component can not be ignored when the thickness of the Cu spacer is in the practical range of from about 1.8 nm to about 3 nm. Therefore, if the period of irregularities is set to be about 40 nm or less, it is possible to prevent the Hin from being increased by the magnetostatic coupling.

Secondly, the RKKY oscillational interaction is sensitive to the thickness of the Cu spacer, so that the margin of the thickness of the film in the thin-film deposition must be small. In order to decrease the oscillational variation, the thickness of Cu may have an appropriate distribution. Specifically, the standard deviation in thickness may be about 2 A in each of the ranges of about the inplane grain size of the Cu spacer layer or less. Specifically, if the thickness has a normal distribution of standard deviation of about 2 A in a region of an inplane grain size or less, the BKKY oscillational interaction component of the coupling energy can be decreased to about 50% in comparison with the case where the standard deviation of the normal distribution is about 1 A.

Such a film can be produced by forming the Cu spacer on an under layer having irregularities to some extent, or by forming Cu itself so as to form irregularities to some extent.

When the structure is optimized by the under layer, the irregularities of the Cu spacer itself are produced by the irregularities of the under layer, so that the magnetostatic coupling component appears. Since the magnetostatic coupling component is also decreased by the distribution of thickness, it is required to suppress the irregularities contributing to the magnetostatic coupling component. Specifically, if the period of the irregularities is set to be 40 nm or less, the size of the magnetostatic coupling component can be damped to a disregardable size when the thickness of the Cu spacer is in the practical range of from about 2 nm to about 2.5 nm. As a substantial construction, it is effective to form an Ru or Rh layer having a thickness of 0.5 nm or more on at least one of Ta, Ti and Cr layers, or to firm an under layer having a laminated structure of a single metal or alloy layer having the fcc or hcp structure and Ru and Rh layers.

Also, if a non-magnetic metal layer (cap layer) is provided between the free layer and the protective layer, the Hin can be changed. This is caused by the variation in energy of the electron confinement effect, the variation in period of the RKKY oscillation due to the distortion of the lattice, and the suppression of standard deviation of atoms in the protective film. This effect decrease the Hin when Pt, Au, Ag, Ru, Cu are inserted in the interface between the Ta protective film and the Co or Co alloy free layer or the laminated layer of Co or Co alloy and permalloy. In particular, Cu is very effective.

EXAMPLE 3

Using a DC magnetron sputtering system, the spin valve film in the third preferred embodiment was prepared. The antiferromagnetic films of IrMn and PtMn were used. At this time, Ta (5 nm)/Ru (1 nm)/NiFe (1 nm) was used as the under layer. As a result, when NiFe is combined with Ru, it was possible to obtain a low interlayer coupling field of 20 Oe or less and a high MR ratio. In addition, although the interlayer coupling field tends to increase as the thickness of the antiferromagnetic film increases, it was found that the dependence was small in the under layer of Ta (5 nm)/Ru (1 nm)/NiFe (1 nm). In addition, the same results were obtained even in the case of combinations of Rh, Ir, Cr, Re, Tc, Os other than Ru, and elements having a longer nearest neighbor atomic distance than that of the antiferromagnetic film. Moreover, with respect to NiFe, the same results were obtained even in the case of NiFe-X wherein a non-magnetizing element, such as NiFeCr, is added.

EXAMPLE 4

The following samples were prepared on alumina.
① 5Ta/2Ru/10PtMn/2CoFe/0.9Ru/2.5CoFe/xCu/2CoFe/2Cu/5Ta x=1.9, 2, 2.1, 2.2, 2.3, 2.4, 2.6
② 5Ta/2NiFe/10PtMn/2CoFe/0.9Ru/2.5CoFe/xCu/2CoFe/2Cu/5Ta x=1.8, 2, 2.1, 2.2, 2.3, 2.5, 2.7
③ 5 Ta/2Au/10PtMn/2CoFe/0.9Ru/2.5CoFe/xCu/2CoFe/2Cu/5Ta x=1.8, 2, 2.1, 2.2, 2.3, 2.5, 2.8

All of the samples were annealed in a magnetic field of 7 kOe in vacuum of $10^{-6}$ Torr for 10 hours. All of the numbers have a unit nm.

Figures 13, 14:
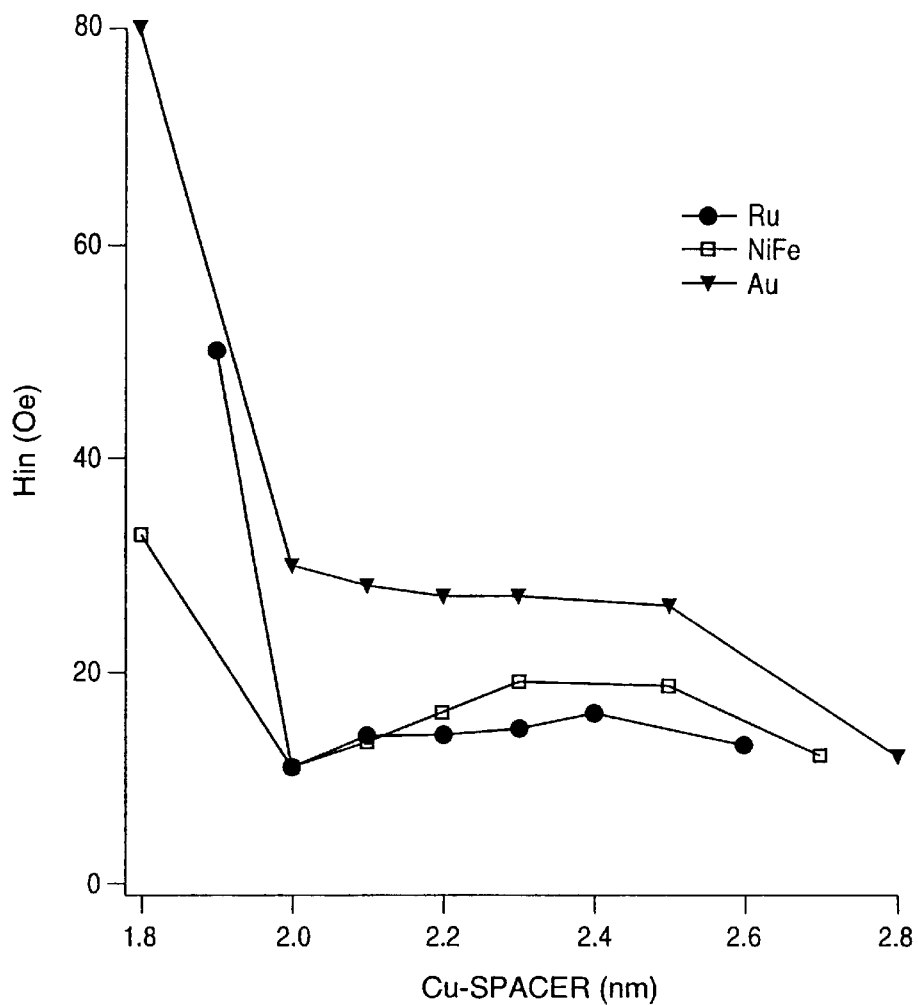
FIG. 13 is a characteristic diagram showing the results of Hin in Example 4.
FIG. 14 is a table showing the Hin reducing effect in Example 5.

FIG. 13 shows the results of the Hin.

The distribution of thickness of the Cu spacer estimated on the basis of these results was a normal distribution of standard deviation of about 25 im in the case of ①, and a normal distribution of standard deviation of about 0.2 nm in the case of ②. The components of the Hin based on the contribution of the magnetostatic coupling are substantially the same. However, the Ru under layer has a smaller variation due to the RKKY oscillation of the Hin in a region of from 2 nm to 2.5 nm, and the controllability of the thickness of the Cu spacer to the Hin is excellent. In the case ③, large magnetostatic coupling was observed because of large Au layer roughness.

EXAMPLE 5

5Ta/2Au/10IrMn/2CoFe/0.9Ru/2.5CoFe/2Cu/2CoFe/x/5Ta x=Au, Cu, Ru, Ag

All of the samples were annealed in a magnetic field of 7 kOe in vacuum of $10^{-6}$ Torr for 10 hours.

When x is Au, Cu, Ru or Ag, the Hin can be reduced in comparison with the case where x is not used. Among these elements, Cu has a very excellent Hin reducing effect. It was confirmed that these effects were also obtained by PeMn, PdPtMn, NiMn, RhMn and RhRumn. In addition, it can be easily guessed that it is also effective to use other antiferromagnetic film used for exchange couplings or to fix the pin layer by a hard magnetic ferromagnetic exchange couling film.

These results are shown in FIG. 14.

EXAMPLE 6

The following samples were prepared on alumina.
① 5Ta/2Ru/10IrMn/2CoFe/0.9Ru/2.5CoFe/2Cu/2CoFe/xCu/5Ta
② 5Ta/2Ru/10PtMn/2CoFe/0.9Ru/2.5CoFe/2Cu/2CoFe/xCu/5Ta All of the samples were annealed in a magnetic field of 7 kOe in vacuum of $10^{-6}$ Torr for 10 hours.

If the cap Cu having a thickness of about 0.5 nm or more was formed, the Hin tended to decrease, and if the thickness was 1.5 nm, it was possible to obtain sufficient effects. Also with respect to the MR ratio, the most excellent characteristics were obtained when the cap Cu having a thickness of 1.5 to 2 nm was formed. It was confirmed that these effects were also obtained in the case that the antiferromagnetic film is any of PdPtMn, NiMn, RhMn and RhRuMn. In addition, it is also effective to use other antiferromagnetic film used for exchange couplings or to fix the pinned layer by a hard magnetic ferromagnetic exchange bias film.

Figure 15A:
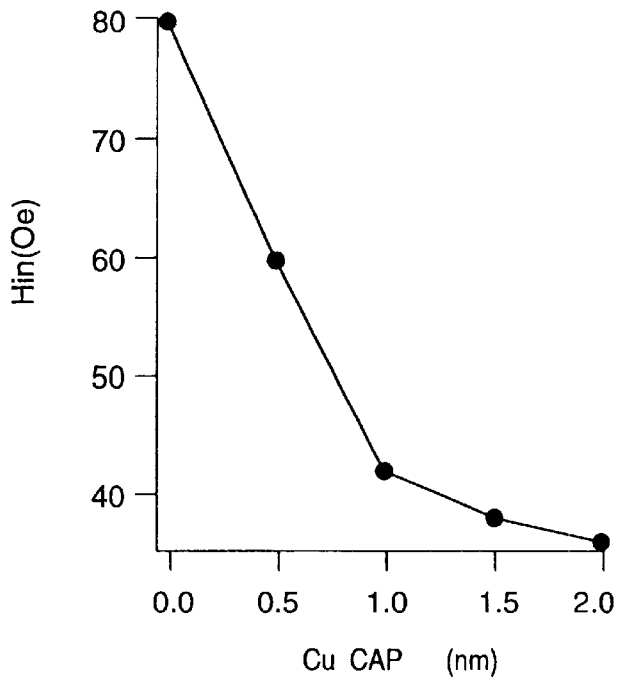
FIGS. 15(a) and (b) are characteristic diagrams showing the results using sample i in Example 6.
Figure 15B:
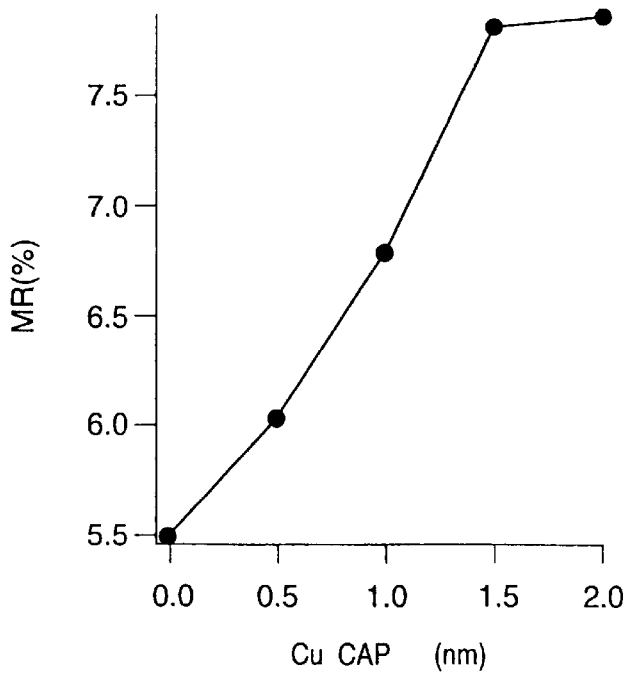
Figure 16A:
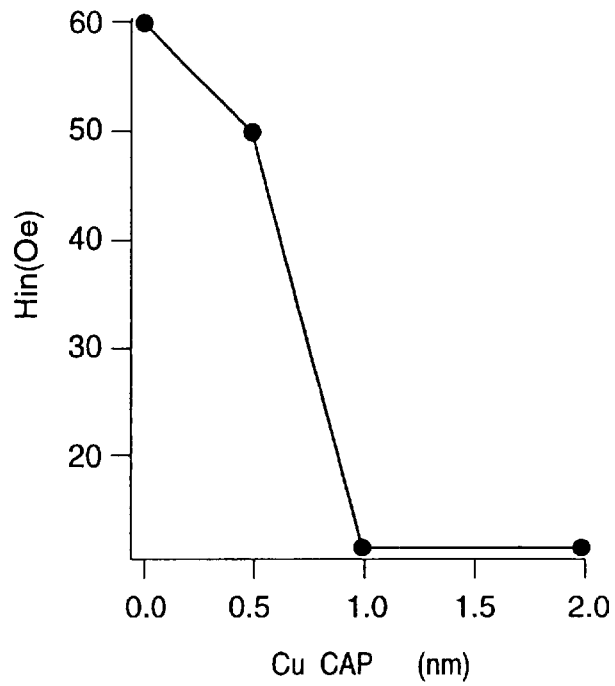
FIGS. 16(a) and 16(b) are characteristic diagrams showing the results using sample(Adin Example 6.
Figure 16B:
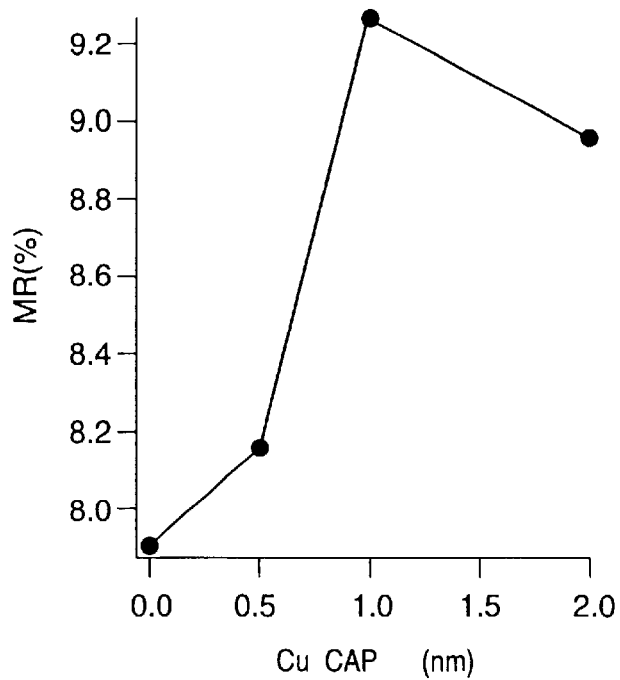

The results using the samples ① and ② are shown in FIGS. 15 and 16.

EXAMPLE 7

The following samples were prepared on alumina.
① 5Ta/y/10IrMn/2CoFe/0.9Ru/2.5CoFe/2Cu/2CoFe/x/5Ta
② 5Ta/y/10PtMn/2CoFe/0.9Ru/2.5CoFe/2Cu/2CoFe/x/5Ta All of the samples were annealed in a magnetic field of 7 kOe in vacuum of $10^{-6}$ Torr for 10 hours.

The effect of the cap was obtained by all of the under layers. It was confirmed that these effects were also obtained in the case that the antiferromagnetic film is any of PdPtMn, NiMn, RhMn and PhRuMn. In addition, it is also effective to use other antiferromagnetic film used for exchange couplings or to fix the pinned layer by a hard magnetic ferromagnetic exchange bias film. Moreover, it is effective to adopt any layers of fcc or hcp.

The results using the sample ① are shown in FIG. 17, and the results using the sample ② are shown in FIG. 18.

As described above, the magnetoresistive element, the method for producing the same, and the magnetic head in the first through sixth preferred embodiments have an exchange coupling film having a good exchange coupling field, and can obtain a stable output over a long period of time, so that the industrial value thereof is great.

(Seventh Preferred Embodiment)

Figure 19:
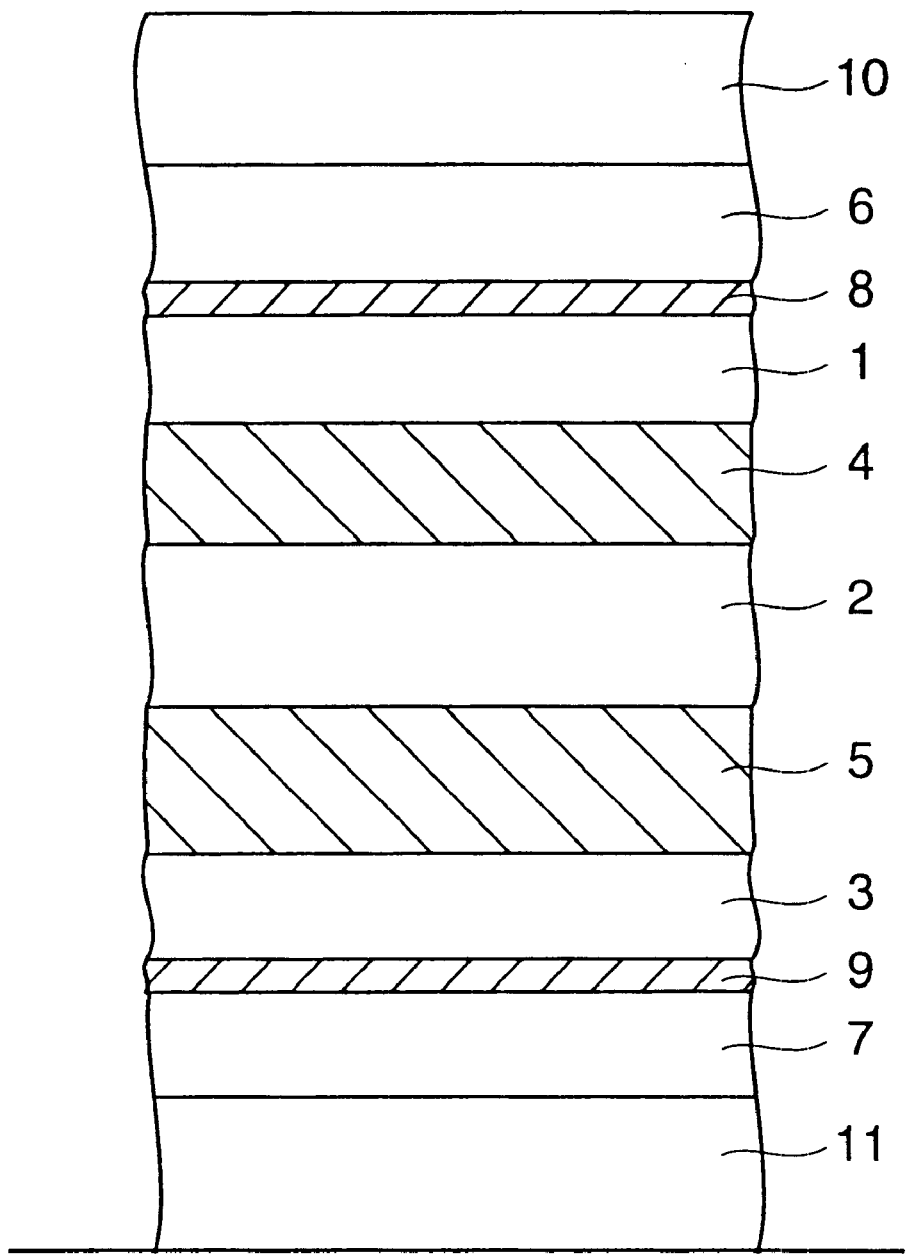
FIG. 19 is a sectional view showing the film construction of the seventh preferred embodiment of a magnetoresistive element according to the present invention.

FIG. 19 is a sectional view of the seventh preferred embodiment of a spin valve film of a magnetoresistive element according to the present invention. In FIG. 19, ferromagnetic layers 1, 2 and 3 are formed via non-magnetic spacer layers 4 and 5. The ferromagnetic layers 1 and 3 are pinned layers wherein the magnetizing direction is fixed. The ferromagnetic layer 2 is a free layer wherein the magnetizing direction is changed by an external magnetic field. On the pinned layers 1 and 3, ferromagnetic magnetization adjusting layers 6 and 7 are formed via anti-parallel connection films 8 and 9, respectively. The magnetization thereof is antiferromagnetically connected to the magnetization of the pinned layer. Therefore, when a magnetic field is applied to the pinned layer, the stability of the fixed magnetization is far more stable than the case where no magnetization adjusting layer is provided. To the other sides of the ferromagnetic magnetization adjusting layers 6 and 7, exchange bias films 10 and 11 are connected.

Figure 20:
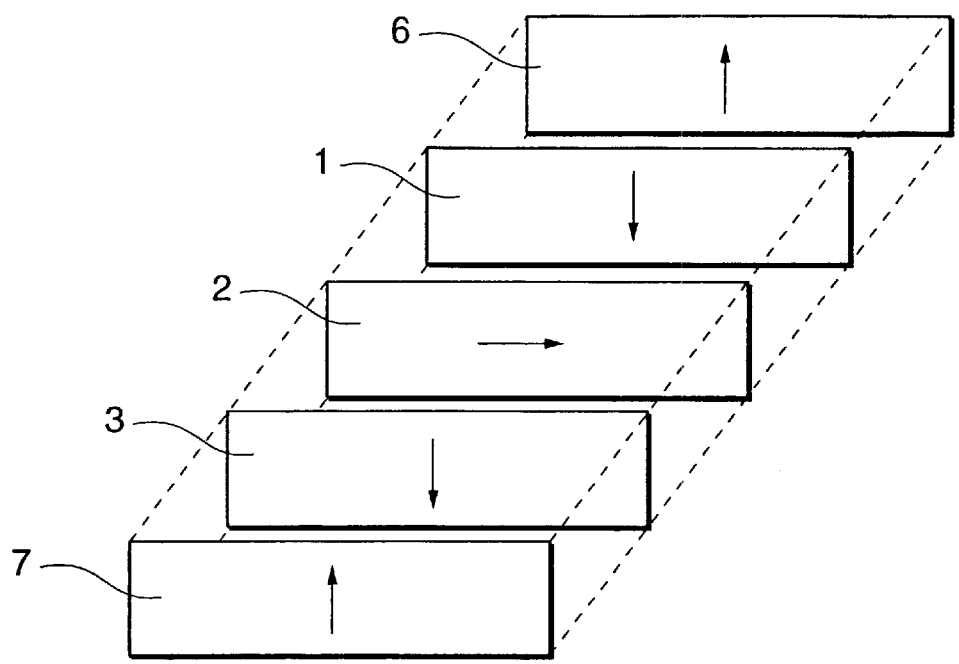
FIG. 20 is a schematic diagram showing the magnetizing direction of each of magnetization layers in the seventh preferred embodiment of a magnetoresistive element according to the present invention.

In this seventh preferred embodiment, the respective spin valve layers are formed in the magnetizing directions shown in, e.g., FIG. 19. When the Mst of each of the layers 1, 6 and the layers 3, 7 in FIGS. 19 and 20 is represented by Mst(1), Mst(6), Mst(3) or Mst(7), if values obtained by dividing the Mst of the magnetization adjusting layer by the Mst of the free layer in each of the layers 1, 6 and the layers 3, 7, Mst(6)/Mst(1) and Mst(7)/Mst(3), are 0.6 or more and less than 1, the bias magnetic field of the free layer including the Hin can be canceled, and the inversion of magnetization of the pinned layer does not occur even if the ESD occurs.

In order to prevent the magnetization of the pinned layer even from being inverted if the ESD occurs, it is considered that the product of the galvano magnetic field by the Mst in the pinned layer should be equal to the product of the galvano magnetic field by the Mst in the magnetic adjusting layer. Since the galvano magnetic field in the spin valve is stronger in the outside part of the spin valve, it is considered that the magnetic field applied to the magnetization adjusting layer is stronger than the magnetic field applied to the pinned layer. Therefore, if the Mst of the magnetic adjusting layer is set to be smaller than the Mst of the pinned layer in both of upper and lower layers, and if the ratio thereof is set to be 0.6 or more and less than 1, it is possible to obtain a dual spin valve film which does not cause the inversion due to the ESD.

Figure 21:
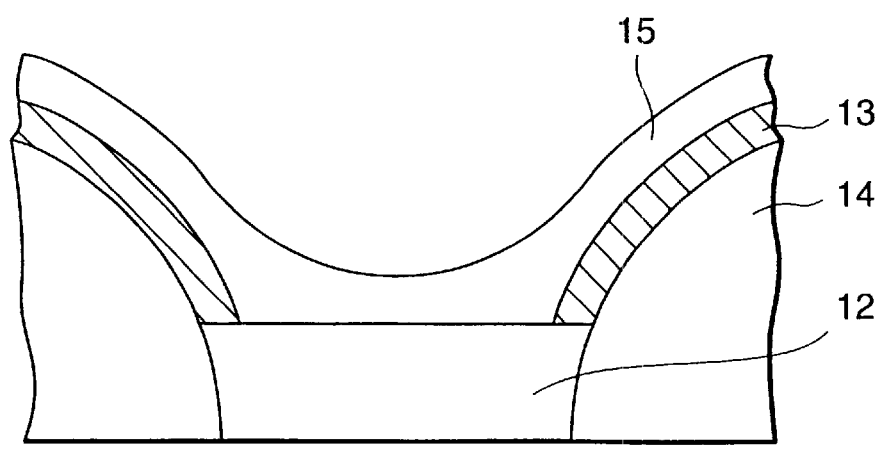
FIG. 21 is a sectional view showing the structure of a magnetoresistive element according to the present invention.

FIG. 21 shows a schematic sectional structure of a magnetoresistance effect head using the above described spin valve film. In FIG. 21, the magnetoresistance effect head comprises a spin valve 12, a lead (terminal) 13, a hard film (longitudinal bias layer) 14 and a non-magnetic insulator film 15.

(Eighth Preferred Embodiment)

Figures 22, 23:
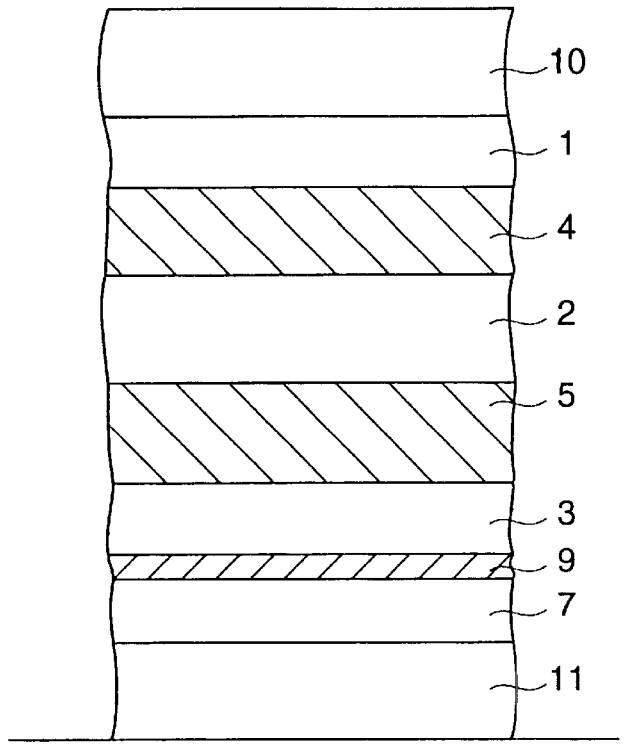
FIG. 22 is a sectional view showing the film construction in the eighth preferred embodiment of a magnetoresistive element according to the present invention.
FIG. 23 is a table showing the results of magnetization inversion of a magnetization fixing film of a spin valve film in the eighth preferred embodiment of the present invention.

In the eighth preferred embodiment, a magnetization adjusting layer is provided only on one of upper and lower pinned layers of a dual spin valve film. In FIG. 22, a magnetization adjusting layer 7 is provided only on a pinned layer 3 of upper and lower pinned layers 1 and 3 of a dual spin valve, and a current is caused to flow through a spin valve element to produce a galvano magnetic field, so that it is possible to fix the upper and lower pinned layers in the same direction and to cancel the bias magnetic field to a free layer 2.

With this construction, if the product of the saturation magnetization of the magnetization adjusting layer 7 by the thickness thereof is set to be greater than the product of the saturation magnetization of the pinned layer 3 by the thickness thereof, it is possible to cause the magnetizing direction of the magnetization adjusting layer 7 to be the same as the direction of the galvano magnetic field and to cause the magnetizing direction of the pinned layer 3 to be opposite to the direction of the galvano magnetic field, by the galvano magnetic field produced when current flows through the element. In addition, the upper and lower pinned layers can face in the same direction. Therefore, when the magnetization of the pinned layer of the spin valve element is inverted by the ESD, the upper and lower pinned layers can be fixed again in the same direction due to the magnetization of the magnetization adjusting layer by causing current to flow through the spin valve element to produce the galvano magnetic field.

In the eighth preferred embodiment, the ratio of Mst of the magnetic adjusting layer 7 to that of the pinned layer 3, i.e., Mst(7)/Mst(3), can be 1 or more to direct the upper and lower pinned layers in the same direction.

As a current driving circuit for causing current through the spin valve element to fix the upper and lower pinned layers in the same direction again, it is possible to use a current driving circuit (e.g., U.S. Pat. No. 5,650,887) for use in a conventional spin valve element.

In the eighth preferred embodiment, the magnetostatic bias magnetic field produced in the free layer 2 can be substantially zero by establishing Mst(7)−Mst(3)=Mst(1) with respect to the Mst of each of the layers 1, 3 and 7.

Moreover, in the eighth preferred embodiment, the bias magnetic field (Hin) for the ferromagnetic interaction applied to the free layer 2 via the spacer layers 4 and 5 can be canceled by the total of the magnetostatic bias magnetic fields from the respective layers 1, 3 and 7. Specifically, if Mst(1)+Mst(3)−Mst(7) is in the range of from 1 to 5 nmT, the Hin can be canceled.

(Ninth Preferred Embodiment)

In the ninth preferred embodiment, a magnetization adjusting layer is used in the construction shown in FIG. 19 which is the same as that in the above described seventh preferred embodiment, and a current is caused to flow through a spin valve element to produce a galvano magnetic field, so as to allow upper and lower pinned layers to be fixed in the same direction.

Since the galvano magnetic fields are directed in opposite directions in the upper and lower pinned layers, if the product of the galvano magnetic field of one of the pinned layer by the Mst thereof is set to be greater than that of the magnetization adjusting layer, and if the product of the galvano magnetic field of the magnetization adjusting layer is set to be greater than that of the other pinned layer, the directions of the upper and lower pinned layers can be the same.

Therefore, in order to direct the upper and lower pinned layers 1 and 3 in the same direction, one of the pinned layers is directed in the opposite direction to the galvano magnetic field, and the magnetization adjusting layer is directed in the same direction as that of the galvano magnetic field. Thus, when a current is caused to flow through the magnetoresistive element to produce a galvano magnetic field, the product of the saturation magnetization of the pinned layer in one of two sets of pinned layers and magnetic adjusting layers (1 and 6, or 3 and 7), which are antiferromagnetically connected to each other, by the thickness thereof is set to be greater than that of the magnetization adjusting layer in the one set, and the product of the magnetization adjusting layer in the other set is set to be greater than that of the saturation magnetization in the other set.

Since the galvano magnetic field is stronger on the outside part of the spin valve film, the magnetic field applied to the magnetization adjusting layer is stronger than the magnetic field applied to the pinned layer. In the ninth preferred embodiment, a ratio obtained by dividing the product of the saturation magnetization of the magnetization adjusting layer by the thickness thereof, by the product of the saturation magnetization of the pinned layer by the thickness thereof is set to be 0.6 or less in one of two sets of pinned layers and magnetization adjusting layers which are antiferromagnetically connected to each other, and 1 or more in the other set.

(Tenth Preferred Embodiment)

In the tenth preferred embodiment, the measures to cope with the ESD in the seventh or ninth preferred embodiment are taken in FIGS. 19 and 20 having two magnetization adjusting layers, and the bias magnetic field in the free layer is decreased.

In FIGS. 19 and 20, the whole magnetostatic bias applied to the free layer from the respective layers 1, 6 and the respective layers 2, 7 can be designed so as to be canceled to be substantially zero. Thus, it is possible to cancel the great magnetostatic bias in the free layer, which causes a problem when no magnetization adjusting layer is provided. The MR ratio of the spin valve film can be enhanced by decreasing the thickness of the free layer and setting the Mst (the product of the saturation magnetization by the thickness) to be substantially equal to that of the pinned layer.

However, when the Mst of the free layer is substantially equal to or less than that of the pinned layer, the directions of magnetization of the pinned layer and free layer are completely anti-parallel to each other, so that it is difficult to design the bias point. In particular, when the Mst of the free layer is 5 nmT or less, it is difficult to design the bias point. In the tenth preferred embodiment of the present invention, it is easy to design the bias point even if the Mst is 5 nmT or less.

Specifically, when CoFe having a saturation magnetization of 1.8 T is used as the free layer, it can be designed even if the thickness is 3 nm or less. When the Mst of the respective layers 1, 6 and the respective layers 3, 7 in FIGS. 19 and 20 is represented by Mst(1), Mst(6), Mst(3) and Mst(7), if Mst(1)+Mst(6) is set to be substantially equal to Mst(3)+Mst(7), the magnetostatic bias magnetic fields applied to the free layer 2 from the respective layers can be substantially zero.

Moreover, the bias magnetic field (Hin) for ferromagnetic interaction applied to the free layer via the spacer layers 4 and 5 can be canceled by the magnetostatic bias magnetic field from the respective layers 1, 6, 3 and 7. This can be achieved by causing the total of the magnetostatic bias magnetic fields from the respective layers 1, 6, 3 and 7, to have substantially the same magnitude as that of the Hin and the opposite direction thereto. Specifically, when a Co alloy or a Ni alloy is used, if the value of (Mst(1)−Mst(6)+(Mst(3)−Mst(7)) is in the range of from 1 nm to 5 nm, the Hin can be canceled.

Thus, when the thickness of the spacer layers 4 and 5 decreases to increase the Hin, it is particularly effective to cancel the bias magnetic field (Hin) for ferromagnetic interaction by the magnetostatic bias magnetic field from the respective layers.

In the above described preferred embodiments, the antiparallel connection film for antiferromagnetically connecting the pinned layer to the magnetization adjusting layer is formed of a material containing a principal component selected from the group consisting of Ru, Rh, Ir, Cr and mixtures thereof. The thickness thereof is preferably in the range of from 0.5 nm to 1.1 nm in the case of Ru. Since any of them makes ferromagnetic coupleing if the thickness of a film thereof exceeds a certain inherent thickness, the thickness must be in the inherent thickness range. On the other hand, a film having a thickness of less than 0.5 nm can not be resistant to the standard deviation of atoms due to heat for a long period of time, the thickness of the film is preferably in the range of 0.5 nm or more, more preferably in the range of 0.8 nm or more.

The exchange bias film is formed of a material selected from the consisting of Mn alloys, such as RhMn, RhRuMn, Ptn, FeMn, NiMn, IrMn and PdPtMn, other Mn antiferromagnetic materials, and antiferromagnetic oxides, such as Nio and an antiferromagnetic oxide containing NiO as a principal component. In place of the antiferromagnetic materials, hard magnetic films formed of Co, Fe and Ni alloys, and oxides of these metals, such as Co ferrite, may be used.

The pinned layer and the magnetization adjusting layer may be formed of any one of Fe, Co and Ni alloys regardless of soft or hard magnetic alloys. The pinned layer and the magnetization adjusting layer may be a lamination layer of two or more ferromagnetic metals. Among these materials, the Co alloy has the advantage of the rate of change in magnetic resistance. When the hard magnetic metal material is used, it is not required to use the exchange bias film.

On the other hand, the free layer must be soft magnetic. Therefore, a magnetic layer containing permalloy and additives thereto as principal components has the advantage of soft magnetism. The magnetic layer of only an alloy containing Co as a principal component has the advantage of the rate of change in magnetic resistance, and is preferably formed of an fcc alloy and arranged so that the axis (111) is substantially perpendicular to the plane of the film.

In the tenth preferred embodiment, various materials described in the seventh preferred embodiment may be used. The exchange bias film is preferably formed of an Mn antiferromagnetic film, such as IrMn, PtMn, PdPtMn, RhMn, RhRuMn, FeMn, NiMn and IrMn.

Moreover, in the above described preferred embodiments, the magnetization adjusting layers does not contribute to the magnetoresistance effect and causes shunt current to deteriorate the output. Therefore, the magnetization adjusting layer preferably has a high resistance. Specifically, the magnetization adjusting layer is preferably formed of CoCr, NiCr, FeCr, CoFeCr, NiFeCr, CoPtCr, CoNiFeCr or CoPdCr, which are prepared by adding a deca-element, such as Cr, to Fe, Co, Ni and alloys thereof. In addition, the magnetization adjusting layer is preferably formed of a material having a great saturation magnetization Ms, since the use of such a material decreases the thickness t to suppress the shunt current.

As more detailed description of the seventh through tenth preferred embodiments, Examples 8 through 16 will be described below.

EXAMPLE 8

A spin valve, which had the following construction and wherein both of upper and lower pinned layers had a magnetization adjusting layer, was prepared.

Example 8: 5 mTa/7 nmIrMn/2 nmCo$_{90}$Fe$_{10}$/0.9 nmRu/3 nmCo$_{90}$Fe$_{10}$/2 nmCu/4 nmCo$_{90}$Fe$_{10}$/2 nmCu/3 nmCo$_{90}$Fe$_{10}$/0.9 nmRu/2.5 nmCo$_{90}$Fe$_{10}$/7 nmIrMn/5 nm Ta It was confirmed that even if a current was caused to flow through the spin valve element with this construction to produce a galvano magnetic field, the magnetization of the pinned layer was not inverted. Therefore, the magnetization of the pinned layer is not inverted by the ESD, so that the pinned layer is stable.

Then, assuming that the thickness of the magnetization adjusting layer is x nm and the thickness of the pinned layer is y nm, a spin valve element having the following construction including variable x and y was prepared, and a current was caused to flow through the element to produce a galvano magnetic field to examine the presence of the inversion of magnetization of the pinned layer. The results are shown in FIG. 23.

5 nmTa/7 nmIrMn/xnmCo$_{90}$Fe$_{10}$/0.9 nmRu/ynmCo$_{90}$Fe$_{10}$/2 nmCu/4 nmCo$_{90}$Fe$_{10}$/2 nmCu/ynmCo$_{90}$Fe$_{10}$/0.9 nmRu/xnmCo$_{90}$Fe$_{10}$/7 nmIrMn/5 nm Ta

EXAMPLE 9

A spin valve element having the following construction was prepared.

Example 9: 5 nmTa/7.5 nmIrMn/1.6 nmCo$_{90}$Fe$_{10}$/0.85 nmRu/2.5 nmCo$_{90}$Fe$_{10}$/2 nmCu/4 nmCo$_{90}$Fe$_{10}$/2 nmCu/3 nmCo$_{90}$Fe$_{10}$/0.9 nmRu/2.5 nmCo$_{90}$Fe$_{10}$/7 nmIrMn/5 nm Ta With this construction, the bias magnetic fields of the free layers including the Hin were canceled to obtain a good bias point and to obtain a very high output.

After a current was caused to flow through the element to examine the inversion of magnetization of the pinned layer, it was found that the element was very stable since the magnetization of the pinned layer was not inverted until 85 V at which the element was destroyed.

EXAMPLE 10

A spin valve, which had the following construction and wherein only one of upper and lower pinned layers had a magnetization adjusting layer, was prepared.

Example 10: 5 nmTa/7 nmIrMn/3 nmCo$_{90}$Fe$_{10}$/3 nmCu/3 nmCo$_{90}$Fe$_{10}$/3 nmCu/2.5nmCo$_{90}$Fe$_{10}$/0.9 nmRu/5.5 nmCo$_{90}$Fe$_{10}$/7 nmIrMn/5 nm Ta Also with this construction, when a current was caused to flow through the element, the upper and lower pinned layers were correctly arranged in the same direction by a galvano magnetic field. Thus, even if the inversion of magnetization of the pinned layer is caused by the ESD, the two pinned layers can be returned to the regular state by passing a pulse current through the element. Moreover, it was possible to obtain a symmetrical output with respect to the positive and negative of the magnetic field, so that the bias magnetic fields of the free layers were canceled.

EXAMPLE 11

A spin valve, which had the following construction and wherein both of upper and lower pinned layers had a magnetization adjusting layer, was prepared.

Example 11: 5 nmTa/2 Ru7 nmIrMn/3 nmCo$_{90}$Fe$_{10}$/0.9 nmRu/2 nmCo$_{90}$Fe$_{10}$/3 nmCu/3 nmCo$_{90}$Fe$_{10}$/3 nmCu/3nmCo$_{90}$Fe$_{10}$/0.9 nmRu/1.5 nmCo$_{90}$Fe$_{10}$/7 nmIrMn/5 nm Ta Also with this construction, when a current was caused to flow through the element, the upper and lower pinned layers were correctly arranged in the same direction by a galvano magnetic field. Thus, even if the inversion of magnetization of the pinned layer is caused by the ESD, the upper and lower pinned layers can be returned to the regular state by passing a pulse current through the element.

The results of the measured output properties of the magnetoresistive element in Example 8 are shown in FIG. 24(*a*). It was confirmed from FIG. 24(*a*) that a symmetrical output with respect to the positive and negative of the magnetic field was obtained, so that the bias magnetic field of the free layer was canceled.

Comparative Example 1: 5 nmTa/2 Ru7 nmIrMn/3 nmC$_{90}$Fe$_{10}$/3 nmCu/3 nmC$_{90}$Fe1$_{10}$/3 nmCu/3 nmCo$_{90}$Fe$_{10}$20 nmNiO/5 nm Ta The results of the measured output properties of the magnetoresistive element in Comparative Example 1 are shown in FIG. 24(*b*).

In FIG. 24(*b*), the bias point is greatly shifted, and there is little variation in output due to an external magnetic field on the positive side of the external magnetic field.

Then, with respect to the spin valve films in Example 8 and Comparative Example 1, the process of magnetization was measured. A magnetic field was applied in a direction of an easy axis of the pinned layer. The magnetic field, in which the magnetizing direction of the pinned layer varies, was great, about 700 Oe, in Example 8, and about 400 Oe in Comparative Example 1.

EXAMPLES 12 AND 13

Spin valves, which had the following construction and wherein both of upper and lower pinned layers had a magnetization adjusting layer, were prepared.

Example 12: 5 nmTa/2 Ru7 nmIrMn/1.6 nmCo$_{90}$Fe$_{10}$/0.9 nmRu/3nmCo$_{90}$Fe$_{10}$/2 nmCu/4 nmCo$_{90}$Fe$_{10}$/2 nmCu/3 nmCo$_{90}$Fe$_{10}$/0.9 nmRu/4 nmCo$_{90}$Fe$_{10}$/7 nmIrMn/5 nm Ta Example 13: 5 nmTa/2 Ru7 nmIrMn/1.6 nmCo$_{90}$Fe$_{10}$/0.9 nmRu/3 nmCo$_{90}$Fe$_{10}$/2 nmCu/4 nmCo$_{90}$Fe$_{10}$/2 nmCu/3 nmCo$_{90}$Fe$_{10}$/0.9 nmRu/3 nmCo$_{90}$Fe$_{10}$/7 nmIrMn/5 nm Ta With these constructions, when a current was caused to flow through the element, the upper and lower pinned layers were correctly arranged in the same direction by a galvano magnetic field. Thus, even if the inversion of magnetization of the pinned layer is caused by the ESD, the upper and lower pinned layers can be returned to the regular state by passing a pulse current through the element.

In Example 12, the ratio of the Mst of one of the magnetization adjusting layers to the Mst of the corresponding one of pinned layers is about 0.53, and the ratio of the Mst of the other magnetization adjusting layer to the Mst of the corresponding other pinned layer is about 1.3. Therefore, the magnetization of the one of the pinned layers is arranged in the direction of the galvano magnetic field by the galvano magnetic field, and the magnetization of the other pinned layer is arranged in the opposite direction to the galvano magnetic field by the galvano magnetic field, so that the upper and lower pinned layers can be arranged in the same direction.

In the case of Example 13, the ratio of the Mst of one of the magnetization adjusting layers to the Mst of the corresponding one of pinned layers is about 0.53, whereas the Mst of the other magnetization adjusting layer is equal to the Mst of the corresponding other pinned layer, i.e., the ratio of the Mst is 1. Also in this case, the galvano magnetic field applied to the magnetization adjusting layer is greater than the galvano magnetic field applied to the pinned layer, so that the upper and lower pinned layers can be arranged in the same direction similar to Example 12.

EXAMPLE 14

In a spin valve structure having upper and lower pinned layers, each having a magnetization adjusting layer, the magnetization adjusting layer was formed of a hard magnetic film to omit the exchange bias film. The construction of the spin valve film in Example 14 is as follows.

Example 14: 5 nmTa/3 nmCoPt/0.9 nmRu/3 nmCo$_{90}$Fe$_{10}$/3 nmCu/3 nmCo$_{90}$Fe$_{10}$/3 nmCu/3 nmCo$_{90}$Fe$_{10}$/0.9 nmRu3 nmCoPt/5 nm Ta After the output properties of the magnetoresistive element in Example 14 were measured, a symmetrical output with respect to zero of the magnetic field in positive and negative directions was obtained.

While the magnetization adjusting layer has been formed of a hard magnetic film in this example, the same result was obtained when the pinned layer and the magnetization adjusting film were formed of a hard magnetic film.

With this construction, when a current was caused to flow through the element, the upper and lower pinned layers were arranged in the same direction by a galvano magnetic field.

EXAMPLE 15

In a spin valve structure having upper and lower pinned layers, only one of which had a magnetization adjusting layer, the magnetization adjusting layer was formed of a hard magnetic film to omit the exchange bias film. The construction of the spin valve film in Example 15 is as follows.

Example 15: 5 nmTa/20 nmNiO/3 nmCo$_{90}$Fe$_{10}$/3 nmCu/5.5 nmCo$_{90}$Fe$_{10}$/0.9 nmRu/2.5 nmCoPt/5 nm Ta After the output properties of the magnetoresistive element in Example 15 were measured, a symmetrical output with respect to zero of the magnetic field in positive and negative directions was obtained.

Similar to the above described example, even if the pinned layer was formed of a hard magnetic film, or even if the pinned layer and the magnetization adjusting layer were formed of a hard magnetic film, the same results were obtained.

With this construction, when a current was caused to flow through the element, the upper and lower pinned layers were arranged in the same direction by a galvano magnetic field.

Even if Co, CoCrPt, CoCrTa, CoVFe and so forth other than the hard magnetic materials used herein were used, the same results were obtained. Moreover, when an antiferromagnetic film used for exchange coupling was laminated on the hard magnetic material, it was possible to achieve stronger fixing. In this case, when the antiferromagnetic material was an Mn antiferromagnetic material (RhMn, RuMn, PtMn, RhRuMn, IrMn, NiMn, FeMn or the like) or an oxide magnetic material containing Fe, Co or Ni, the same results were obtained.

EXAMPLE 16

In Example 16, a pinned layer is magnetically connected to a free layer via a Cu spacer layer, so that the bias effect applied to the free layer is canceled by the magnetostatic bias magnetic fields of the pinned layer and magnetization adjusting layer. The construction of the spin valve film in Example 16 is as follows.

Figure 24A:
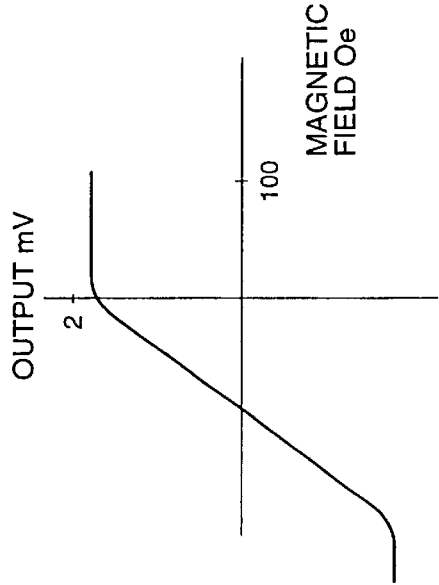
FIGS. 24(a) through 24(d) are characteristic diagrams showing the relationship between magnetic fields and output voltages in magnetoresistive element in Example 8 and Comparative Example.
Figure 24B:
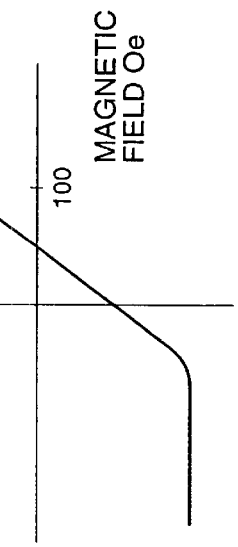
Figure 24C:
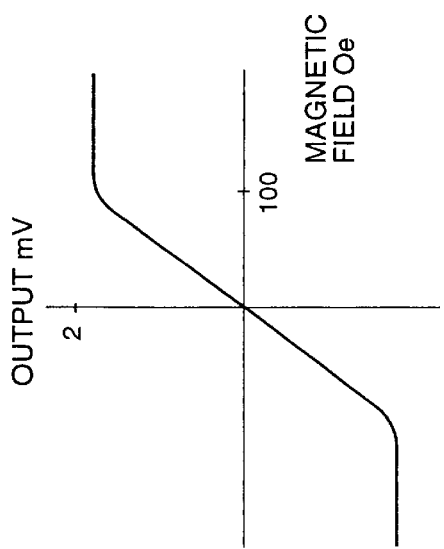

Example 16: 5 nmTa/20 nmNiO/2 nmCo$_{90}$Fe$_{10}$/0.9 nmRu/3 nmCo$_{90}$Fe$_{10}$/2 nmmCu/3 nmCo$_{90}$Fe$_{10}$/2 nmCu/3 nmCo$_{90}$Fe$_{10}$/0.9 nmRu/2 nmCo$_{90}$Fe$_{10}$/20 nmNiO/5 nmTa The results of the measured output properties of the magnetoresistive element in Example 16 are shown in FIG. 24(c). As can be seen from FIG. 24(c), a symmetrical output with respect to zero of the magnetic field in positive and negative directions was obtained.

The interaction magnetic field applied to the free layer from the pinned layer via the Cu layer is only about 8 Oe when the thickness of the Cu layer is 3 nm. However, when the thickness of the Cu layer decreases to 2 nm as Example 16, the interaction magnetic field is rapidly increased to 30 Oe by the decrease of the thickness of the Cu layer, so that a great bias effect is produced as shown in the following Comparative Example 2.

This interaction magnetic field can be canceled by the magnetostatic bias magnetic fields of the pinned layer and magnetization adjusting layer.

With this construction, when a current was caused to flow through the element, the upper and lower pineed layers were correctly arranged in the same direction by a galvano magnetic field.

Comparative Example 2

A spin valve film, which had the following construction and wherein the thickness of the Cu spacer layer was 2 nm which was the same as that in Example 16, was prepared.

Comparative Example 2: 5 nmTa/20 nmNiO/3 nmCo$_{90}$Fe$_{10}$/0.9 nmRu/3 nmCo$_{90}$Fe$_{10}$/2 nmCu/3 nmCo$_{90}$Fe$_{10}$/2 nmCu/3 nmCo$_{90}$Fe$_{10}$/0.9 nmRu/3 nmCo$_{90}$Fe$_{10}$/20 nmNiO/5 nmTa In this construction, the thickness of the Cu spacer is 2 nm. Although the magnetostatic bias magnetic field in the free layer decreases, the thickness of the Cu spacer is 2 nm so that the exchange magnetic field is great.

Figure 24D:
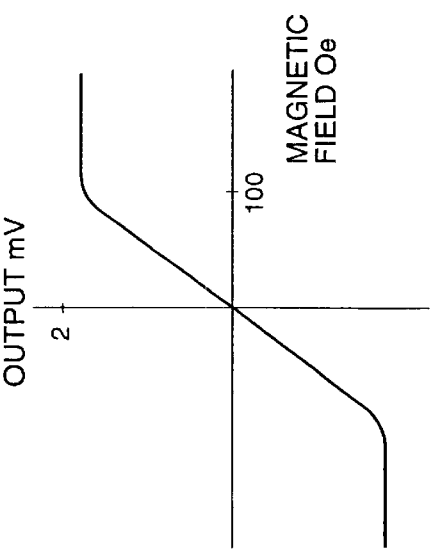

The results of the measured output properties of the magnetoresistive element in Comparative Example 2 are shown in FIG. 24(d). As can be seen from FIG. 24(d), the output properties are shifted by the interaction magnetic field, so that the symmetric property with respect to the positive and negative of the magnetic field deteriorates.

Thus, it can be seen that the magnetostatic bias magnetic field can be effectively utilized in order to cancel the interaction magnetic field in the free layer. The Ms of Co$_{90}$Fe$_{10}$ used for the free layer in the above described example and comparative example is 1.8T, and the Mst applying the magnetostatic bias magnetic field to the free layer is 3.6 nmT for two layers when the thickness of each of the layers is 1 nm. FIG.19 shows a bias magnetic field measured in various values of x and y, in a spin valve structure of: 5 nmTa/20 nmNiO/xnmCo$_{90}$Fe$_{10}$/0.9 nmRu/ynmCo$_{90}$Fe$_{10}$/3 nmCu/3 nmCo$_{90}$Fe$_{10}$/3 nmCu/ynmCo$_{90}$Fe$_{10}$/0.9 nmRu/xnmCo$_{90}$Fe$_{10}$/20 nmNiO/5 nmTa, assuming that the thickness of the magnetization adjusting layer is x nm and the thickness of the pinned layer is y nm.

In the antiferromagnetic films in Examples 8 through 16, when IrMn was substituted for NiO, or when Nio was substituted for IrMn, or when RhMn, RhRuMn, PtMn, FeMn or NiMn was substituted for the antiferromagnetic film, the same result as that in Example 8 was obtained. Thus, even if these antiferromagnetic film, to which elements are added, or other Mn antiferromagnetic materials are used, the same results can obtained. Moreover, the same result can be obtained when Co ferrite is use, and other ferritel can be used.

The same results as those in the above described examples were obtained when a laminated film of CoFe alloy and NiFe alloy was substituted for the free layers in the examples. These results show that the same results can be obtained when other Ni alloys and other Co alloys are used.

In these structures, even if any one of metal layers of 1 nmAu, 2 nmAu, 1 nmu, 2 nmCu, 2 nmRu, 2 nmNiFe, 2 nmAuCu, 1 nmAu/1 nmCu, 1 nmRu/1 nmCu, 1 nmCu/1 nmRu, 1 nmCu/1 nmAu and 1 nmAg was provided between Ta and IrMn, the same results are obtained.

In addition, even if an Mn antiferromagnetic material (RhMn, RuMn, PtMn, RhRuMn, IrMn, NiMn, FeMn, etc.) having a thickness of 5 to 40 nm is substituted for IrMn, the same results are obtained.

When the Mn antiferromagnetic material was used for the switched bias film, if an alloy containing Cu, Au, NiFe, Ag or Ru having a thickness of 0.8 nm or more was formed on 5 nmTa as the under layer, it was possible to improve the quality of the upper film to inhibit the output from being deteriorated due to heat treatment during the process for producing a head, to improve the soft magnetic characteristics of the free layer, and to obtain a sufficiently great switched bias magnetic field even if the thickness of the antiferromagnetic film is decreased. In order to remove the effects of shunt current, the thickness of the antiferromagnetic film is preferably 3 ni or less in respect of the output. The above described effects can be obtained if a metal alloy of fcc and hcp is used as the under layer.

Even if the free layer was formed of 0.8 nmCoFe/3 NiFe 0.8 CoFe, 1 nmCoFe/4 NiFe/1 nmCoFe, or 1 nmCoFe/10 NiFe/1 nmCoFe, the same results were obtained. Thus, it was found that the same results were obtained even if a laminated film of NiFe and CoFe having an optional thickness was used.

According to the seventh through tenth preferred embodiments of the present invention, in a magnetoresistive element having a dual spin valve structure, it is possible to solve a problem in that the inversion of magnetization of a pinned layer is caused by an electrostatic discharge so that the output can not be obtained. In addition, it is possible to solve problems in that the asymmetry in the relationship between a magnetic field and an output is caused and that the output is saturated, by canceling a bias magnetic field produced in a free layer in an element.

Thus, it is possible to enhance a reproducing signal output of a magnetic recording device using a magnetoresistive element having a dual spin valve structure without fearing an electrostatic discharge and a bias magnetic field.

(Eleventh Preferred Embodement)

Figures 25, 26:
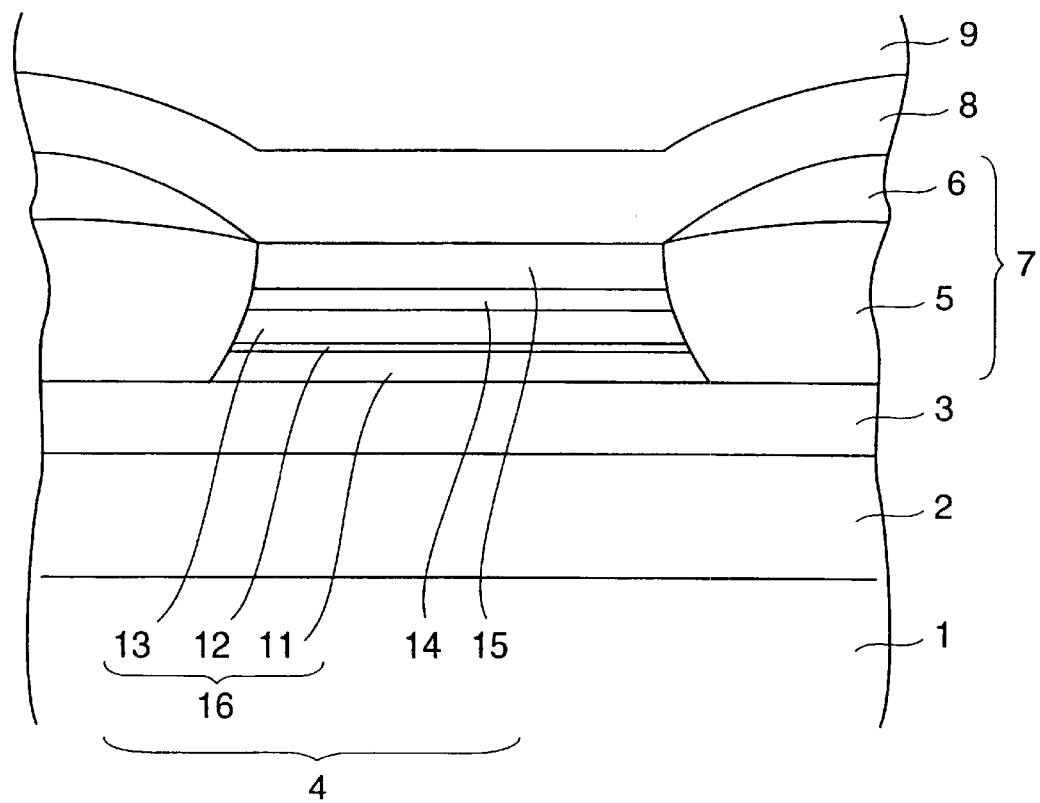
FIG. 25 is a table showing the thickness of a magnetization adjusting layer and a pinned layer, and the dislocation of a bias point in the tenth preferred embodiment of a spin valve according to the present invention.
FIG. 26 is a sectional view of the tenth preferred embodiment of a magnetoresistance effect head according to the present invention.

FIG. 26 shows a schematic sectional view of the eleventh preferred embodiment of a magnetoresistance effect head according to the present invention. In FIG. 26, reference number 1 denotes a substrate, 2 and 9 denoting magnetic shields, 3 and 8 denoting non-magnetic insulator films as magnetic gaps, 4 denoting an MR film, 5 denoting a longitudinal bias layer, which is a laminated layer of a ferromagnetic layer and an antiferromagnetic layer, or a hard magnetic layer, 6 denoting a lead, 7 denoting an MR layer, 11 denoting a ferromagnetic layer A, 12 denoting a connection layer for antiferromagnetically connecting the ferromagnetic layer A to a ferromagnetic layer B, 13 denoting the ferromagnetic layer B, 14 denoting an intermediate layer, 15 denoting a free layer, and 16 denoting a pinned layer. In addition, a under layer of Ta or the like is preferably provided between the ferromagnetic layer A A llnd the magnetic gap 3, and a protective film of Ta or the like is preferably provided on the free layer 15.

In the eleventh preferred embodiment of the present invention, the pair of ferromagnetic layers A 11 and B 13, which are antiferromagnetically connected to each other, are used for the pinned layer, so that the magnetization in the pinned layer 16 is pineed by the coercive forces of the ferromagnetic layers and the antiferromagnetic connection. Therefore, unlike the case where the ferromagnetic material is fixed by the connection of the ferromagnetic material to the antiferromagnetic material, it is possible to easily fix the pinned layer by applying a magnetic field at room tepperature. Therefore, since it is sufficient to expose only the free layer and the magnetic shield layer to the heat treatment process, the selection of conditions is far easier than the conventional selection.

Figure 27:
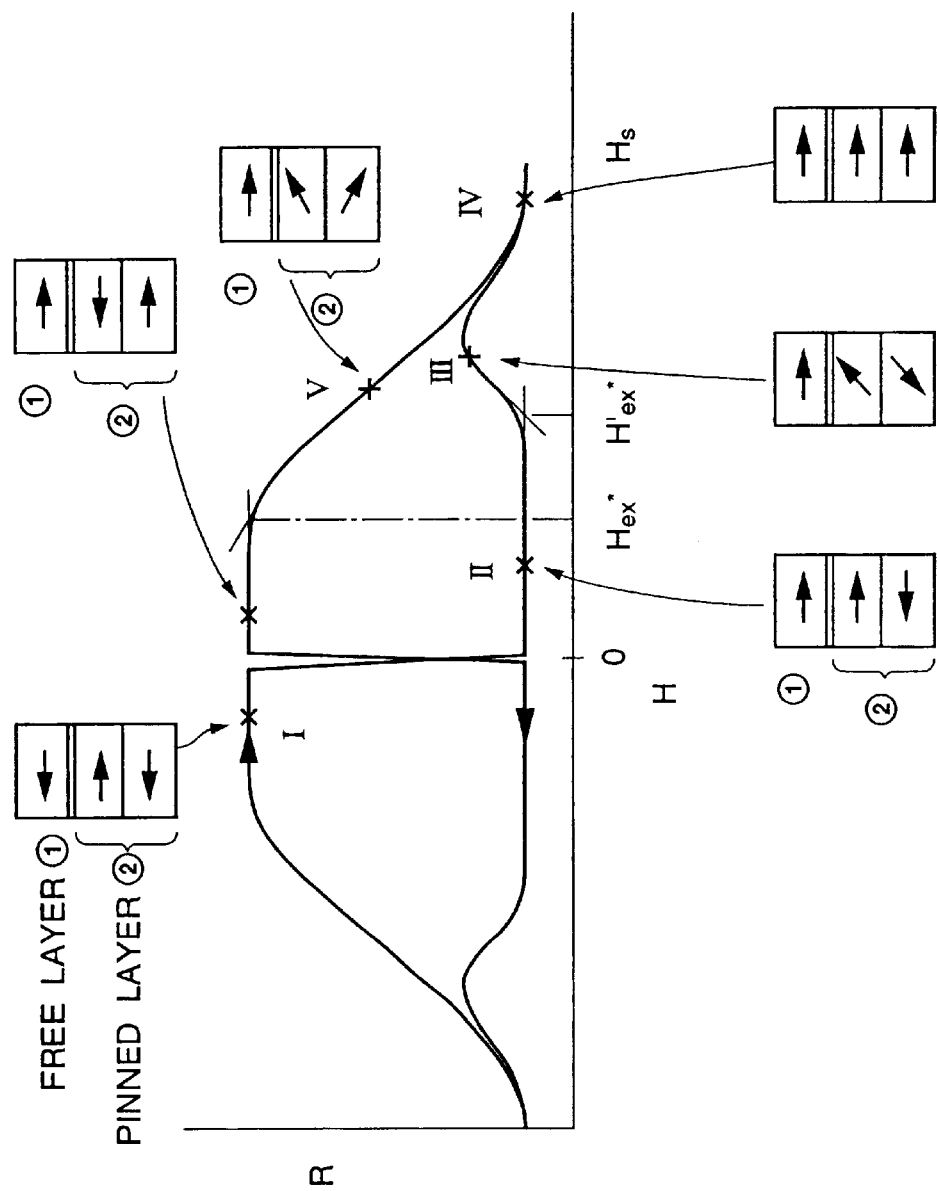
FIG. 27 is a schematic diagram showing the relationship between magnetic fields and resistances of a magnetoresistance effect film constituting the eleventh preferred embodiment of a magnetoresistance effect head according to the present invention.

According to the present invention, as shown in FIG. 27, the effective exchange coupling field $H_{ex}$* indicates a value of a limiting magnetic field, wherein the magnetization of a pinned layer is pinned so that the variation in resistance disappears, when the magnetic field strength applied to the MR film is decreased after it is enhanced until the magnetization reaches saturation once. This is assumed to be a effective exchange coupling field.

According to the present invention, with this construction, it is possible to set the effective exchange coupling field $H_{ex}$* to be 200 Oe or more to form a stable pinned layer by controlling the balance of the antiferromagnetic connection of a pair of ferromagnetic layers of the pinned layer and the value of the coercive force of the ferromagnetic layers.

According to the present invention, since it is possible to select a material capable of maintaining the coercive force of the ferromagnetic layers of the pinned layer at a higher teerature than the blocking temperature of a conventional antiferromagnetic material, it is possible to provide a magnetoresistance effect head which is resistant to ESD (electrostatic discharge) in comparison with conventional heads and which does not cause pin reverse.

In addition, the pinned layer is formed of a pair of ferromagnetic layers which are antiferromagnetically connected to each other, and the magnetization of one of the pinned layers can cancel out the magnetization of the other pinned layer, so that it is possible to prevent a magnetic field from being applied to the free layer from the pinned layer and to prevent an undesired bias magnetic field from being applied. Therefore, it is possible to easily design the bias point of the head.

In the magnetoresistance effect head of the present invention, a pair of antiferromagnetically connected ferromagnetic layers forming the pinned layer may be formed of different compositions.

In the magnetoresistance effect head of the present invention, at least one of a pair of magnetic layers forming the pinned layer may be formed of at least one kind of metal layer selected from the group consisting of a metal containing Co as a principal component, ametal containing Fe as a principal component, and a metal layer containing Ni as a principal component. It is preferably formed of a metal layer containing 50 at % or more Co and at least one element selected from the consisting of Pt, Cr and Ta as the remaining component.

The metal containing Co as a principal component may be, e.g., a metal containing $Co_xA_{100-x}$ ($x \geq 50$, and A is at least one element selected from the consisting of Pt, Sm, Ce, La, Y, Fe, Cr, V,Ti, Ta, W, Zr, Nb, Hf, Mo, Al and Ni) as a principal component. The metal containing Fe as a principal component may be, e.g., a metal containing $Fe_xA_{100-x}$ ($x \geq 50$, and A is at least one element selected from the consisting of Co, Cr, Pt, Ni, Y, V, Ti, Ta, W, Zr, Nb, Hf, Mo and Al) as a principal component. In the magnetoresistance effect head of the present invention, the ferromagnetic material of the pair of magnetic layers forming the pinned layer may be an oxide ferromagnetic material or a nitride ferromagnetic material.

Such an oxide ferromagnetic material may be a spinel ferrite represented by a chemical formula $MO.X_2O_3$ (X is at least one element selected from the group consisting of Fe, Co, Mn and Cr, and M is at least one element selected from the group consisting of Mn, Fe, Co, Ni, Cu, Zn and Mg), or a magneto plumbite type ferrite represented by a chemical formula $ZO.Fe_2O_3$ (Z is at least one element selected from the group consisting of Ba, Sr, Ca and Pb).

The nitride ferromagnetic material may be selected from the group consisting of iron nitride, cobalt nitride, and iron nitride containing boron.

According to the ninth aspect of the present invention, the magnetoresistive element uses a giant magnetoresistance effect film having at least one pair of pinned layer and free layer which are arranged via a non-magnetic spacer layer, the pinned layer comprising a pair of ferromagnetic layers which are antiferromagnetically connected to each other via a connection layer, one of the pair of ferromagnetic layer being a hard magnetic film which is formed on a crystalline metal under layer and which has a bi-crystal structure containing Co as a constituent element.

Throughout the specification, the bi-crystal structure means a structure wherein sub-crystal grains exist in main crystal grains and wherein the c-axes exist in plane and the c-axes of the sub-crystal grains are substantially perpendicular to each other, so that the sub-crystal grains function as units of magnetic grains. Therefore, the bi-crystal structure of the Co magnetic film is able to obtain a high coercive force.

In the magnetoresistance effect head of the present invention, the crystalline metal under layer of the hard magnetic film having the bi-crystal structure containing Co as a constituent element preferably contains at least one element selected from the group consisting of Cr, V, Ti, Ta, W, Zr, Nb, Hf, Mo and Al. In addition, in the crystalline metal under layer, the face centered cubic crystal substantially has the orientation <200>. The crystalline metal under layer is preferably formed so as to have an amorphous layer or a mixing layer between the crystalline metal under layer and a non-metalic under layer.

In the magnetoresistance effect head of the present invention, the non-metalic under layer for forming the crystalline metal under layer of the hard magnetic film having the bi-crystal structure containing Co as a constituent element is preferably an oxide or nitride containing Al.

According to the tenth aspect of the present invention, the magnetoresistance effect head uses a giant magnetoresistance effect film having at lease at one pair of pinned layer and free layer which are arranged via a non-magnetic spacer layer, the pinned layer having a pair of ferromagnetic layers which are antiferromagnetically connected to each other via a connection layer, one of the pair of ferromagnetic layers has a laminated structure wherein at least one coercive force increasing layer is laminated, the coercive force increasing layer being selected from the group consisting of an oxide layer containing at least one element of Ni, Co and Fe as a principal component, a metal layer containing Mn, and a metal layer containing Cr as a principal component, a ratio Hc/Hex of a coercive force Hc in the one of the ferromagnetic layers having the laminated structure to an exchange coupling bias magnetic field in the one of the ferromagnetic magnetic layers caused by the coercive force increasing layer being set to be greater than 1, which includes the case where the exchange coupling bias magnetic field Hex is substantially zero.

According to the present invention, the pinned layer can be further stabilized by laminating the layer for increasing the coercive force, i.e., the coercive force increasing layer, on the pair of ferromagnetic layers which are antiferromagnetically connected to each other.

The coercive force increasing layer of the magnetoresistance effect head according to the present invention is preferably a layer which has a thickness of 20 nm or less and which contains, as a principal component, at least one selected from the consisting of NiO, COo and a laminated film of NiO and Coo, or a layer which contains $Z_xMn_{100-x}$ (Z is at least one element selected from the group consisting of Ni, Pt and Pd) as a principal component and which preferably has a thickness of 15 nm or less.

The coercive force increasing layer of the present invention is preferably a layer which contains $A_xMn_{100-x}$ (x is 0 or more and 40 or less, A is at least one element selected from the group consisting of Ir, Fe, Rh, Ru, Pt, Pd and Ni) as a principal component and which preferably has a thickness of 5 nm or less.

The coercive force increasing layer of the present invention may be a layer which has a thickness of 20 nm or less and which contains $\alpha\text{-}Fe_2O_3$ as a principal component.

Alternatively, the coercive force increasing layer of the present invention may be a Cr alloy layer which preferably has a thickness of 20 nm or less.

The Cr alloy for use in the coercive force increasing layer of the present invention may include at least one element selected from the group consisting of Al, Mn, Cu, Pt, Pd, Ag, Au, Ir, Rh, Ru. V, Fe, Co, Ni, Ga and In.

The magnetoresistance effect head of the present invention may use a giant magnetoresistance effect film having at least one pair of pinned layer and free layer which are arranged via a non-magnetic spacer layer, the free layer having a longitudinal bias layer which uses an antiferromagnetic layer for removing Barkhausen noises and which is arranged on both sides in the track width direction, the pinned layer comprising a pair of ferromagnetic layers which are antiferromagnetically connected to each other via a connection layer, the magnetization of the pinned layer being fixed at 200° C. or less.

According to the present invention, the antiferromagnetic layer for removing Barkhausen noises is connected to the free layer, so that it is possible to stabilized the output by the stabilization of the pinned layer and it is possible to reduce noises.

In the magnetoresistance effect head of the present invention wherein the antiferromagnetic layer for removing Barkhausen noises is connected to the free layer, the effective exchange coupling field $H_{ex}^*$ of the pinned layer is preferably 200 Oe or more at room temperature. In addition, the coercive force increasing layer may be provided in one of the pair of ferromagnetic layers of the pinned layer, and the Hc/Hex of the coercive force Hc of the ferromagnetic layers, in which the pinned layer is laminated, to the switched bias magnetic field in the ferromagnetic layer caused by the coercive force increasing layer is preferably set to be more than 1, which includes the case where the switched bias magnetic field Hex is substantially zero.

In the magnetoresistance effect head of the present invention wherein the antiferromagnetic layer for removing Barkhausen noises is connected to the free layer, one of the pair of ferromagnetic layers is preferably a hard magnetic film which is formed on a crystalline under layer and which has a bi-crystal structure containing Co as a constituent element.

In the magnetoresistance effect head of the present invention wherein the antiferromagnetic layer for removing Barkhausen noises is connected to the free layer, it is possible to enhance sensitivity by arranging the magnetizing directions of the free layer and the pinned layer so as to be substantially perpendicular to each other.

As described above, the pinned layer of the MR head of the present invention is formed of a pair of ferromagnetic layers which are antiferromagnetically connected to each other and which have different coercive forces, so that the magnetizing direction thereof is fixed.

With respect to the above described eleventh preferred eobodiment of a magnetoresistance effect head according to the present invention, examples will be described in detail below.

EXAMPLE 17

A magnetoresistance effect head having a schematic cross section shown in FIG. 26 was prepared.

A magnetic shield film 2 of $Ni_{80}Fe_{20}$ having a thickness of 2 μm was deposited on an $Al_2O_3^*$ TiC substrate 1, and a shield dividing process was carried out. Thereafter, a gap film 3 of $Al_2O_3$ was deposited by a usual deposition process. Then, using this under layer, an MR film of $Co_{80}Pt_{20}$ (5 nm)/Ru (1 nm)/$Co_{90}Fe_{10}$ (3 nm)/Cu (3 nm)/$Co_{90}Fe_{10}$, (3 nm)/Ta (5 nm) was deposited.

In this MR film, $Co_{80}Pt_{20}$ (5 nm)/Ru (1 nm)/$Co_{90}Fe_{10}$ (3 nm) is a pinned layer of the ferromagnetic layer A 11/the connection layer 12/the ferromagnetic layer B 13. The upper and lower ferromagnetic layers have different compositions and different coercive forces. The thickness of the Ru layer is set so that the upper and lower ferromagnetic layers are antiferromagnetically exchange coupled. The connection layer 12 may be formed of, e.g., Cr, Rh or Ir, other than Ru.

When the variation in resistance due to a magnetic field is measured with respect to the MR film 4 having the pinned layer of such a laminated structure, a curve showing the relationship between magnetic fields and resistances is obtained as shown in FIG. 27. Furthermore, FIG. 27 schematically shows the magnetization states of the free layers and pinned layers in respective parts on the curve.

In FIG. 27, the external magnetic field is small in I and II, so that the magnetization of each of the pinned layers hardly moves. When the magnetic field is more than a certain magnetic field $H_{ex}^*$ or $H_{ex}'^*$, the magnetization of the pinned layer greatly moves, so that the magnetization substantially reaches saturation in IV wherein the magnetic field reaches Hs. In the magnetic field which exceeds $H_{ex}'^*$ or $H_{ex}^*$, a great hysteresis is produced.

If the value of $H_{ex}'^*$ is set to be 2000 or more in the MR film, the MR head can be used in an area having no hysteresis.

That is, the free layer and the ferromagnetic layer B operate as a spin valve film, so that the magnetizing direction varies so as to be parallel to the ferromagnetic layer B by the rotation of magnetization of the free layer according to the magnetic field of a recording medium, thereby obtaining a great MR ratio.

When the value of $H_{ex}^*$ of the MR film is less than 200 Oe, the pinned layer is under the influence of the magnetic field of the medium and so forth, so that it is feared that the stability be insufficient.

In this Example 17, the value of $H_{ex}^*$ was 400 oe.

The MR film 31 thus deposited was patterned after photo etching process, so that a longitudinal bias layer 5 and a lead 6 of Ta/Cu/Ta or the like are deposited to form an abutted junction. This longitudinal bias layer 5 may be formed of a laminated layer of an antiferromagnetic film and a ferromagnetic film, or a hard magnetic layer.

In this case, the antiferromagnetic film may be formed of NiMn, PtMn, IrMn, RhMn, CrMnPt or the like, and the ferromagnetic film may be formed of NiFe, CoFe, CoNi, NiFeCoFe, Ni or the like. The ferromagnetic layer is magnetically fixed by the exchange coupling field of the antiferromagnetic film to use as a hard magnetic material. Furthermore, the ferromagnetic layer is preferably formed on the same saturation magnetization material as that of the free layer, in order to avoid Barkhausen noises caused by the discontinuity of magnetization.

The hard magnetic layer may be formed of CoPt, CoCr, CoPtCr or the like. Since a great coercive force is preferred, the substrate layer is preferably formed of, e.g., a Cr layer.

In Example 17, the longitudinal bias layer 5 was formed of $Co_{90}Fe_{10}$ (5 nm)/$Pt_{50}Mn_{50}$ (30 nm).

Moreover, as shown in FIG. 26, a gap layer 8 and a shield layer 9 were deposited to form an MR head structure by a usual process. Thereafter, in order to stabilize the free layer and magnetization shield layer of the MR film and the longitudinal bias layer, a magnetic field of 5 kOe was applied in a direction of head track width, i.e. in a lateral direction in FIG. 26, and heat treatment was carried out at 270° C. for 3 hours. Then, a magnetic field of 5 kOe was applied to a direction perpendicular to a head surface (ABS surface) facing a magnetic disk, i.e., in a direction perpendicular to the plane in FIG. 26, to magnetize the pinned layer.

The fixing temperature may be 200° C. or less, and is preferably a low temperature as much as possible. In this example, the fixing of magnetization was carried out at room temperature.

After the above described wafer process, the wafer was cut, and the ABS surface was polished to slide to prepare a magnetic head.

Subsequently, a head having a conventional film structure shown in FIG. 1 was prepared as Comparative Example 3, which is compared with Example 17.

As the MR film in Comparative Example 3, Ta (5 nm)/$Ni_{80}Fe_{20}$ (7 nm)/$Co_{90}Fe_{10}$ (1.5 nm)/Cu (3 nm)/$Co_{90}Fe_{10}$ (2 nm)/$Ir_{22}Mn_{78}$ (7 nm)/Ta (5 nm) was deposited. The $T_B$ of the antiferromagnetic film $Ir_{22}Mn_{78}$ was set to be 250° C. by controlling the thickness thereof, to form an abutted junction.

The heat treatment process was first carried out in a magnetic field of 5 koe in the track width direction at a temperature of 250° C., which approximates the $T_B$, for 3 hours. Thereafter, the direction of the magnetic field was turned to a direction perpendicular to a surface facing the medium, and it was cooled to room temperature. After the heat treatment, a magnetic field was applied in the track width direction at room temperature to polarize CoPe which is the material of the longitudinal bias layer 5.

Comparing Example 17 with Comparative Example 3, it was found that Example 17 was able to provide an excellent stability against ESD (electrostatic discharge) produced in processes for assembling the magnetic head and the magnetic disk drive. That is, in the case of the conventional MR head in Comparative Example 3, a trouble with a pin reverse was caused by ESD (electrostatic discharge), whereas in the case of Example 17, no pin reverse was caused. In Comparative Example 3, the fixing of the pinned layer is carried out by the antiferromagnetic layer, so that the stability against temperature rise is restricted by the $T_B$. on the other hand, in Example 17, the coercive force of the ferromagnetic layer takes part in the fixing of the magnetization, so that the stability can be maintained at a higher temperature.

Furthermore, in Example 17, the free layer and the ferromagnetic layer B of the pinned layer were formed of CoFe alloy layers. While CoFe alloy layers will be used in the following examples for simplification, the magnetic layers for use in the present invention should not be limited to the CoFe alloy layers, but the magnetic layers may be formed of various layers, such as Co layers, NiFe alloy layers, NiFeCo alloy layers, and laminated layers of CoFe/NiFe.

EXAMPLE 18

Figure 28:
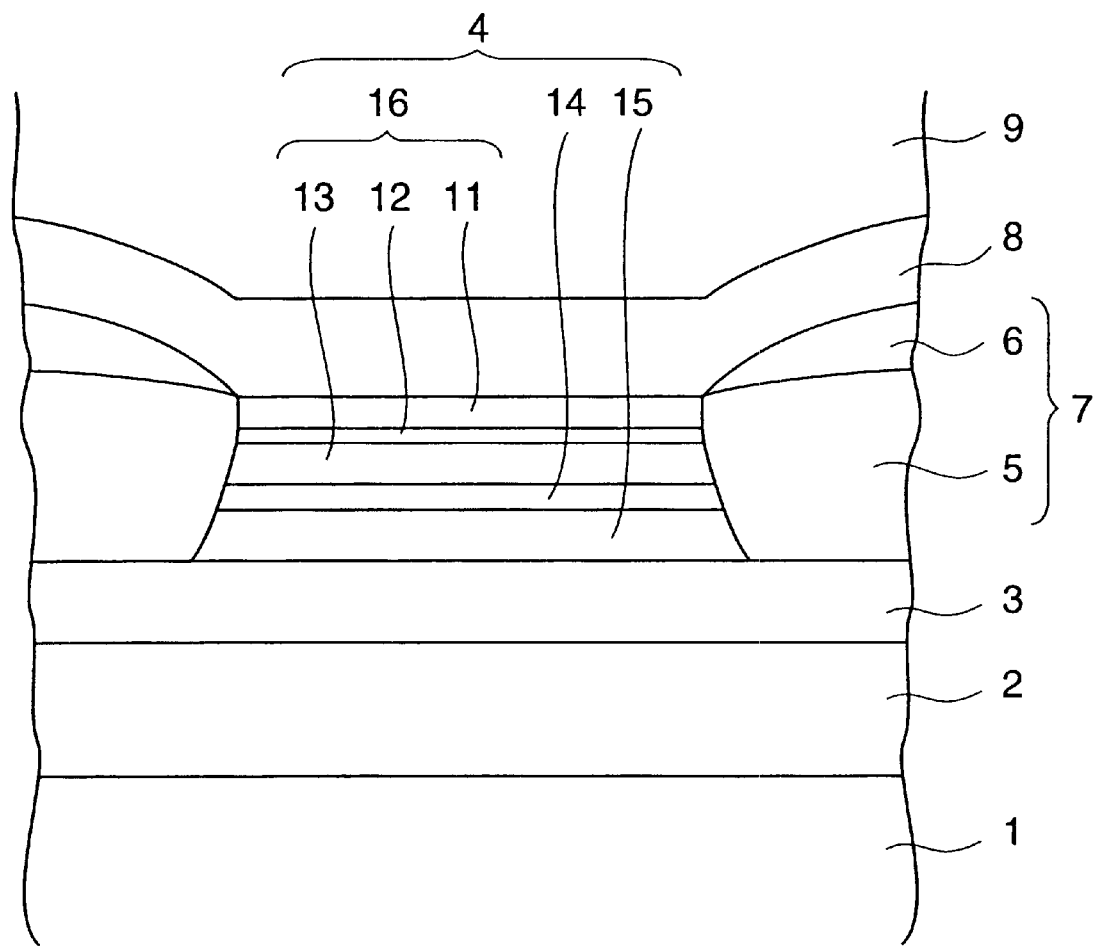
FIG. 28 is a sectional view of a magnetoresistance effect head in Example 18 according to the present invention.

A magnetoresistance effect head having a schematic cross section shown in FIG. 28 was prepared.

A magnetic shield film 2 of $Ni_8Fe_{20}$ having a thickness of 2 μm was deposited on an $Al_2O_3$. TiC substrate 1, and a shield dividing process was carried out. Thereafter, a gap film 3 of $Al_2O_3$ was deposited by a usual deposition process. Then, using this under layer, Au (1 nm)/Cu (1 nm)/Ta (5 nm)/$Co_{90}Fe_{10}$ (3 nm)/Cu (3 nm)/$Co_{90}Fe_{10}$ (3 nm)/Cr (1 nm)/$Co_{90}Pt_{20}$ (5 nm)/Ta (5 nm) was deposited.

In this MR film, $Co_{80}Fe_{10}$ (3 nm)/Cr (1 nm)/$Co_{80}Pt_{20}$ (5 nm) is a pinned layer of the ferromagnetic layer B 13/the connection layer 12/the ferromagnetic layer A 11. The upper and lower ferromagnetic layers have different compositions and different coercive forces, which are the same as those in Example 13. The thickness of the Cr layer is set so that the magnetizing directions of the two ferromagnetic layers are antiferromagnetically connected to each other via the cr layer. The connection layer 12 may be formed of, e.g., Ru, Rh or Ir, other than Cr.

In this Example 18, the coercive force of the ferromagnetic layer A 11 was 80 Oe, and the value of $H_{ex}*$ of the MR film was 320 Oe, so that the stability was satisfied.

The same process as that in Example 18 was carried out with respect to the MR film to prepare a magnetic head, and the same results as those in Example 17 were obtained.

It was confirmed from these results that in the case of the top spin valve structure wherein the pinned layer was provided as the upper layer, it was possible to obtain the same results as those in the bottom spin valve structure wherein the pinned layer was provided as the lower layer. Thus, it was also confirmed that the present invention was effective in the dual spin valve structure wherein the upper and lower layers were combined.

EXAMPLE 9

The ratio of the thickness of the ferromagnetic layer A 11/the connection layer 12/the ferromagnetic layer B 13, which serve as the pinned layer of the MR layer, was changed from that of the MR film in Example 17, so that two kinds of pinned layers, $Co_{80}Pt_{20}$ (5 nm)/Ru (1 nm)/$Co_{90}Fe_{10}$ (2.5 nm) and $Co_{90}Pt_{20}$ (5 nm)/Ru (1 nm)/$Co_{90}Fe_{10}$ (4 nm), were prepared. Thus, the value of saturation magnetization-Xthickness of the ferromagnetic layer A 11 was set to be slightly different from, not equal to, the value of saturation magnetization Xthickness of the ferromagnetic layer B 13.

As a result, the coercive force of the ferromagnetic layer A 11 was 100, and the value of $H_{ex}*$ was 300 Oe. Although these values were slightly smaller than those in Example 17, the stability as the MR film for the magnetoresistance effect head was satisfied.

Thus, the values of saturation magnetization×thickness of the pair of ferromagnetic films antiferromagnetically connected in the pinned layer may be equal to each other, or slightly different from another.

In particular, if the value of saturation magnetization× thickness of the ferromagnetic layer B 13 is increased, it is possible to optimize the design of the bias point by passing an MR sense current in a direction wherein the ferromagnetic layer A 11 is stabilized against the magnetic field caused by the current.

EXAMPLES 20 THROUHG 28

The results in Examples 20 through 28, wherein the pinned layer was arranged on the lower side, i.e., on the near side to the substrate, similar to Example 17 and wherein a Co alloy film was used as the ferromagnetic layer A A 11re shown in FIG. 29.

It can be seen from FIG. 29 that when the Co alloy film is used as one of the pair of ferromagnetic layers which constitute the pinned layer and which are antiferromagnetically connected to each other, the value of $H_{ex}*$ is sufficiently great, and the stability as the MR film of the magnetoresistance effect head can be satisfied.

Similarly, in $Co_xAl_{100-x}$ ($x \geqq 50$), it was possible to use Pt, Sm, Ce, La, Y, Fe, Cr, V, Ti, Ta, W, Zr, Nb, Hf, mo, Al and Ni as A.

EXAMPLES 29 THROUHG 35

The results in Examples 29 through 35, wherein the pinned layer was arranged on the upper side, i.e., on the far side from the substrate, similar to Example 14 and wherein a Co alloy film was used as the ferromagnetic layer A 11 shown in FIG. 30.

It can be seen from FIG. 30 that even if the pinned layer is arranged on the far side from the substrate, similar to the case where it is arranged on the near side to the substrate, when the Co alloy film is used as one of the pair of ferromagnetic layers which constitute the pinned layer and which are antiferromagnetically connected to each other, the value of $H_{ex}*$ is sufficiently great, and the stability as the MR film of the magnetoresistance effect head can be satisfied.

In any one of the above described Examples 29 through 35, an abutted junction type MR head was prepared. The present invention may be applied to a hard bottom spin valve structure wherein a hard magnetic layer is put on an MR film, as shown in the schematic sectional view of FIG. 25. Such examples will be described below.

EXAMPLES 36 AND 37

Figure 31:
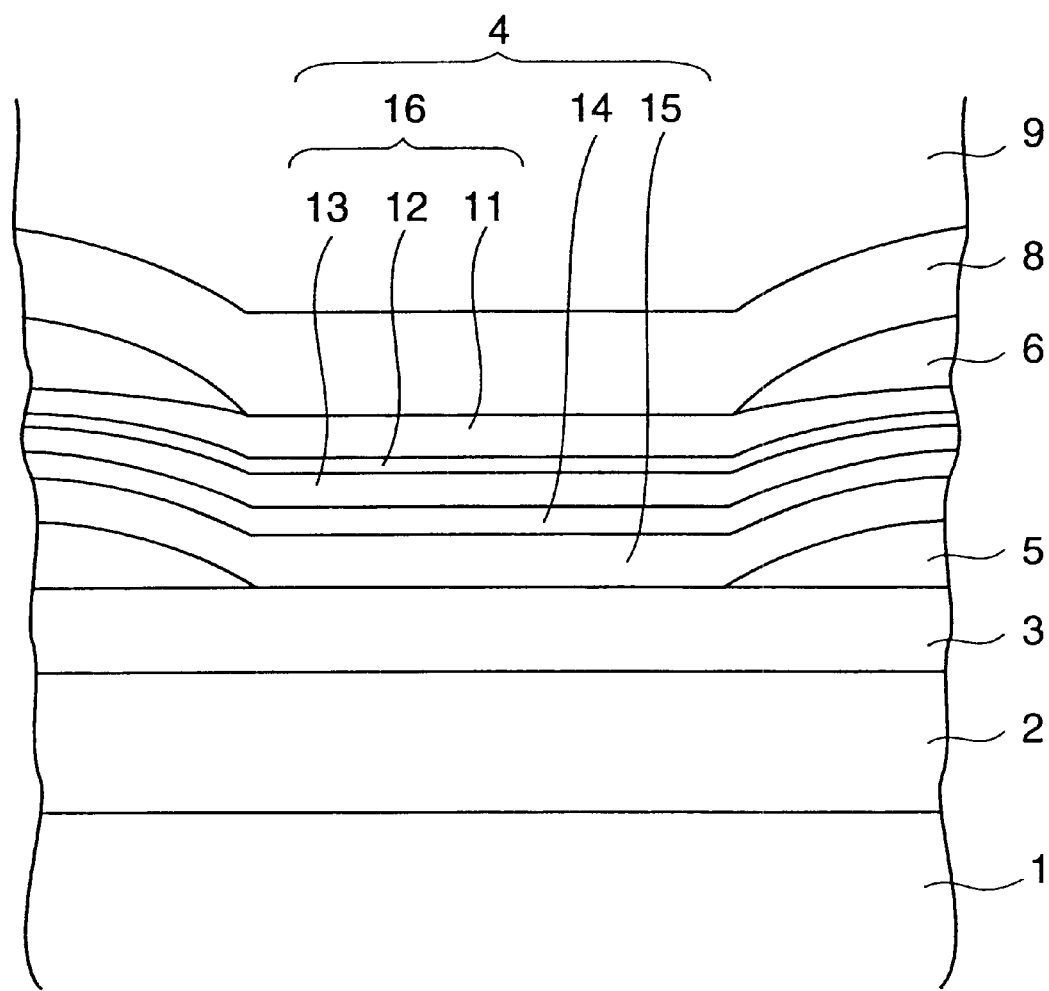
FIG. 31 is a sectional view of a magnetoresistance effect head in Examples 36 and 37 according to the present invention.

A magnetoresistance effect read part shown in the schematic sectional view of FIG. 31 was prepared as follows. First, an $Ni_{80}Fe_{20}$ film serving as a magnetic shield film 2 having a thickness of 2 μm was deposited on an $Al_2O_3$. TiC substrate 1, and a shield dividing process was carried out. Thereafter, a gap film 3 of $Al_2O_3$ was deposited by a usual deposition process. Then, as shown in FIG. 31, a hard magnetic layer 5 of Cr (5 nm)/$Co_{80}Pt_{20}$ (25 nm) was deposited. Thereafter, it was patterned and divided after the photo etching process. Then, using this under layer, an MR film of $Co_{90}Fe_{10}$ (3 nm)/Cu (3 nm)/$Co_{90}Fe_{10}$ (3 nm)/Cr (1 nm)/$Co_{80}Pt_{20}$ (5 nm)/Ta (5 nm) was deposited.

According to this hard bottom spin valve structure, unlike the abutted junction, the contact area of the hard magnetic layer 5 to the free layer is great, so that it is possible to obtain a sufficient bias as shown in FIG. 32.

Furthermore, as can be seen clearly from Examples 20 through 35, the same results can be obtained even if the pinned layer has the bottom spin valve structure or the top spin valve structure, so that the same results can be obtained even if the bias structure of the pinned layer is different. Therefore, in the following examples, one of these structures will be used. Furthermore, the abutted junction antiferromagnetic layer longitudinal bias, which is the same as that in Example 17 and which is shown in FIG. 24, will be used as the bias structure.

FIG. 32 shows the results obtained when an Fe alloy and a Ni alloy film were used as the ferromagnetic layer A 11 of the pinned layer having this structure.

Similarly, it was found that Fe alloys of $Fe_xA_{100-x}$ (x>50, and A is at least one selected from the group consisting of Co, Cr, Pt, Ni, Y, Mn, V, Ti, Ta, W, Zr, Nb, Hf, Mo and Al) and Ni alloys were effectively formed of the ferromagnetic layer A 11. It was also found that when the antiferromagnetic exchanging coupling layer 12 was formed of Ru or Cr, it was possible to obtain an appropriate value of $H_{ex}^*$ and the stability of the MR film.

It was also found that it was possible to use a Co, a CoFe or NiFe alloy film as the ferromagnetic layer B 13.

Furthermore, the ferromagnetic exchanging coupling layer 12 may be formed of Rh or Ir, and the ferromagnetic layer B 13 may be formed of a NiFe alloy film.

EXAMPLES 31 THROUGH 41

The results obtained when a spinel ferrite, which was an oxide ferromagnetic layer, was used as the ferromagnetic layer A 11, similar to the preceding Examples 17 through 37, are shown in FIG. 33. It can be seen from FIG. 33 that it is possible to obtain good results by using a spinel ferrite, which is an oxide ferromagnetic layer, as the ferromagnetic layer A 11.

Similarly, it was found that it was possible to use the composition of $MO \cdot X_2O_3$ (X is at least one selected from the group consisting of Fe, Co, Mn and Cr, and M is at least one selected from the group consisting of Mn, Fe, Co, Ni, Cu, Zn and Mg).

EXAMPLES 42 AND 43

The results obtained when a magneto plumbite type ferrite, $ZO \cdot 6Fe_2O_3$ (Z is at least one selected from the group consisting of Ba, Sr, Ca and Pb), which was an oxide ferromagnetic layer, was used as the ferromagnetic layer A 11, similar to the preceding examples, are shown in FIG. 34.

It can be seen from FIG. 34 that it is possible to obtain good results by using a magneto plumbite type ferrite, which is an oxide ferromagnetic layer, as the ferromagnetic layer A 11.

EXAMPLE 44

FIG. 35 shows the results obtained when iron nitride was used as the ferromagnetic pinned layer B. It was found from FIG. 35 that it was possible to obtain good results by using iron nitride.

Examples wherein Co and Co alloys having the bi-crystal structure are used will be described below.

EXAMPLES 45 THROUGH 60

A magnetoresistance effect read part was prepared as follows. A magnetic shield film 2 of $N_{80}Fe_{20}$ (21 μm) was deposited on an $Al_2O_3$. TiC substrate, and a shield dividing process was carried out. Thereafter, a nonmetal under layer of $Al_2O_3$ serving as a gap layer (70 nm) was deposited. Then, using this under layer, an MR film of Cr (5 nm)/Co (bi-crystal structure) (3 nm)/Ru (1 nm)/Co (3 nm)/Cu (3 nm)/$Co_{90}Fe_{10}$ (3 nm)/Ta (5 nm) was deposited. Other structures were the same as those in Example 17.

The MR film will be described in detail below. The Cr layer comprises a reaction layer mixed with the of $Al_2O_3$, and a crystal layer having the bcc structure arranged thereon. When a mixing reaction layer of amorphous like Cr and $Al_2O_3$ is formed by appropriately pre-cleanming the $Al_2O_3$, under layer before depositing the Cr layer, a crystal layer having orientation <110> is formed in the Cr arranged thereon, so that the ferromagnetic layer A arranged thereon can have at least the bi-crystal structure. As a result, the coercive force of the ferromagnetic layer A is 70 Oe which is greater than that of the ferromagnetic layer B. Therefore, the $H_{ex}^*$ can be 280 Oe, so that it was found that the conditions for the stabilization of the pinned layer were met. FIG. 36 shows Examples 45 through 60 wherein Co and Co alloys having the bi-crystal structure were used. Furthermore, in the table, α in the column of 11 ferromagnetic layer A denotes a reactive amorphous layer.

As shown in these Examples 45 through 60, the non-metalic under layer for depositing the Co and Co alloy films having the bi-crystal structure may be formed of $AlO_x$, AlN, $SiO_x$, $ZrO_x$, or TiN. In particular, the under layer is preferably formed of $AlO_x$ or AlN. In addition, the under layer may be formed of $TiO_x$, $TaO_x$ or diamond like carbon.

In addition, the crystalline metal under layer for depositing the Co and Co alloy films having the bi-crystal structure is preferably formed of Cr or V as shown in this example, and may be formed of Ta, Zr or FeCo alloy. In addition, it was found that it was possible to use Ti, W, Nb, Hf, Mo, Al and alloys containing these elements.

In addition, as shown in Example 19, the product of the saturation magnetization of the ferromagnetic layer 11 by the thickness thereof may be different from that of the ferromagnetic layer 13.

With respect to the MR head of the present invention wherein a coercive force increasing layer is laminated on the ferromagnetic layer A of the pinned layer, Examples will be described below.

EXAMPLES 61 THROUGH 90

A magnetoresistance effect read part was prepared as follows. A magnetic shield film 2 of $Ni_{80}Fe_{20}$ (2 μm) was deposited on an $Al_2O_3$. TiC substrate, and a shield dividing process was carried out. Thereafter, a non-metalic under layer of $Al_2O_3$ (70 nm) was deposited. Then, using this under layer, an MR film having a structure of NiO (15 nm)/Co (3 nm)/Ru (1 nm)/Co (3 nm)/Cu (3 nm)/$Co_{90}Fe_{10}$ (3 nm)/Ta (5 nm) was deposited.

In this MR film structure, if the thickness of NiO is greater than 20 nm, the exchange coupling field Hua tends to be greater than the coercive force Hc, so that it is difficult to fix the pinned layer by the magnetic field at a temperature near room temperature due to the Hua. Therefore, the thickness of NiO is preferably 20 nm or less.

The coercive force of the ferromagnetic layer A 11 is maintained to be about 300 Oe even if the thickness of NiO is 20 nm or less, and the disappearing temperature is 200° C. or higher, so that it is stable.

Figure 37:
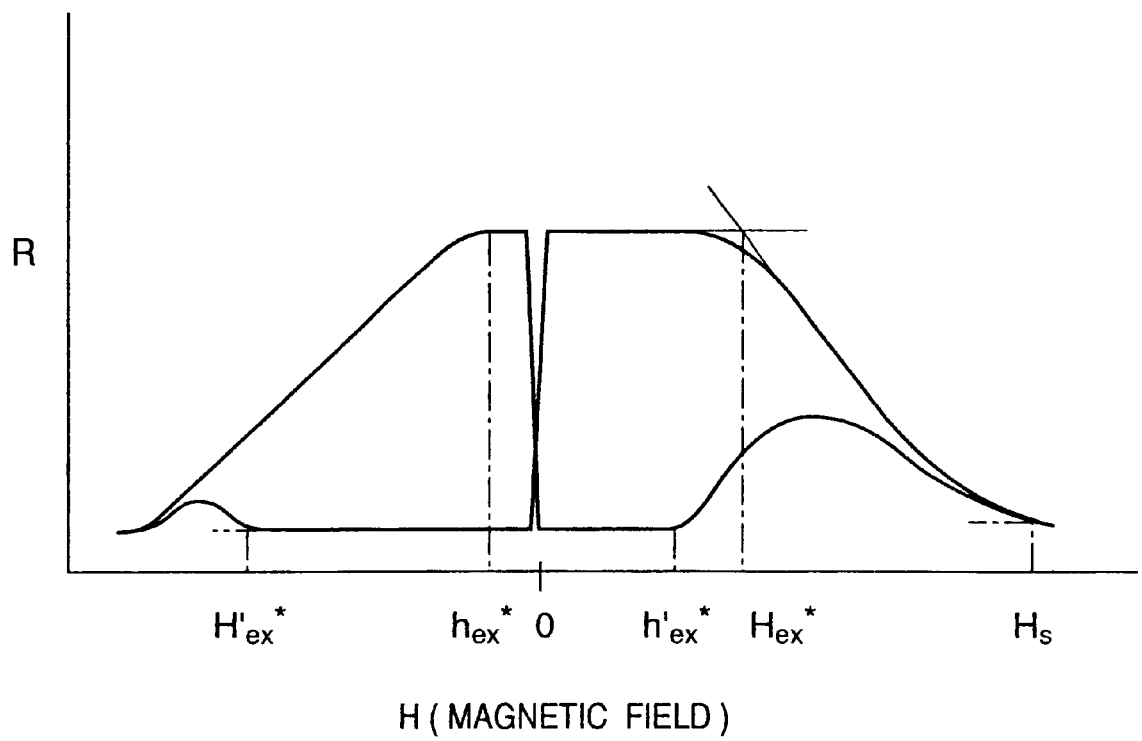
FIG. 37 is a schematic diagram showing the relationship between magnetic fields and resistances of a magnetoresistance effect film constituting a magnetoresistance effect head in Examples 61 through 90 according to the present invention.

With respect to this laminated structure, the magnetoresistance effect was measured so that the R-H curve shown in FIG. 37 was obtained. In FIG. 37, the movement of magnetization in the respective magnetic fields of the free layer and pinned layer is the same as that in FIG. 27. The difference between FIG. 37 and FIG. 27 is that it is asymmetric with respect to the magnetic field since the exchange coupling field Ho is applied to the ferromagnetic field by the coercive force increasing layer. Therefore, performance parameters are $H_{ex}^*$, $H_{ex}'$, $h_{ex}^*$ and $h_{ex}'$, wherein $H_{ex}^* > h_{ex}^*$. Then, the magnetizing direction of the pin layer may be the direction of $H_{ex}^*$. In this example, the Hc of the magnetic layer 11 is about 300 Oe, and the $H_{ex}^*$ is 800 Oe or more, so that it is possible to sufficiently obtain the stability of the magnetization.

In this example, it is possible to use various coercive force increasing layers other than NiO. In principle, it is not required to carry out the heat treatment since it supports a hard magnetic film. However, regulated alloys, such as NiMn, PtMn and PdPtMn, must be heat-treated for regulating a part thereof. When a part is regulated, Hua<Hc, so that the pinned layer can be fixed by the magnetic field at room temperature.

After the above described wafer process, the wafer was cut, and the ABS surface was polished to slide to prepare a head.

The above described examples and similar examples are shown in FIG. 38.

Examples wherein the composition of the coercive force increasing layer was changed to increase the Hc of the magnetic layer A 11re shown in FIG. 39.

As can be seen from FIG. 39, it is possible to use $NiO_x$, $\alpha$-$Fe_2O_3$, PtMn and IrMn films as the coercive force increasing layer. In addition, it is possible to effectively use Nimn, PdMn, PdPeMn, FeMn, RhMn, RhRuMn and RuMn films, and Cr alloy films.

Thus, even in the case of a film, to which an effective exchange coupling field, which can fix the pinned layer, can not applied by the conventional construction, the present invention can enhance the coercive force Hc of the ferromagnetic material of the pinned layer to stabilize the pinned layer. In addition, since the exchange coupling field Hua is small, the condition Hc>Hua is met with respect to the coercive force Hc.

In the regulated antiferromagnetic materials, such as PtMn, NiMn and PdPtMn, the exchange coupling field can be smaller than the coercive force by controlling the composition even if the thickness is 20 nm or more, and the condition Hc>Hua is met, so that the materials can be used as the coercive force increasing layer.

While the above described examples have used the bottom spin valve structure wherein the pinned layer is arranged in the lower portion, the same results can be obtained even in the top spin valve structure wherein the pinned layer is arranged in the upper portion as shown Examples 29 through 35. In addition, the same results can be obtained even in the dual spin valve structure wherein the upper and lower layers are combined.

In addition, as shown in Example 19, the product of the saturation magnetization of the magnetic layer 11 by the thickness thereof may be different from that of the pinned layer 13.

Figure 40:
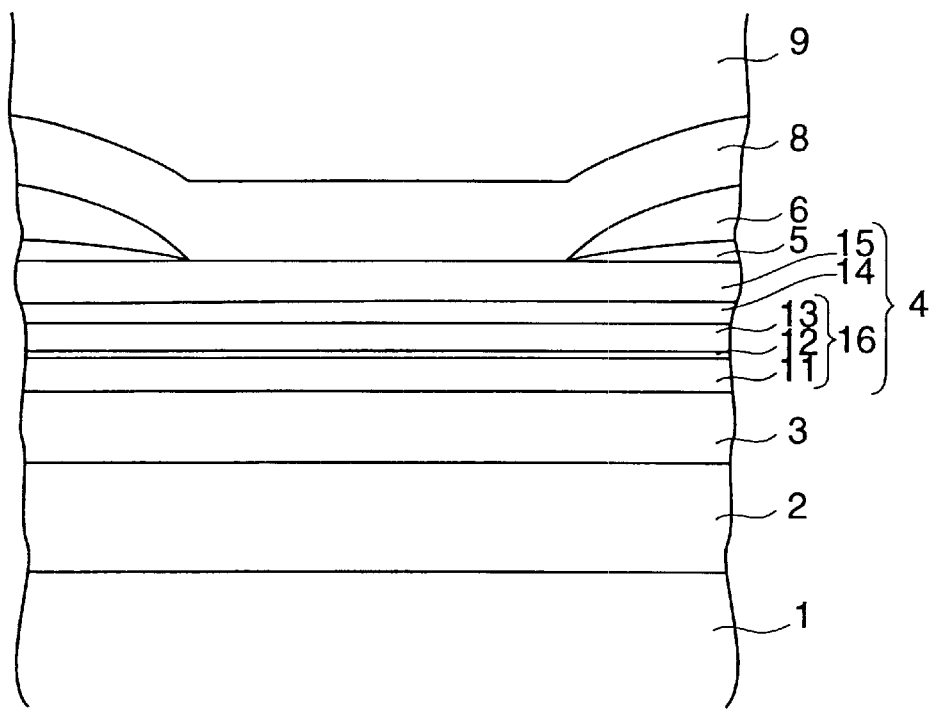
FIG. 40 is a sectional view of a magnetoresistance effect head in Example 91 according to the present invention.

An example wherein a patterned bias of an antiferromagnetic material is arranged in the upper portion as shown in the schematic cross section of FIG. 40 will be described below.

EXAMPLE 91

A magnetoresistance effect read part shown in FIG. 40 was prepared as follows. First, an $Ni_{80}Fe_{20}$, film serving as a magnetic shield film 2 having a thickness of 2 $\mu$m was deposited on an $Al_2O_3$. TiC substrate, and a shield dividing process was carried out. Thereafter, a gap film 3 of $Al_2O_3$ was deposited by a usual deposition process. Then, using this under layer, $Co_{80}Pt_{20}$ (5 nm)/Ru (1 nm)/$Co_{90}Fe_{10}$ (3 nm)/Cu(3 nm)/$Co_{90}Fe_{10}$ (3 nm)/Ta (5 nm) was deposited. The coercive force Hc of the ferromagnetic layer A 11 and the value of the $H_{ex}^*$ were the same as those in Example 17.

The photo etching process was carried out for arranging the longitudinal bias layer 5 at the end of the MR film to form an antiferromagnetic layer of $Ir_{22}Mn_{78}$ (12 nm) and a lead 6 of Ta/Cu/Ta or the like. Then, a gap layer 7 and a shield layer 8 were formed thereon, and the write head was formed by a usual process. Furthermore, the antiferromagnetic layer may be formed of an antiferromagnetic film, such as RhMn, RuRhMn, NiMn, PtMn, PdPtMn and CrMnPt, which can sufficiently obtain the exchange coupling field Hua, other than IrMn described above.

In this example, since the antiferromagnetic film was used, a magnetic field of 5 kOe was applied in the track width direction of the magnetic head to carry out heat treatment in order to apply the induced magnetic anisotropy to the upper and lower magnetic shields 2, 9 and the free layer 15 and in order to stabilize exchange coupling field from the antiferromagnetic layer which was the longitudinal bias layer 5. The heat treatment temperature was set to be 270° C. approximating the $T_B$ of the antiferromagnetic film, and the heat treatment was carried out for 3 hours. After the heat treatment, a magnetic field of 5 kOe is applied in a direction perpendicular to the ABS surface at room temperature to fix the pinned layer.

After the above described wafer process, the wafer was cut, and the ABS surface was polished to slide to prepare a head.

Thus, if the antiferromagnetic film using a high blocking temperature is used, it is not unstable at the operating temperature as shown in Comparative Example.

While the pinned layer of the MR film has been arranged in the lower portion in this example, the same results can be obtained even if it is arranged in the upper portion.

Figure 41:
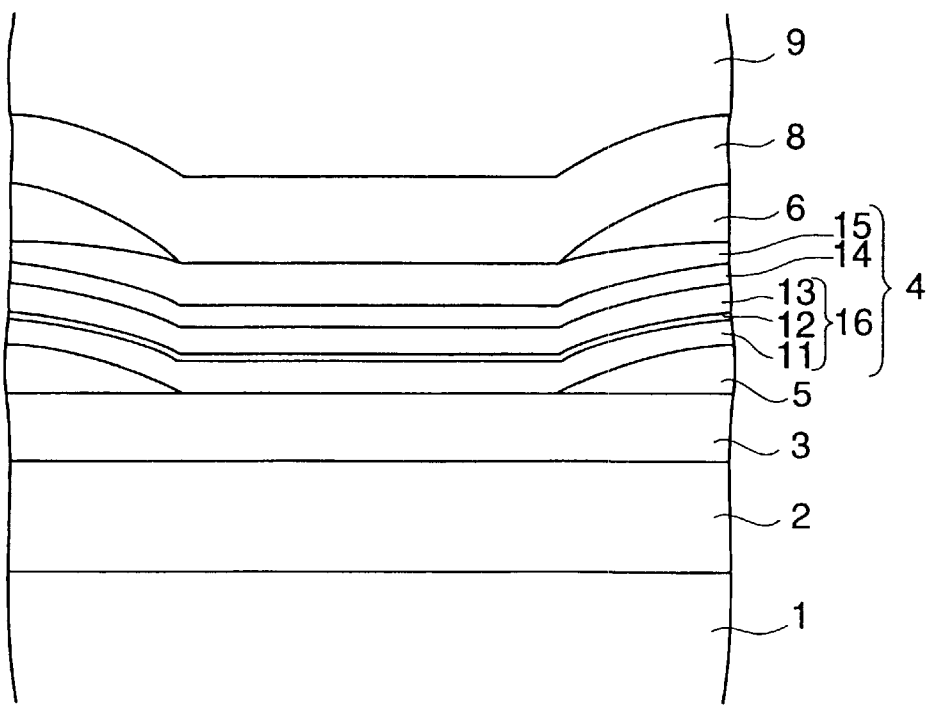
FIG. 41 is a sectional view of a magnetoresistance effect head in Example 92 according to the present invention.

An example wherein a patterned bias of an antiferromagnetic material is arranged in a lower portion as shown in FIG. 41 will be described below.

EXAMPLE 92

A magnetoresistance effect read part shown in FIG. 41 was prepared as follows. First, an $Ni_{80}Fe_{20}$ film serving as a magnetic shield film 2 having a thickness of 2 $\mu$m was deposited on an $Al_2O_3$. TiC substrate, and a shield dividing process was carried out. Thereafter, a gap film 3 of $Al_2O_3$ (70 nm) was deposited by a usual deposition process. Furthermore, the antiferromagnetic layer may be formed of an antiferromagnetic film, such as RhMn, RuRhMn, NiMn, PtMn, PdPtMn and CrMnPt, which can sufficiently obtain the exchange coupling field Hua, other than IrMn described above.

Thereafter, the film was divided by the photo etching process, and using this under layer, $Co_{90}Fe_{10}$ (3 nm)/Cu (3 nm)/Co$_{90}$Fe$_{10}$ (3 nm)/Cr (1 nm)/Co$_{80}$Pt$_{20}$ (5 nm)/Ta (5 nm) was deposited. Then, the photo etching process for the MR film was carried out to form a lead 6 of Ta/Cu/Ta or the like. Then, the heat treatment was carried out on the same conditions as those in Example 78. With this construction, it was possible to obtain a sufficient bias effect even if the top spin valve structure was used.

This patterned bias can also be applied to the top pinned layer structure.

As described above, according to the eleventh preferred embodiment of the present invention, it is possible to form a pinned layer, which is stable against temperature, electrostatic voltage and so forth, and to fix magnetization without having any influences on the heat treatment of a free layer and a magnetic shield layer. Therefore, a magnetoresistance effect head according to the present invention can hold a stable output voltage without decreasing the output voltage even if the operating temperature rises. In addition, since it is stable against the electrostatic voltage, it is possible to reduce the trouble caused by the electrostatic voltage during the production of a magnetic head and the assembling of a magnetic disk drive, so that it is possible to improve the producing yields of the magnetic head and the magnetic disk drive.

What is claimed is:

1. A magnetorestrictive element, comprising an exchanging coupling film comprising:
   an under layer of a single film, a laminate film, or an alloy film, said under layer containing one metal selected from the group consisting of Tc, Zn, Cd, Tl and Pb, said metal having a face centered cubic crystal structure or hexagonal closest-packing crystal structure;
   an antiferromagnetic film; and
   a ferromagnetic film.

2. A magnetorestrictive element as set forth in claim 1, wherein said under layer has a first layer contacting said antiferromagnetic film and a second layer contacting said first layer, said first layer contains said metal and said second layer contains at least one metal selected from the group consisting of Ti, Ta, Hf, Zr, Nb and V.

3. A magnetorestrictive element as set forth in claim 1 or 2, wherein at least part of said antiferromagnetic film has a face centered cubic crystal structure.

4. A magnetoresistive element as set forth in claim 3, wherein said antiferromagnetic film includes R$_x$Mn$_{100-x}$ (R is at least one element selected from the group consisting of Ir, Rh, Pt, Ru, Au, Ag, Co, Pd, Ge, Re, Ni and Cu, $5 \leq x \leq 40$).

5. A magnetoresistive element as set forth in claim 3, wherein said antiferromagnetic film includes (R$_x$Mn$_{100-x}$)$_{100-y}$Fe$_y$ (R is at least one element selected from the group consisting of Ir, Rh, Pt, Ru, Au, Ag, Co, Pd, Ge, Re, Ni and Cu, $5 \leq x \leq 40$, $0 < y < 30$).

6. A magnetorestrictive element as set forth in claim 1 or 2, wherein at least part of said antiferromagnetic film has a face centered tetragonal crystal structure.

7. A magnetorestrictive element as set forth in claim 1 or 2, wherein at least part of said antiferromagnetic film has a body-centered cubic crystal structure.

8. A magnetoresistive element as set forth in claim 7, wherein said antiferromagnetic film includes R$_x$Mn$_{100-x}$, (R is at least one element selected from the group consisting of Pt, Ni, Pd and Cr, $40 \leq x \leq 60$).

9. A magnetoresistive element as set forth in claim 7, wherein said antiferromagnetic film includes (R$_x$Mn$_{100-x}$)$_{100-y}$Fe$_y$ (R is at least one element selected from the group consisting of Pt, Ni, Pd and Cr, $40 \leq x \leq 60$, $0 < y < 30$).

10. A magnetorestrictive element as set forth in claim 1 or 3, wherein at least part of said antiferromagnetic film has a body-centered cubic crystal structure and wherein said antiferromagnetic film comprises at least one metal selected from the group consisting of Ta, Hf, Nb, Si, Al, W, Zr, Ga, Be, In, V, Mo, Os, Cd, Zn, N, Cr and Ni.

11. A magnetorestrictive element as set forth in claim 1 or 2, wherein said antiferromagnetic film is arranged so that the axis <111> is perpendicular to the plane of the film.

12. A magnetorestrictive element as set forth in claim 1 or 2, wherein said antiferromagnetic film has a full width at half maximum of a rocking curve obtained by XRD, which is 15° or less.

13. A magnetorestrictive element as set forth in claim 1 or 2, wherein the matching between atoms in the interface between said under layer and said antiferromagnetic film is −6% or more and 15% or less.

14. A magnetorestrictive element as set forth in claim 13, wherein said antiferromagnetic film of an exchange coupling film has a laminated structure of first ferromagnetic film/non-magnetic film/second ferromagnetic film.

15. A magnetorestrictive element as set forth in claim 1 or 2, wherein said ferromagnetic film is formed of Co or a Co alloy.

16. A magnetorestrictive element as set forth in claim 1 or 2, wherein a first pinned layer of a ferromagnetic film is arranged on the top of said antiferromagnetic film, and a free layer of a ferromagnetic film is arranged on the top of said first pinned layer.

17. A magnetoresistive element as set forth in claim 16, wherein a second pinned layer of said ferromagnetic film is further arranged on the upper side of said free layer.

18. A magnetoresistance effect film as set forth in claim 17, wherein at least part of said antiferromagnetic film has a face centered cubic crystal structure.

19. A magnetoresistance effect film as set forth in claim 17, wherein at least part of said antiferromagnetic film has a face centered tetragonal crystal structure.

20. A magnetoresistance effect film as set forth in claim 17, wherein at least part of said antiferromagnetic film has a body-centered cubic crystal structure.

21. A magnetoresistive element as set forth in claim 17, wherein said antiferromagnetic film is formed of an alloy target having an oxygen content of 0.5 wt % or less.

22. A magnetorestrictive element as set forth in claim 1, wherein said antiferromagnetic film is formed of an alloy target having an oxygen comtent of 0.05w % or less.

23. A magnetic head comprising: an under magnetic shield layer; an under read magnetic gap formed on said under magnetic shield layer; a magnetorestrictive element formed on said under read magnetic gap; an upper read magnetic gap formed on said magnetorestrictive element; and an upper magnetic shield layer formed on said upper read magnetic gap,
   wherein said magnetorestrictive element comprises an exchanging coupling film comprising an under layer, a laminate film, or an alloy film, said under layer containing one metal selected from the group consisting of Tc, Zn, Cd, Tl and Pb, said metal having a face centered cubic crystal structure or a hexagonal closest packing crystal structure, an antiferromagnetic film, and a ferromagnetic film.

24. A magnetic disk drive which comprises a read magnetic head and a magnetic disk and which reads information recorded in said magnetic disk, by said read magnetic head, wherein said read magnetic head comprises an under magnetic shield layer; an under read magnetic gap formed on said under magnetic shield layer, a magnetorestrictive element formed on said under read magnetic gap; an upper read magnetic gap formed on said magnetorestrictive element; and an upper magnetic shield layer formed on said upper read magnetic gap, and wherein said magnetorestrictive element comprises an exchanging coupling film comprising an under layer, a laminate film, or an alloy film, said under layer containing one metal selected from the group consisting of Tc, Zn, Cd, Tl and Pb, said metal having a face centered cubic crystal structure or a hexagonal closest packing crystal structure, an antiferromagnetic film, and a ferromagnetic film.

* * * * *